United States Patent
Lee et al.

(10) Patent No.: US 10,601,133 B2
(45) Date of Patent: Mar. 24, 2020

(54) ELECTRONIC DEVICE HAVING LOOP ANTENNA

(71) Applicant: Samsung Electronics Co., Ltd., Gyeonggi-do (KR)

(72) Inventors: Woosup Lee, Gyeonggi-do (KR); Gaeun Lee, Gyeonggi-do (KR); Youngkon Lim, Gyeonggi-do (KR); Kyeongjo Keum, Gyeonggi-do (KR); Taekun Kim, Incheon (KR); Dongil Yang, Gyeonggi-do (KR); Sungchul Park, Seoul (KR); Jungsik Park, Gyeonggi-do (KR); Jaebong Chun, Gyeonggi-do (KR); Hanjib Kim, Gyeonggi-do (KR); Chihyun Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 9 days.

(21) Appl. No.: 15/688,459

(22) Filed: Aug. 28, 2017

(65) Prior Publication Data
US 2018/0069312 A1 Mar. 8, 2018

(30) Foreign Application Priority Data
Aug. 26, 2016 (KR) .................. 10-2016-0109070

(51) Int. Cl.
| | |
|---|---|
| *H04W 4/80* | (2018.01) |
| *H01Q 7/06* | (2006.01) |
| *H04B 5/00* | (2006.01) |
| *G06Q 20/32* | (2012.01) |
| *H01F 38/14* | (2006.01) |
| *H04B 5/02* | (2006.01) |

(52) U.S. Cl.
CPC ............ *H01Q 7/06* (2013.01); *G06Q 20/3278* (2013.01); *H04B 5/0075* (2013.01); *H01F 2038/143* (2013.01); *H04B 5/0087* (2013.01); *H04B 5/02* (2013.01)

(58) Field of Classification Search
CPC ............................. H01Q 7/06; H04B 5/0087
USPC ......................................... 343/788
See application file for complete search history.

(56) References Cited

U.S. PATENT DOCUMENTS

| | | | |
|---|---|---|---|
| 9,002,418 | B2 | 4/2015 | White |
| 2010/0188307 | A1 | 7/2010 | Murata et al. |
| 2011/0266878 | A9 | 11/2011 | Cook et al. |
| 2014/0057682 | A1 | 2/2014 | Freund et al. |

(Continued)

FOREIGN PATENT DOCUMENTS

| | | |
|---|---|---|
| EP | 2 894 716 | 7/2015 |
| JP | 2014207542 | 10/2014 |
| WO | WO 2017/138732 | 8/2017 |

OTHER PUBLICATIONS

International Search Report dated Nov. 27, 2017 issued in counterpart application No. PCT/KR2017/009046, 4 pages.

(Continued)

*Primary Examiner* — Peguy Jean Pierre
(74) *Attorney, Agent, or Firm* — The Farrell Law Firm, P.C.

(57) ABSTRACT

Disclosed is an electronic device capable of securing improved radiation performance and emitting a magnetic field signal including payment information using a loop antenna, even though a portion of the electronic device may be made of metal.

21 Claims, 60 Drawing Sheets

(56) References Cited

U.S. PATENT DOCUMENTS

| | | | |
|---|---|---|---|
| 2015/0076922 A1* | 3/2015 | Kato | H04W 4/80 |
| | | | 307/104 |
| 2015/0236401 A1 | 8/2015 | Yamaguchi et al. | |
| 2015/0311960 A1 | 10/2015 | Samardzija et al. | |
| 2016/0020517 A1 | 1/2016 | Florek et al. | |
| 2016/0076952 A1 | 3/2016 | Kim | |
| 2016/0111889 A1 | 4/2016 | Jeong | |
| 2016/0210616 A1 | 7/2016 | Lee et al. | |
| 2017/0141458 A1* | 5/2017 | Kwon | G06F 1/1626 |
| 2017/0237149 A1 | 8/2017 | Lee et al. | |
| 2017/0256856 A1* | 9/2017 | Lilja | H01Q 1/1207 |
| 2018/0069312 A1* | 3/2018 | Lee | G06Q 20/3278 |

OTHER PUBLICATIONS

European Search Report dated Dec. 19, 2017 issued in counterpart application No. 17186853.2-1874, 14 pages.

* cited by examiner

FIG. 7A
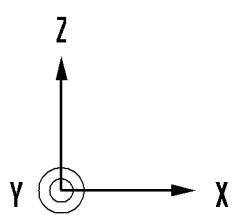
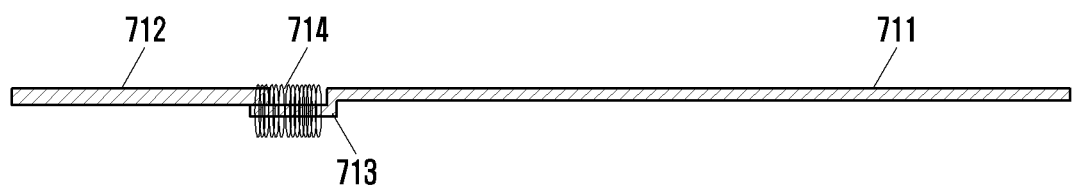
FIG. 7B
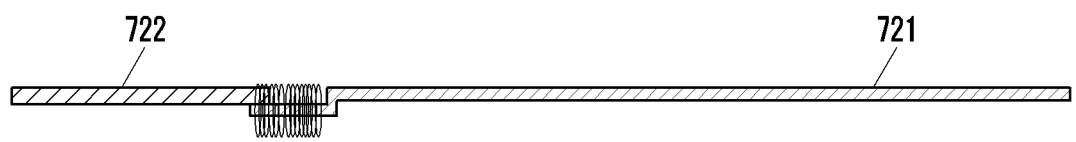

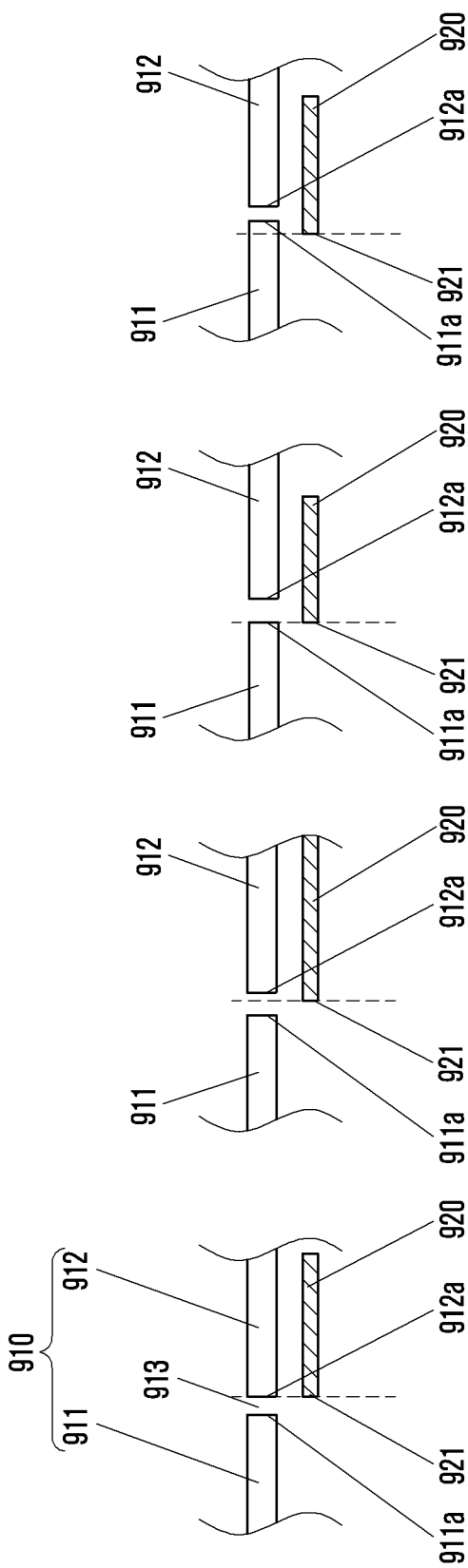
FIG. 9A  FIG. 9B  FIG. 9C  FIG. 9D
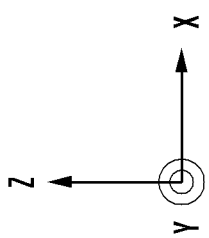
FIG. 9E
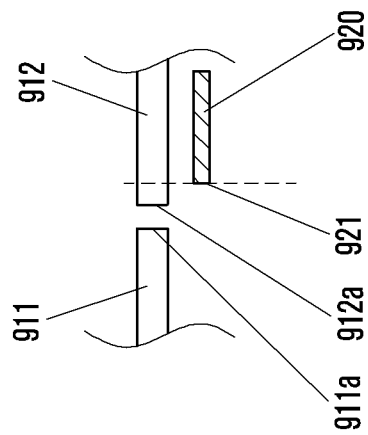

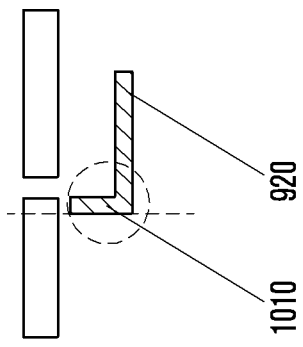
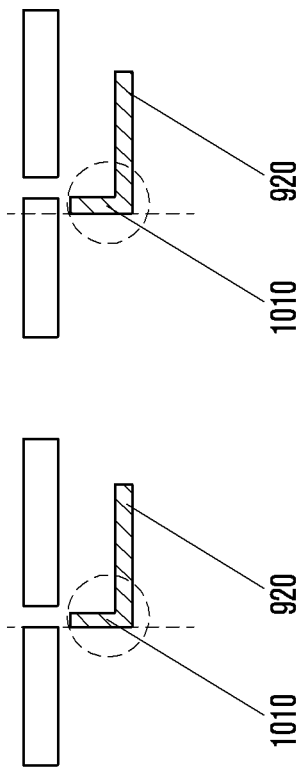
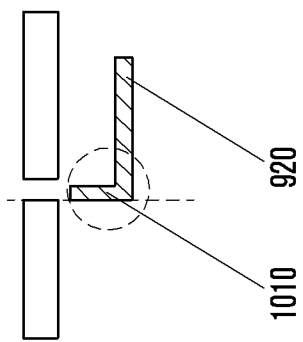
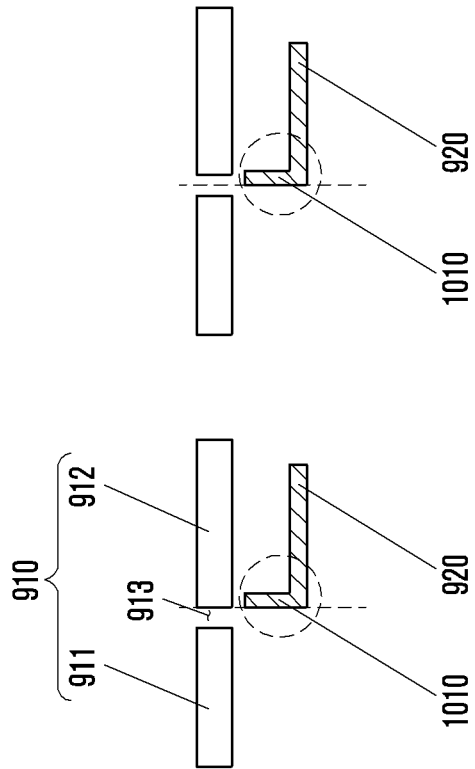
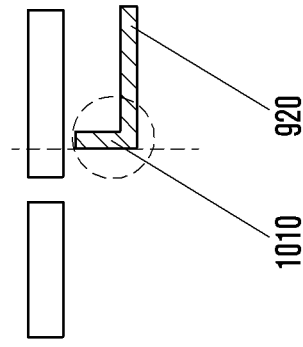
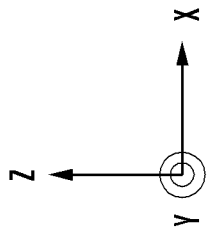

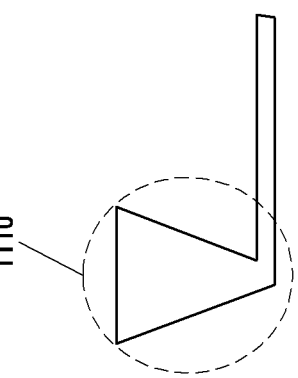
FIG. 11A
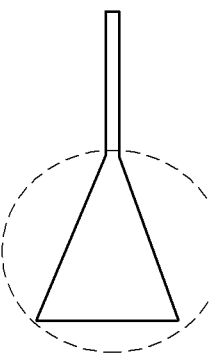
FIG. 11B
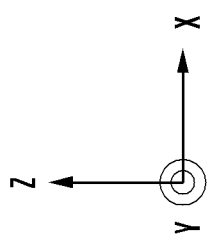
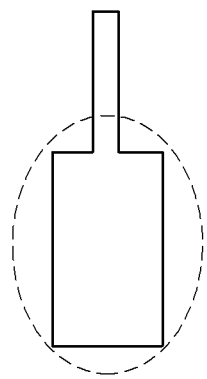
FIG. 11C
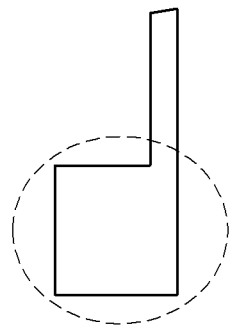
FIG. 11D

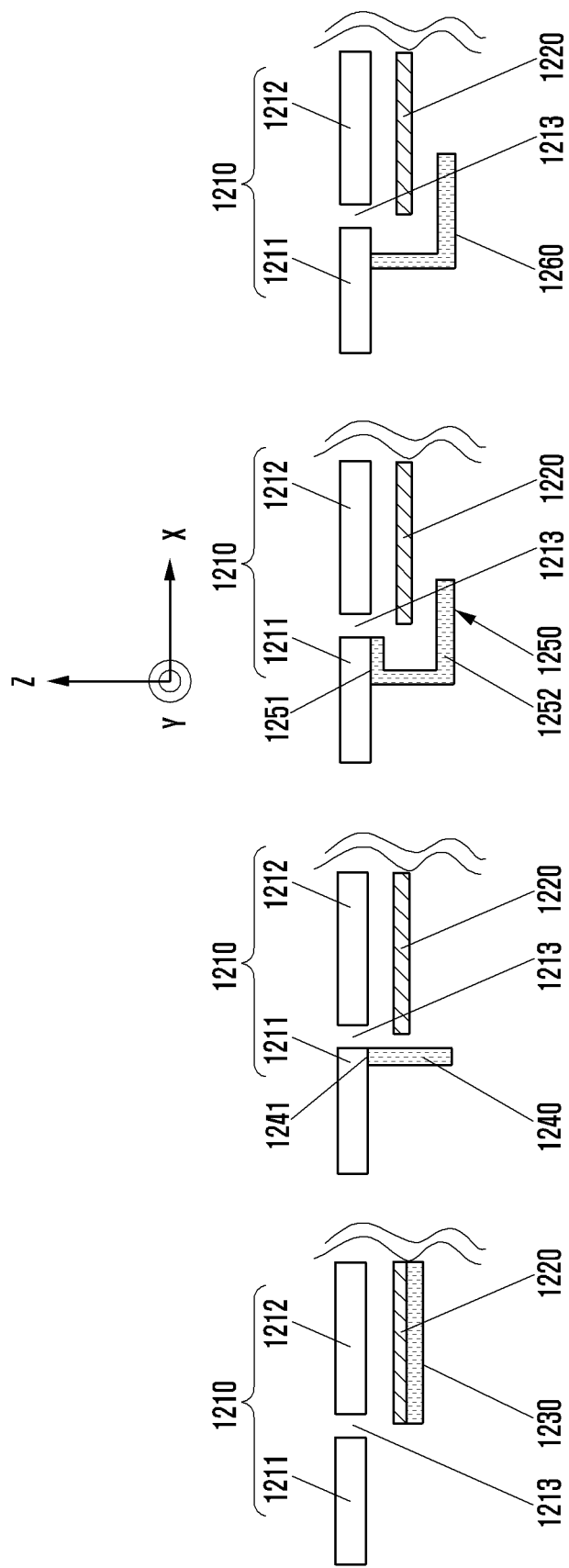

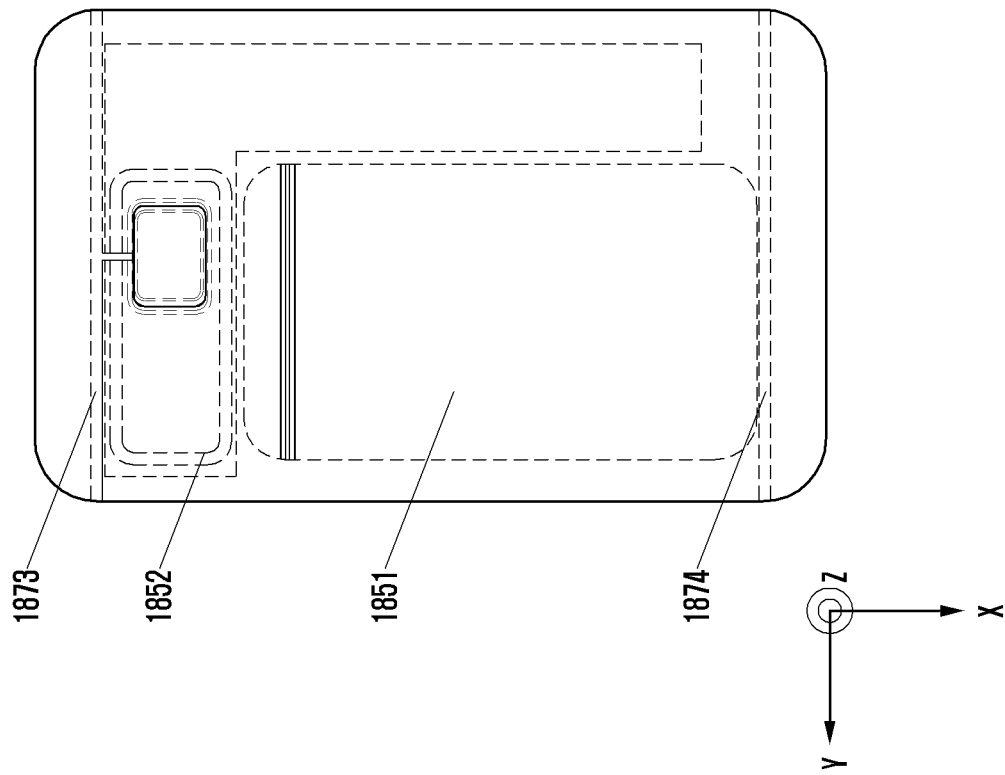
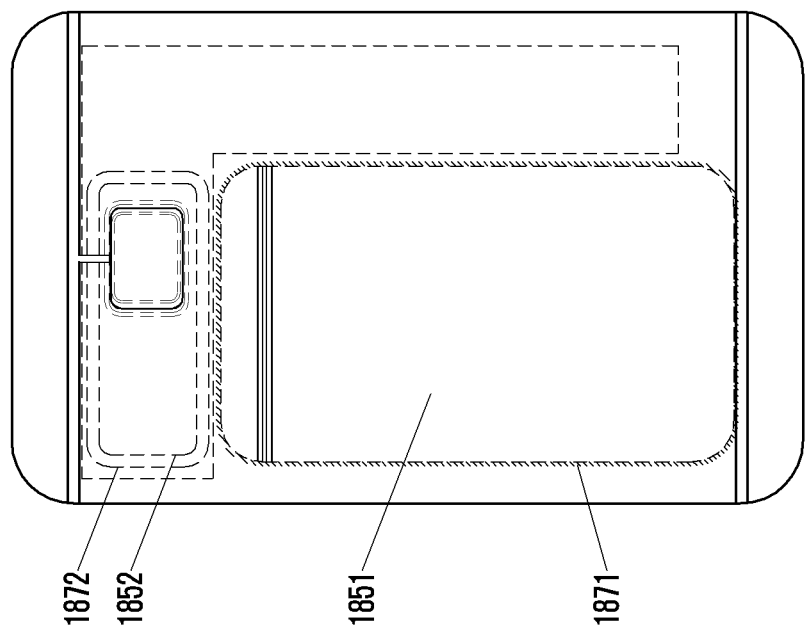

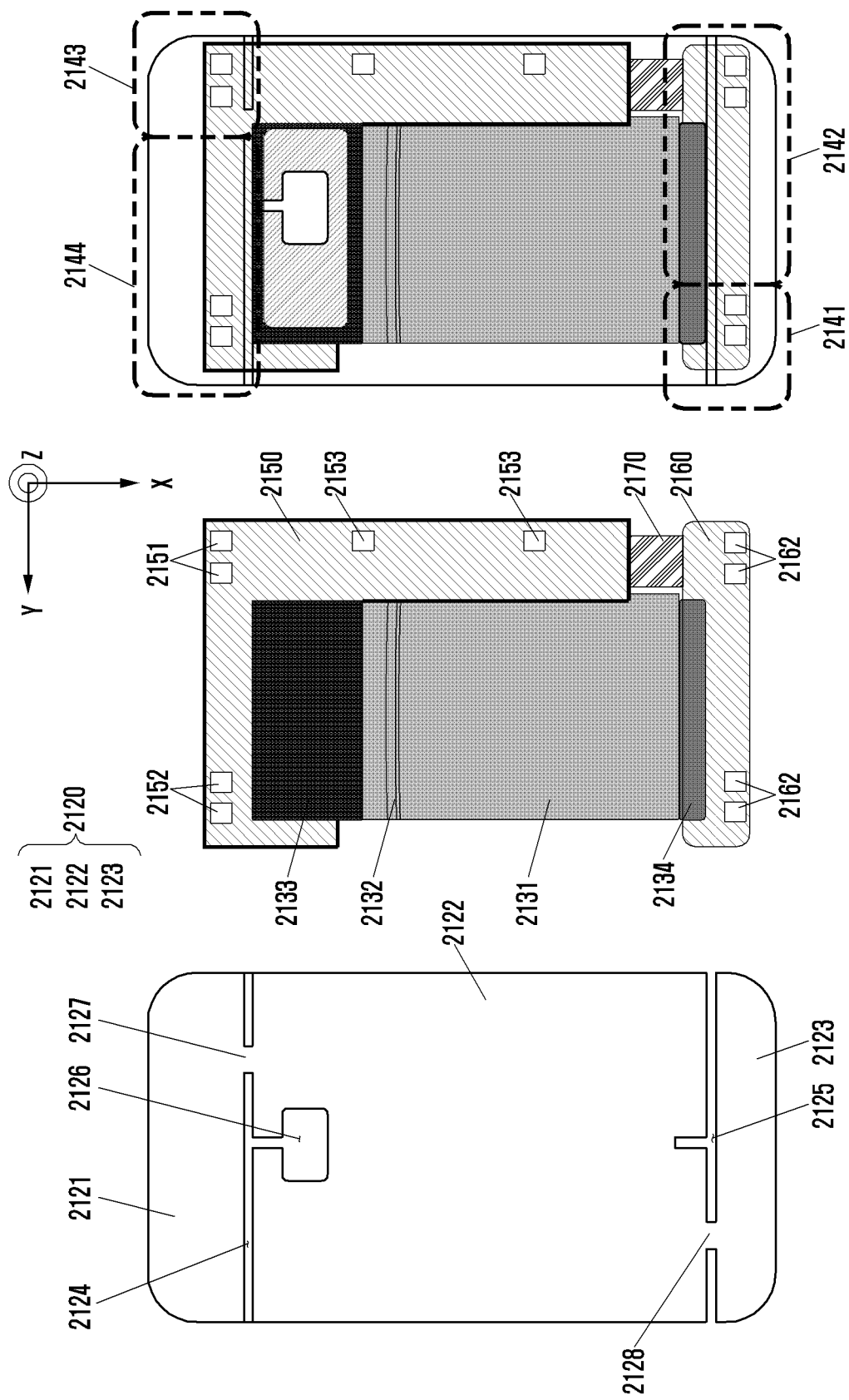

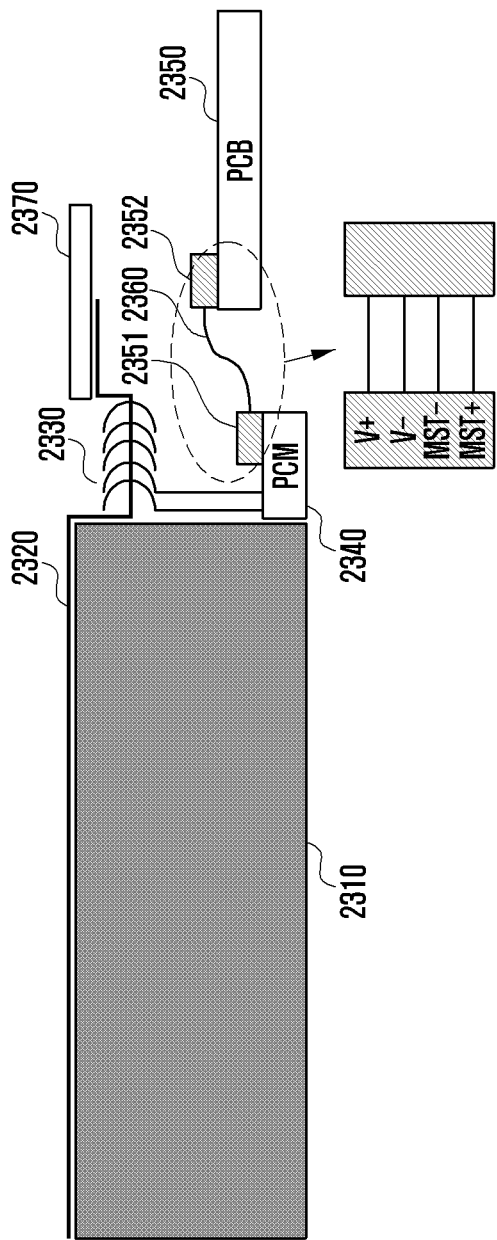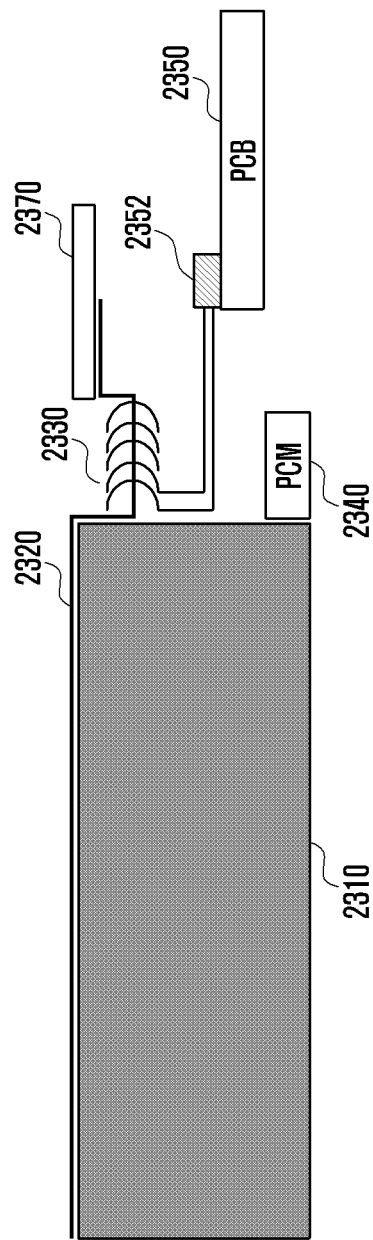

| SPECIFI-CATION | Default |
|---|---|
| MST Score | 77 |

| SPECIFI-CATION | REMOVED PART OF MU-METAL |
|---|---|
| MST Score | 42 |

| SPECIFI-CATION | INSTALLATION OF WPC COIL |
|---|---|
| MST Score | 58 |

| SPECIFI-CATION | AWS sheet ADHESION ($\mu$=750, 0.11T) |
|---|---|
| MST Score | 67 |

| SPECIFI-CATION | AWS sheet ADHESION ($\mu$=750, 0.15T) |
|---|---|
| MST Score | 71 |

| SPECIFI-CATION | AWS sheet ADHESION ($\mu$=750, 0.15T) + REMOVE PART OF AREA |
|---|---|
| MST Score | 74 |

| Metal Cover Type | Full Metal Type (COMPLETE METAL WITHOUT SLIT) |
|---|---|
| Sheet Type | WITHOUT ADDITION OF SHEET |
| MST Score | 42 |

| Metal Cover Type | Partial Metal Slit Type (Slit 1.5mm) |
|---|---|
| Sheet Type | ADDITION OF UPPER/LOWER SLIT WITHOUT ADDITION OF SHEET |
| MST Score | 56 |

| Metal Cover Type | Partial Metal Slit Type (Slit 1.5mm) |
|---|---|
| Sheet Type | ADDITION OF UPPER/ LOWER SLIT + UPPER SHEET |
| MST Score | 78 |

| Metal Cover Type | Partial Metal Slit Type (Slit 1.5mm) |
|---|---|
| Sheet Type | ADDITION OF UPPER/ LOWER SLIT + UPPER SHEET + LOWER SHEET |
| MST Score | 80 |

| Metal Cover Type | Partial Metal Slit Type (Slit 1.5mm) |
|---|---|
| Sheet Type | ADDITION OF SLIT + UPPER/ LOWER SHEET + CONNECTION UNIT |
| MST Score | 76 |

ELECTRONIC DEVICE HAVING LOOP ANTENNA

PRIORITY

This application claims priority under 35 U.S.C. § 119(a) to a Korean Patent Application filed on Aug. 26, 2016 in the Korean Intellectual Property Office and assigned Serial Number 10-2016-0109070, the contents of which are incorporated herein by reference.

BACKGROUND

1. Field of the Disclosure

The present disclosure relates generally to electronic devices having a loop antenna, and more particularly, to electronic devices that are capable of emitting a magnetic field signal including payment information using a loop antenna.

2. Description of Related Art

In general, card reading apparatuses, such as point of sales (POS) terminals, are equipped with a coil and a header for reading information from magnetic stripe tracks of a magnetic card. A track refers to card data recorded in a magnetic strip line of a magnetic card, and having formats such as a start sentinel (SS), end sentinel (ES), and longitudinal redundancy check character (LRC).

If a track of a magnetic card is swiped over the header of the rail of a card reading apparatus, the magnetic flux passing through the coil connected to the header changes, thereby inducing current and enabling the card reading apparatus to read and process card data recorded on the track from the induced current.

Electronic devices generally include a module to enable magnetic field communication with other devices via the module.

Electronic devices also generally include an antenna for performing magnetic field communication; however, the space afforded to electronic devices for receiving an antenna decreases proportionately as the size of electronic devices decreases, despite the ever-increasing functions of electronic devices. Furthermore, equipping electronic devices with various types of antennas in their limited space is disadvantageous in terms of performance. That is, various components of electronic devices are formed of conductive materials such as metals, which cause transmission/reception performance degradation of the antennas.

As such, there is a need in the art for improved radiation performance in electronic devices including antennas.

SUMMARY

The present disclosure has been made to address the above problems and disadvantages, and to provide at least the advantages described below. Accordingly, an aspect of the present disclosure is to provide electronic devices capable of securing the improved radiation performance.

Another aspect of the present disclosure is to provide electronic devices that are capable of emitting a magnetic field signal including payment information using a loop antenna.

In accordance with an aspect of the present disclosure, an electronic device includes a housing including a first surface facing in a first direction, a second surface facing in a second direction opposite the first direction, and a side member surrounding at least a portion of a space between the first surface and the second surface; an inner structure positioned between the first surface and the second surface, a conductive coil positioned inside the housing, the conductive coil having an axis substantially perpendicular to the first direction or the second direction, and being wound around a portion of the inner structure, a communication circuit positioned inside the housing, the communication circuit being configured to cause the conductive coil to generate a magnetic flux, a display exposed through at least a portion of the first surface, and a processor positioned inside the housing, the processor being electrically connected to the communication circuit and the display, wherein the second surface comprises a first portion which is formed of a conductive material and includes two openings separated from each other, a second portion which is formed of a non-conductive material and fills one of the two openings, and a third portion which is formed of a non-conductive material and fills another of the two openings, the conductive coil is positioned generally under the first portion when viewed from above the second surface, and the inner structure extends between the two openings when viewed from above the second surface, and enables the generated magnetic flux to penetrate through the two openings.

In accordance with another aspect of the present disclosure, an electronic device includes a front side cover, a rear side cover having at least a flat portion, an inner structure which is positioned between the front side cover and the rear side cover, in parallel to the flat portion of the rear side cover, a conductive coil which has an axis parallel to the flat portion of the rear side cover and encloses a portion of the inner structure, a communication circuit configured to generate a magnetic flux using the conductive coil, a display which is positioned between the front side cover and the inner structure and is exposed through the front side cover, and a processor electrically connected to the communication circuit and the display, wherein the flat portion of the rear side cover comprises a first portion which is formed of a conductive material and includes two openings separated from each other, a second portion which is formed of a non-conductive material and fills one of the two openings, and a third portion which is formed of a non-conductive material and fills another of the two openings, the conductive coil is positioned between the first portion and the display, and the inner structure extends between the two openings and enables the generated magnetic flux to penetrate through the two openings.

In accordance with another aspect of the present disclosure, an electronic device includes a front side cover, a rear side metal cover having an opening, a display which is positioned between the front side cover and the rear side metal cover and is exposed through the front side cover, a metal plate which is positioned between the rear side metal cover and the display, is parallel to the rear side metal cover, and has an end portion disposed below the opening, a conductive coil wound around a portion of the metal plate, and a communication circuit electrically connected to the conductive coil.

BRIEF DESCRIPTION OF THE DRAWINGS

The above and other aspects, features, and advantages of the present disclosure will be more apparent from the following detailed description, taken in conjunction with the accompanying drawings, in which:

FIGS. 7A and 7B illustrate various materials of a solenoid type of loop antenna installed to an electronic device according to embodiments of the present disclosure;

FIGS. 9A, 9B, 9C, 9D and 9E illustrate various locations of an end of a loop antenna to increase the radiation efficiency in an electronic device according to embodiments of the present disclosure;

FIGS. 10A, 10B, 10C, 10D and 10E illustrate various locations and forms of an end of a loop antenna to increase the radiation efficiency in an electronic device according to embodiments of the present disclosure;

FIGS. 11A, 11B, 11C and 11D illustrate various forms of an end of a loop antenna to increase the radiation efficiency in an electronic device according to embodiments of the present disclosure;

FIGS. 12A, 12B, 12C and 12D illustrate a shielding material of various types of structure, installed to an electronic device according to embodiments of the present disclosure;

FIGS. 18A and 18B illustrate an electronic device having a solenoid type of loop antenna according to embodiments of the present disclosure;

FIGS. 21A, 21B and 21C illustrate an electronic device having a solenoid type of loop antenna according to embodiments of the present disclosure;

FIGS. 23A and 23B illustrate the connection of a solenoid type of loop antenna and a substrate in an electronic device, according to embodiments of the present disclosure;

DETAILED DESCRIPTION

Figure 1A:
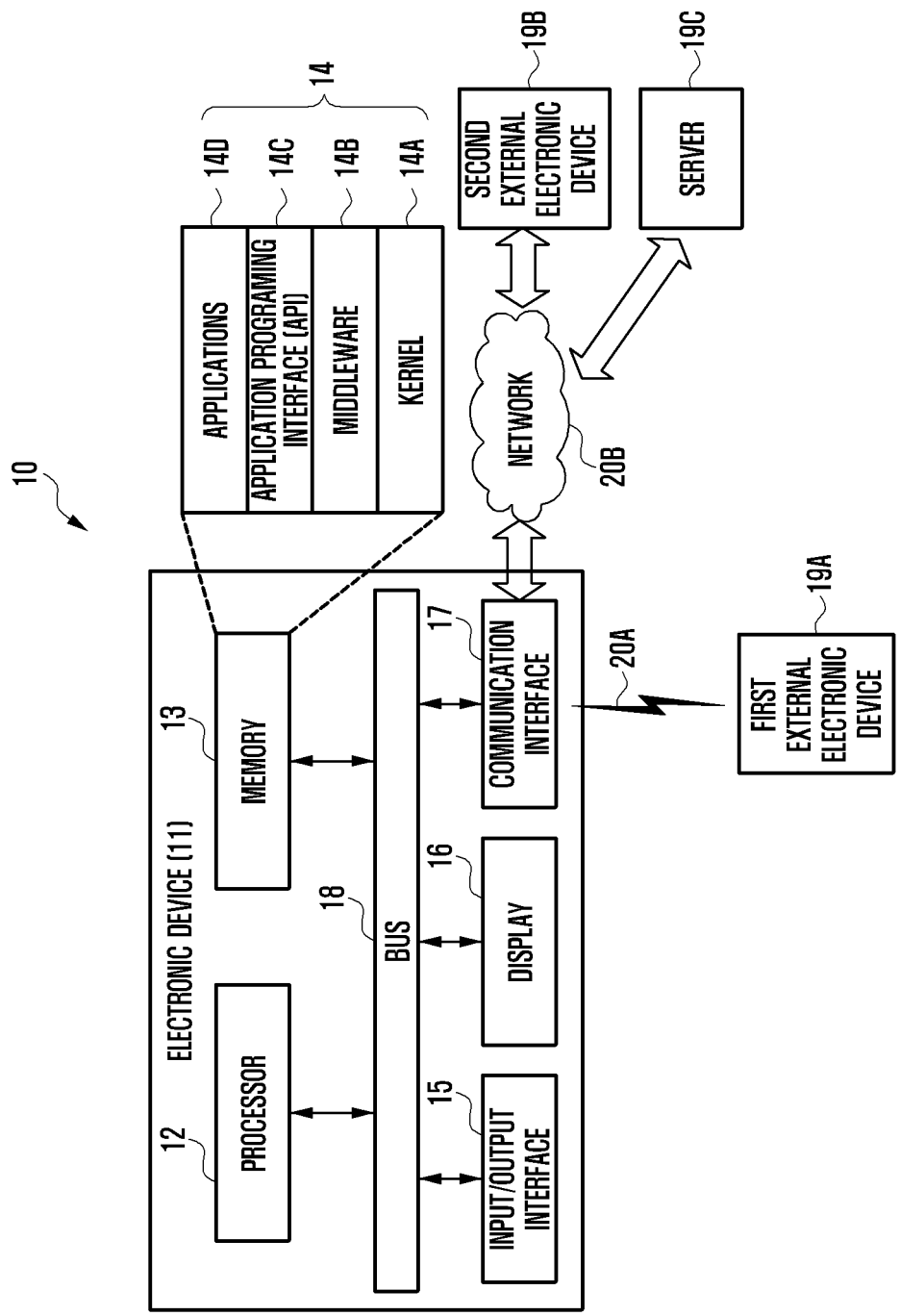
FIG. 1A is a block diagram illustrating the configuration of a handheld electronic device according to embodiments of the present disclosure.

The present disclosure is described with reference to the accompanying drawings. Although specific embodiments are illustrated in the drawings and related detailed descriptions are discussed, the present disclosure is not limited thereto, and may have various modifications and several embodiments. It should be understood that the present disclosure includes all changes and/or equivalents and substitutes included in the spirit and scope of embodiments of the present disclosure. In connection with descriptions of the drawings, similar components are designated by the same reference numeral. Detailed descriptions of well known functions and/or configurations will be omitted for the sake of clarity and conciseness.

In embodiments of the present disclosure, expressions such as "include", "have", "may include" or "may have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In embodiments of the present disclosure, the expressions "or" or "at least one of A or/and B" include any or all of combinations of words listed together. For example, the expressions "A or B" or "at least A or/and B" may include A, B, or both A and B.

The terms "1st", "2nd", "first", or "second" used in embodiments of the present disclosure may modify various components of the embodiments but do not limit the corresponding components. For example, the above expressions do not limit the sequence and/or importance of the components. The expressions may be used for distinguishing one component from other components. For example, a first user device and a second user device indicate different user devices although both are user devices, a first structural element may be referred to as a second structural element, and the second structural element also may be referred to as the first structural element.

When it is stated that a component is "(operatively or communicatively) coupled to" or "connected to" another component, the component may be directly coupled or connected to another component or an additional component may exist between the component and another component. In contrast, when it is stated that a component is "directly coupled to" or "directly connected to" another component, an additional component does not exist between the component and another component. In the present disclosure, the expression "configured (or set) to do" may be interchangeably used with, for example, "suitable for doing," "having the capacity to do," "designed to do," "adapted to do," "made to do," or "capable of doing." The expression "configured (or set) to do" may not be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer to a dedicated processor or a generic-purpose processor that may execute one or more software programs stored in a memory device to perform corresponding functions.

In the present disclosure, the term 'screen' may refer to the displaying area of a display unit. For example, in the expressions 'a card (or image thereof) is displayed on the screen,' 'the display unit displays a card on the screen,' and 'the controller controls the display unit to display a card on the screen,' the term 'screen' is used in the sense of a displaying area of the display unit. In addition, the term 'screen' may refer to a displayed object shown on the display unit. For example, in the expressions 'a card screen is displayed,' 'the display unit displays a card screen,' and 'the controller controls the display unit to display a card screen,' the term 'screen' is used in the sense of a displayed object shown on the display unit.

The terms used in describing embodiments of the present disclosure are only examples for describing a specific embodiment but do not limit the embodiments of the present disclosure. Singular forms are intended to include plural forms unless the context clearly indicates otherwise. Unless defined differently, all terms used herein, which include technical or scientific terminologies, have the same meaning as that understood by a person skilled in the art to which the present disclosure pertains. Such terms as those defined in a generally used dictionary are to be interpreted to have the same meanings as the contextual meanings in the relevant field of art, and are not to be interpreted to have ideal or excessively formal meanings unless clearly defined in the present description.

An electronic device according to embodiments of the present disclosure may include a communication function, and may be one or a combination of a smart phone, a tablet personal computer (PC), a mobile phone, a video phone, an e-book reader, a desktop PC, a laptop PC, a netbook computer, a personal digital assistant (PDA), a camera, a wearable device, such as a head-mounted-device (HMD) including electronic glasses, electronic clothes, an electronic bracelet, an electronic necklace, an electronic appcessary, an electronic tattoo, and a smart watch.

According to some embodiments, the electronic device may be a smart home appliance having a communication function, such as at least one of a television (TV), a digital video disk (DVD) player, an audio player, an air conditioner, a cleaner, an oven, a microwave oven, a washing machine, an air cleaner, a set-top box, a TV box (for example, Samsung HomeSync™, Apple TV™, or Google TV™), game consoles, an electronic dictionary, an electronic key, a camcorder, and an electronic frame.

According to some embodiments, the electronic device may include at least one of various types of medical devices including a magnetic resonance angiography (MRA), magnetic resonance imaging (MRI), computed tomography (CT), scanner, and ultrasonic device, a navigation device, a global positioning system (GPS) receiver, an event data recorder (EDR), a flight data recorder (FDR), a vehicle infotainment device, electronic equipment for a ship, such as a navigation device for ship or a gyro compass, avionics, a security device, a head unit for a vehicle, an industrial or home robot, an automated teller machine (ATM), and a point of sales (POS) device.

According to some embodiments, the electronic device may include at least one piece of furniture or a portion of a building/structure, an electronic board, an electronic signature receiving device, a projector, and various types of measuring devices having a camera function, such as a water, electricity, gas, and radio wave meter. The electronic device according to embodiments of the present disclosure may be one or a combination of the above described various devices, and may be a flexible device, but are not limited to the above described devices.

A handheld electronic device according to embodiments of the present disclosure may include a combination of the above-listed components or devices and may also be a flexible device, but is not limited to the aforementioned devices.

When a handheld electronic device according to embodiments of the present disclosure produces a magnetic field signal, a card reading apparatus is capable of producing the same amount of current as a magnetic card is swiped over the header of the card reading apparatus. That is, the user makes a payment as he/she holds the handheld electronic device up to or near a card reading apparatus.

Magnetic field communication may be implemented with near field communication (NFC), magnetic secure transmission or near field magnetic data stripe transmission (MST), for example. These communication methods are distinguished from each other, in terms of data rate (bit/sec), communication range, and frequency band. While NFC provides bidirectional communication capability, MST has unidirectional communication capability, such as one party transmitting information without a ping signal and another party simultaneously receiving the information.

The term "user" used in embodiments may refer to a person who uses an electronic device or an artificial intelligence electronic device which uses an electronic device.

FIG. 1A illustrates an electronic device 11 in a network environment 10 according to embodiments of the present disclosure. The electronic device 11 is capable of including a bus 18, a processor 12, a memory 13, an input/output interface 15, a display 16, and a communication interface 17. The electronic device 11 may be configured by removing at least one of the above described components or further including other components.

The bus 18 may include a circuit capable of connecting and transmitting communications between the above described components.

The processor 12 is capable of including at least one of a central processing unit (CPU), an application processor (AP), and a communication processor (CP), and is capable of controlling at least one of other components of the electronic device 11 and/or processing data or operations related to communication.

The memory 13 is capable of including volatile memory and/or non-volatile memory, and storing data or commands related to at least one of other components of the electronic device 11, such as software and/or a program module 14 including a kernel 14A, middleware 14B, application programming interface (API) 14C, and applications 14D. The kernel 14A, middleware 14B, or at least a portion of the API 14C may be referred to as an operating system (OS).

The kernel 14A is capable of controlling or managing system resources, such as the bus 18, processor 12, and memory 13, used to execute operations or functions of other programs, such as the middleware 14B, API 14C, and applications 14D, and provides an interface capable of enabling the these components to access and control/manage the individual components of the electronic device 11.

The middleware 14B is capable of mediating between the API 14C or applications 14D and the kernel 14A so that the API 14C or the applications 14D can communicate and exchange data with the kernel 14A.

The middleware 14B is capable of processing one or more task requests received from the application programs 14D according to priority, such as by assigning the priority for use of system resources of the electronic device 11 to at least one of the application programs 14D. For example, the middleware 14B processes one or more task requests according to the priority assigned to at least one application program, thereby performing scheduling or load balancing for the task requests.

The API 14C is configured to enable the applications 14D to control functions provided by the kernel 14A or the middleware 14B, and is capable of including at least one interface or function for file control, window control, image processing, or text control.

The input/output interface 15 is capable of transferring instructions or data, received from the user or external devices, to one or more components of the electronic device 11, and outputting instructions or data, received from one or more components of the electronic device 11, to the user or external devices.

The display module 16 is capable of including a liquid crystal display (LCD), a flexible display, a transparent display, a light emitting diode (LED) display, an organic light emitting diode (OLED) display, micro-electro-mechanical systems (MEMS) display, or an electronic paper display, is capable of displaying various types of content, such as texts, images, videos, icons, or symbols, and may also be implemented with a touch screen for receiving touches, gestures, proximity inputs or hovering inputs, via a stylus pen, or a user's body.

The communication interface 17 is capable of establishing communication between the electronic device 11 and an external device, such as a first external electronic device 19A, a second external electronic device 19B, or a server 19C, and is capable of communicating with the external device connected to the network 20B via wired or wireless communication.

Wireless communication may employ, as cellular communication protocol, at least one of long-term evolution (LTE), LTE advanced (LTE-A), code division multiple access (CDMA), wideband CDMA (WCDMA), universal mobile telecommunications system (UMTS), wireless broadband (WiBro), and global system for mobile communication (GSM). Wireless communication may also include short-range communication 20A, such as wireless fidelity (WiFi), Bluetooth® (BT), near field communication (NFC), magnetic secure transmission (MST), and global navigation satellite system (including at least one of global positioning system (GPS), global navigation satellite system (Glonass), Beidou navigation satellite system (hereinafter Beidou), Galileo, and the European global satellite-based navigation system, according to GNSS—using areas and bandwidths.

In the present disclosure, "GPS" and "GNSS" may be used interchangeably. Wired communication may include at least one of universal serial bus (USB), high definition multimedia interface (HDMI), recommended standard 232 (RS-232), and plain old telephone service (POTS). The network 20B may include at least one of a telecommunications network, such as a local area network (LAN) or wide area network (WAN), the Internet, and a telephone network.

It should be understood that the first and second external electronic devices 19A and 19B may be identical or differ in type to or from the electronic device 11. The server 19C may include one or more groups of servers. A portion or all of the operations executed on the electronic device 11 may also be executed on one or more electronic devices, such as electronic devices 19A and 19B or a server 19C. If the electronic device 11 needs to provide a function or service in an automatic manner or according to a request, the electronic device 11 may not perform the function or service, and instead, may request one of the other devices to execute at least a portion of the functions related to the function or service. In this case, the other devices may execute the requested function or an additional function and may transmit the results to the electronic device 11, which may process the received result or may further process the received result with additional processes to provide the processed requested, function, or service. To this end, the devices may employ cloud, distribution, or client-server computing technologies.

Figure 1B:
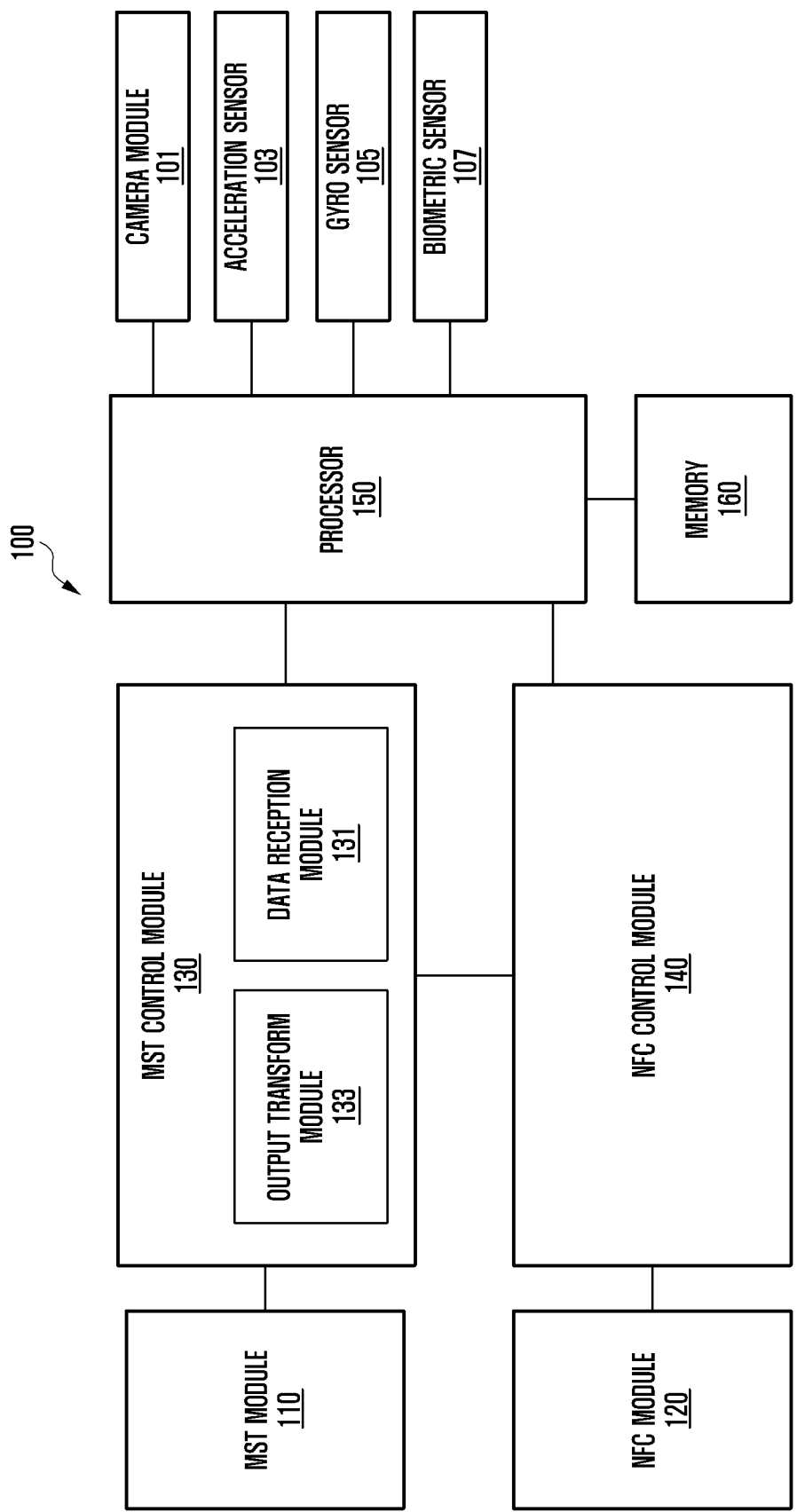
FIG. 1B is a block diagram of an electronic device capable of performing a payment function according to embodiments of the present disclosure.

FIG. 1B is a block diagram illustrating a configuration of an electronic device 100 capable of performing a payment function according to embodiments of the present disclosure. In FIG. 1B, the electronic device 100 is capable of including a camera module 101, an acceleration sensor 103, a gyro sensor 105, a biometric sensor 107, an MST module 110, an NFC module 120, an MST control module 130, an NFC control module 140, a processor 150, and a memory 160.

The camera module 101 is capable of taking an image of a card to make a payment and obtaining the card information, and recognizing card information, such as card issuing company, card number, expiration date, or card holder name, recorded on a card, via an optical character reader (OCR) function. Alternatively, a user may directly input card information to his/her electronic device, using an input device of the electronic device, such as a touch panel, a pen sensor, keys, an ultrasonic input system, or a microphone.

The acceleration sensor 103 or gyro sensor 105 is capable of obtaining location information regarding the electronic device when payment is performed, and transferring the obtained location information to the processor 150. The processor 150 controls the current supplied to an antenna of the MST module 110, based on the location information regarding the electronic device, to control the intensity of a magnetic field emitted to a POS terminal. Alternatively, if the MST module 110 has a plurality of coil antennas, the processor 150 may select a coil antenna to be used.

The biometric sensor 107 is capable of obtaining user biometric information, such as fingerprint or iris, to authenticate a card for payment or a user.

The MST module 110 is capable of including a coil antenna. The MST control module 130 is capable of supplying voltage to both ends of the coil antenna, in different polarity, according to data, such as a binary value, 0 or 1, thereby controlling the direction of electric current flowing in the coil antenna. The signal emitted from the coil antenna (or a magnetic field signal induced by electric current flowing in the coil) produces induced electromotive force in a POS terminal as if a magnetic card is read by the POS terminal.

The MST control module 130 is capable of including a data reception module 131 and an output transform module 133. The data reception module 131 is capable of receiving a logical high/low pulse containing payment information from the processor 150 (or a built-in security module of the electronic device 100).

The output transform module 133 is implemented with a circuit that is capable of transforming data, recognized by the data reception module 131, to a corresponding format of data to be transmitted to the MST module 110. The circuit may include an H-bridge circuit configured to alternate the polarity of voltage supplied to both ends of the MST module 110.

The NFC module 120 is capable of including a coil antenna. The NFC control module 140 is capable of transmitting card information to a card reading apparatus via the coil antenna.

The electronic device 100 is capable of receiving information regarding a card via the camera module 101 or an input device, such as a touch panel or a pen sensor, and based on the card information, payment information, such as Track 1, Track 2, Track 3, or token information, contained in at least a portion of the magnetic strip of the magnetic card, from a card issuing company/bank server via a communication module. The electronic device 100 is capable of storing the payment information, as a corresponding format, in the memory 160 or a built-in security module.

Figure 2:
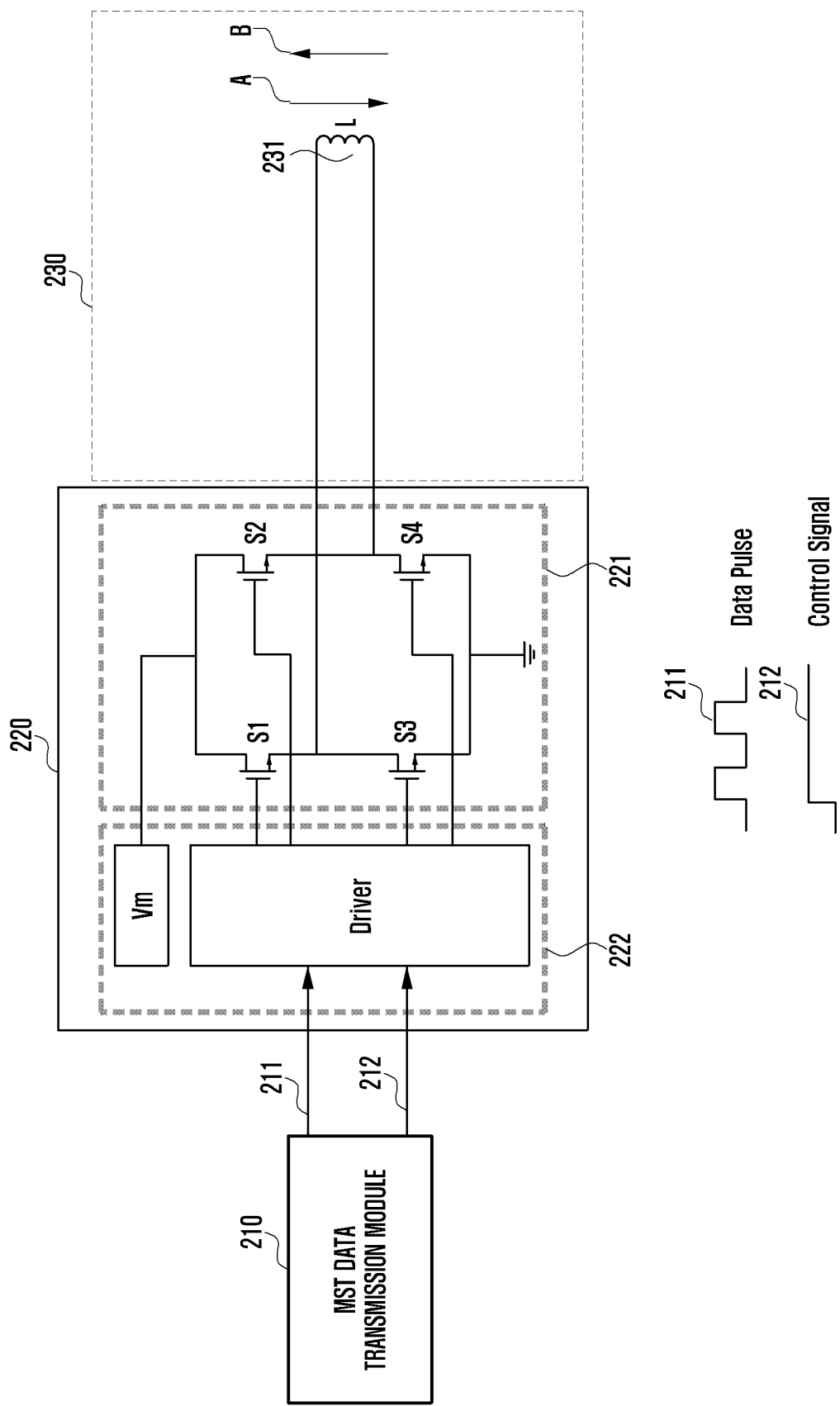
FIG. 2 is a diagram illustrating an electronic device capable of performing a payment function using magnetic data stripe transmission (MST), according to embodiments of the present disclosure.

FIG. 2 is a diagram illustrating an electronic device capable of performing a payment function using MST, according to embodiments of the present disclosure.

The MST data transmission module 210 is capable of transmitting information required for payment to an MST control module 220, and may be a processor, a secure area (trust zone, secure world) in the processor, or a security module (eSE/UICC) embedded in an electronic device. The MST data transmission module 210 is capable of transmitting, to the MST control module 220, a control signal 212, along with data pulse 211, for enabling an MST output module 230 to be activated for a required time, such as a period of time required to periodically emit a preset number of MST signals. In other embodiments, the MST data transmission module 210 is capable of transmitting differential types of data which have different phases, distinguishing data of Track 1, Track 2, or Track 3, contained in a magnetic card, from each other, based on times, and sequentially transmitting the data, interleaving data of Track 1, Track 2, or Track 3 with each other and transmitting the interleaved results, inverting at least a portion of the data of Track 1, Track 2, or Track 3, such as altering the order of data from 11110101 to 10101111, and then transmitting the result, or sequentially transmitting a simple sequence including a piece of track data for one cycle, a complex sequence including a number of pieces of track data for one cycle, and a simple sequence and a complex sequence.

A data reception module 222 of the MST control module 220 is capable of recognizing the state of the received pulse data and logical low/high pulse data, as data, such as a binary value of 0 or 1. Alternatively, the data reception module 222 detects the number of transitions between low and high states for a preset period of time, and recognizes the result as data. For example, if the data reception module 222 ascertains that the number of transitions between low and high states for a preset period of time is one and two, the data reception module 222 recognizes the results as "0 (zero)" and "1 (one)" binary values, respectively.

The output transition module 221 of the MST control module 220 may include a circuit which transforms data, recognized by the data reception module 222, to a corresponding format of data and transfers the transformed data to the MST module 230. The circuit is configured to include first, second, third, and fourth switches S1, S2, S3, and S4. The first and fourth switches S1 and S4 may have the same control state, and the second and third switches S2 and S3 may have the same control state.

The polarity of voltage supplied to both ends of the coil antenna 231 may be altered according to the control states of the switches. In this case, the level of voltage supplied to the coil antenna 231 is Vm. For example, if the pulse state is "0 (zero)" bit, the data reception module 222 turns the first and fourth switches on and the second and third switches off, or vice versa, namely, the data reception module 222 turns the first and fourth switches off and the second and third switches on. In addition, if the pulse state is "1 (one)" bit, the data reception module 222 turns the first and fourth switches off and the second and third switches on, or vice versa, namely, the data reception module 222 turns the first and fourth switches on and the second and third switches off. The output transition module 221 alters the polarity of voltage (direction of current) supplied to both ends of the coil antenna 231 according to the data recognized by the data reception module 222, thereby changing the direction of a magnetic field emitted to an external device, such as a POS terminal, via the coil antenna.

For example, if the pulse state is zero bits, the voltage level applied to the coil antenna 231 may be Vm and the direction of current may be direction A. If the pulse state is one bit, the voltage level applied to the coil antenna 231 may be Vm and the direction of current may be direction B opposite direction A. The magnetic field produced by the coil antenna may be similar in type to a magnetic field generated when a magnetic card is swiped over a POS terminal. The switches S1, S2, S3, and S4 may be implemented with at least one of N-type transistors, such as metal oxide semiconductor field effect transistor (MOSFET), P-type transistors, or relays.

The MST output module 230 is capable of including a coil antenna 231, and may further include inductors, capacitors, resistors, and an amplifier for amplifying signals. The coil antenna 231 may also be used for NFC or wireless charging, and may be implemented with a number of coil antennas.

Figure 3A:
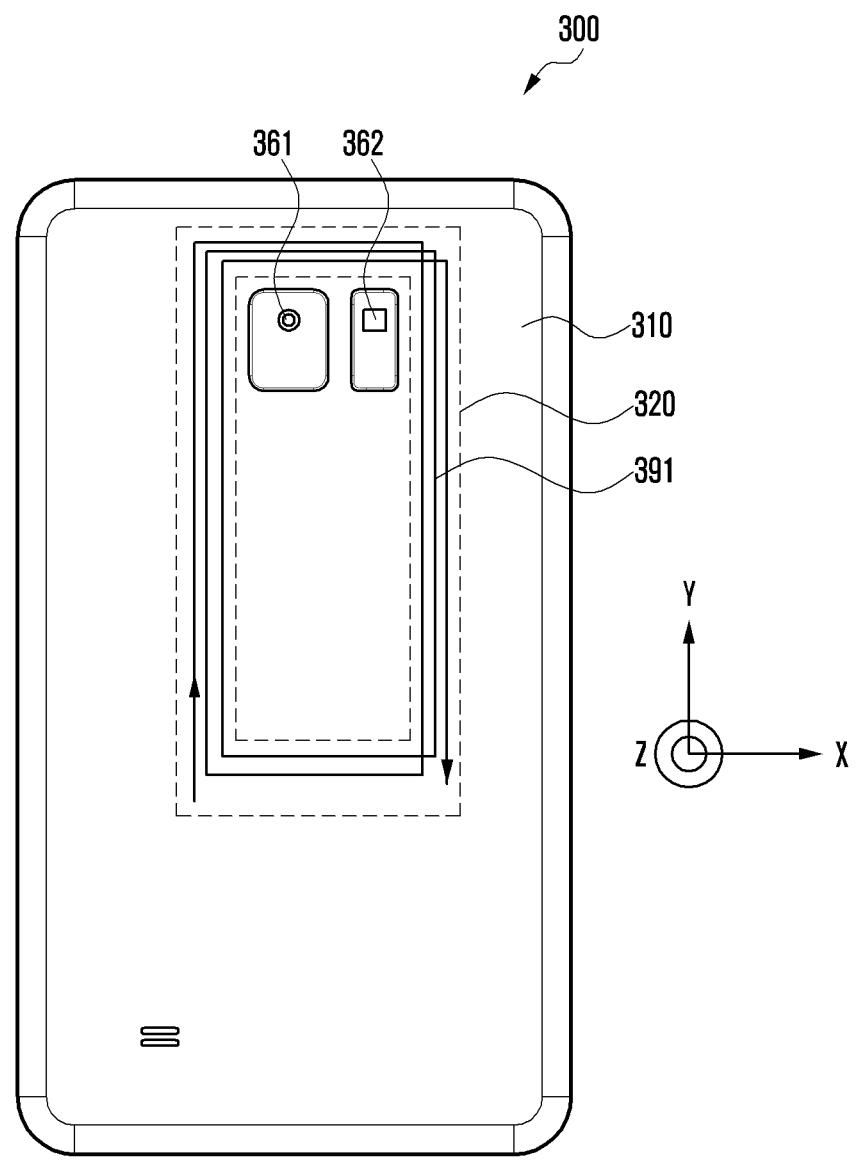
FIGS. 3A and 3B illustrate an electronic device having a flat type of loop antenna according to embodiments of the present disclosure.
Figure 3B:
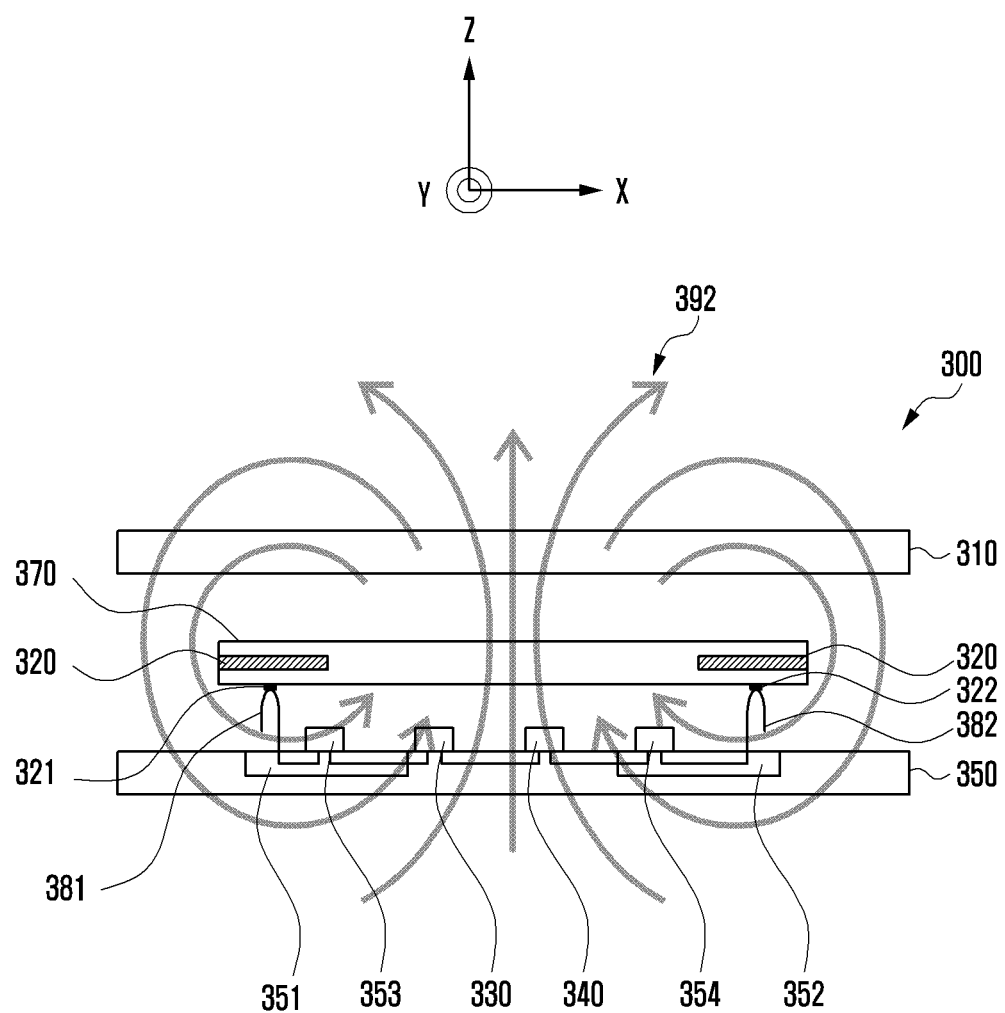

FIGS. 3A and 3B illustrate an electronic device having a flat type of loop antenna according to embodiments of the present disclosure. FIG. 3A illustrates the rear side of an electronic device and a current path of the loop antenna, and FIG. 3B illustrates the cross-sectional view of the electronic device and the magnetic field produced by the loop antenna.

In FIGS. 3A and 3B, an electronic device 300 is capable of including a cover 310, a loop antenna 320, a coupling module 330, a communication module 340, and a substrate 350.

The cover 310 forms the rear side of the electronic device 300 and may be made of a non-conductive material, such as plastic or glass. The cover 310 may form openings through which components of the electronic device 300 are exposed. For example, a camera 361 may exposed through a first opening and a flash and sensor 362 may be exposed through a second opening.

The loop antenna 320 may be implemented with a flat type of coil helically wound about the Z-axis, enabling the loop antenna 320 to generate a magnetic field in the direction (Z-axis direction) perpendicular to the rear side (X-Y plane) of the electronic device 300. The flat coil may be included in a flexible printed circuit board (FPCB) 370, which may be attached to a side of the bottom of the cover 310.

The coupling module 330 is capable of including various electric circuits configured with a passive device, an active device, a micro strip line, a strip line, an interdigital structure, or a combination of two or more thereof. The electric circuit is capable of changing the impedance corresponding to the loop antenna 320 according to characteristics, such as capacitance, inductance, or resistance. The passive device is capable of including at least one of a capacitor, an inductor, and a resistor. The active device is capable of including at least one of a diode, a field effect transistor (FET), and a bipolar junction transistor (BJT). The interdigital structure may be implemented in such a manner that a passive device and/or an active device are formed of a chip or a package or on a substrate 350. The electric circuit is capable of compensating the physical dimension of the loop antenna 320 by adjusting the electrical length of the loop antenna 320.

The communication module 340 performs communication between the electronic device 300 and another electronic device that are connected via a network, and transmits/receives data to/from other electronic devices via the loop antenna 320.

The substrate 350 is capable of providing electric signals to the loop antenna 320, may be implemented with a printed circuit board (PCB) and/or an FPCB, is capable of feeding current to the loop antenna 320 and receiving current from the loop antenna 320, and may serve as a ground plate for grounding the loop antenna 320. The coupling module 330 and the communication module 340 are formed on the substrate 350, are electrically connected to each other via wires, and are electrically connected to the loop antenna 320 via a first coupling contact 381 and a second coupling contact 382, respectively. For example, the first coupling contact 381 and the second coupling contact 382 are electrically connected to a first power supply contact 321 and a second power supply contact 322, respectively, of the loop antenna 320. The first coupling contact 381 and the second coupling contact 382 may be elastic pins, such as C-clips.

The substrate 350 may have a first dielectric 351 and a second dielectric 352. The first coupling contact 381 and the second coupling contact 382 may be mounted on the first dielectric 351 and the second dielectric 352, respectively. The first coupling contact 381 may be connected to the coupling module 330 through the first capacitor 353. The second coupling contact 382 may be connected to the communication module 340 through the second capacitor 354. The capacitors 353 and 354 are employed to prevent electric shock, and have a capacitance of about 10-1000 pF.

If current is supplied from the communication module 340 to the first power supply contact 321 or the second power supply contact 322 of the loop antenna 320, current flows from a corresponding power supply contact, such as first power supply contact 321, to another power supply contact, such as second power supply contact 322, which forms a current path 391 helically about the Z-axis. The current path 391 forms a magnetic field 392 in the Z-axis direction perpendicular to the current direction (i.e., the rear side or X-Y plane of the electronic device 300). A signal of a specific frequency is selected, corresponding to the length of the current path 391 of the loop antenna 320. The selected signal is emitted outside the electronic device 300 through the cover 310 formed of a non-conductive material. The loop antenna 320 receives an RF signal of a specific frequency according to the reciprocal principle of an antenna, converts the signal to current, and transfers the current to the communication module 340.

Figure 4A:
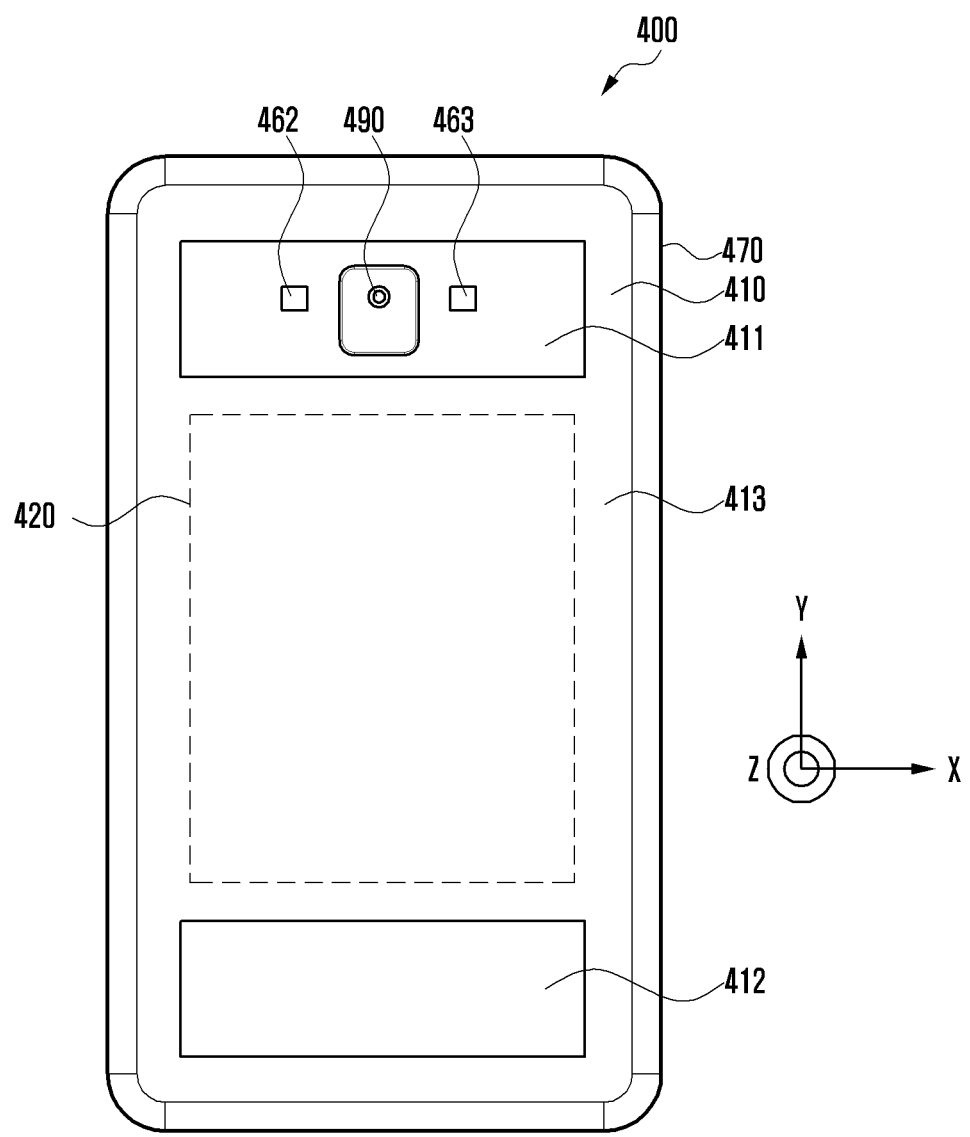
FIGS. 4A, 4B, 4C, 4D, 4E and 4F illustrate an electronic device having a solenoid type of loop antenna according to embodiments of the present disclosure.
Figure 4B:
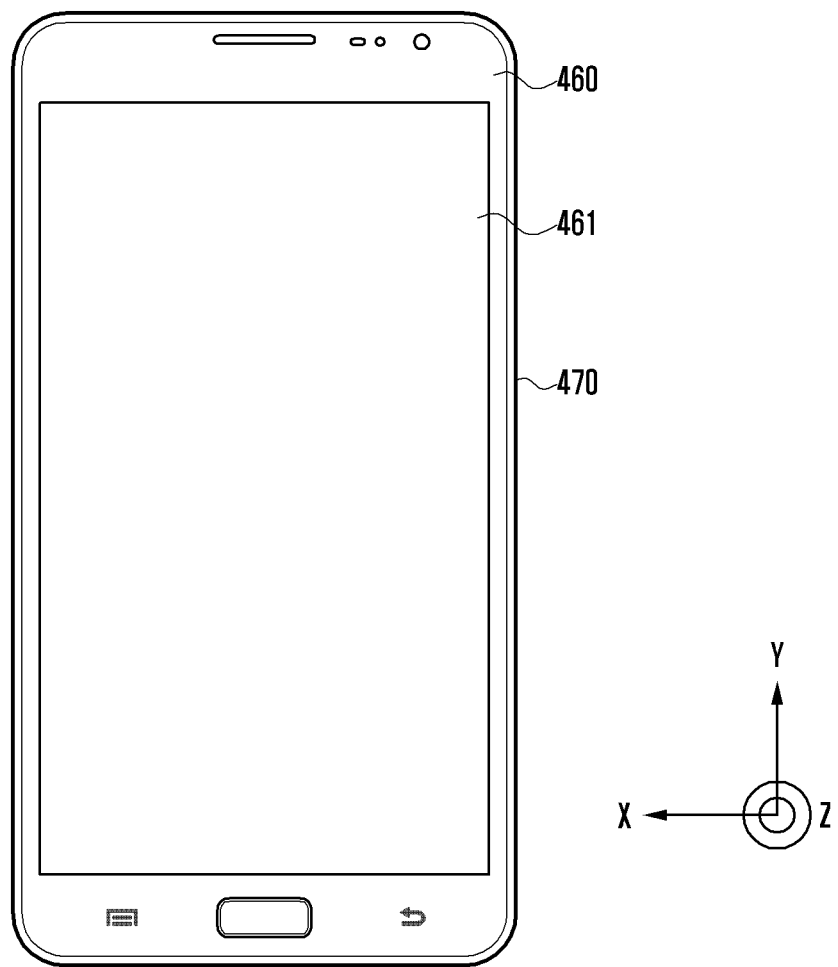
Figure 4C:
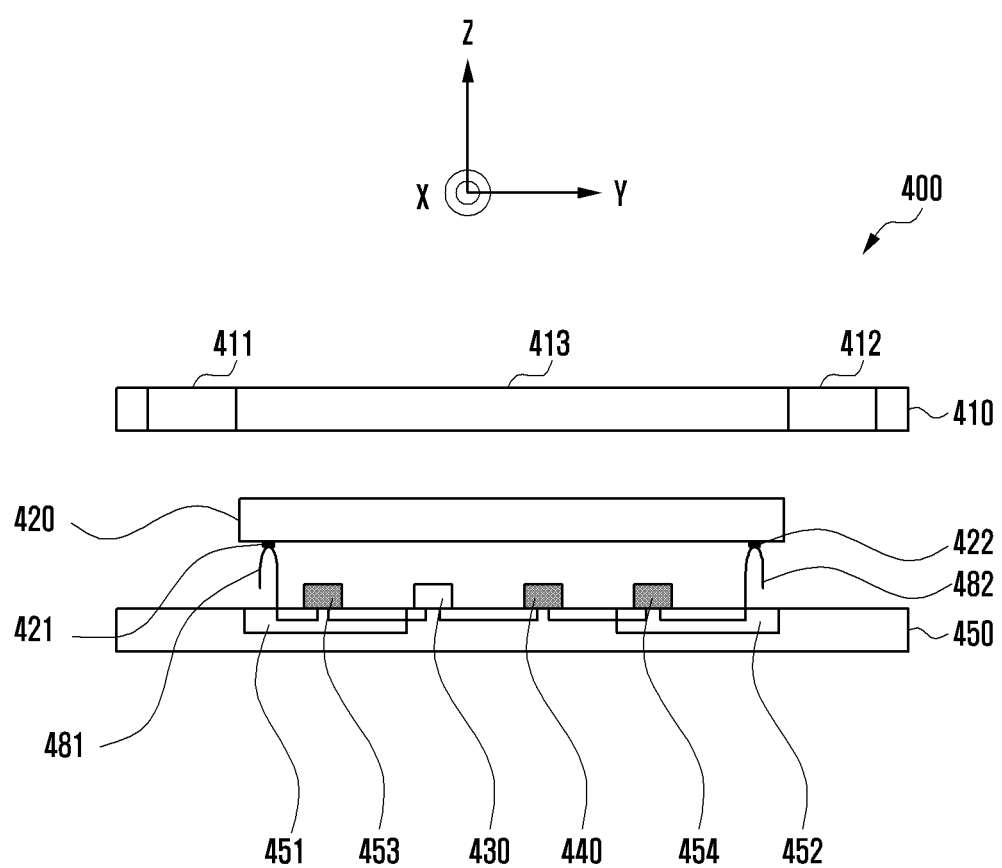
Figure 4D:
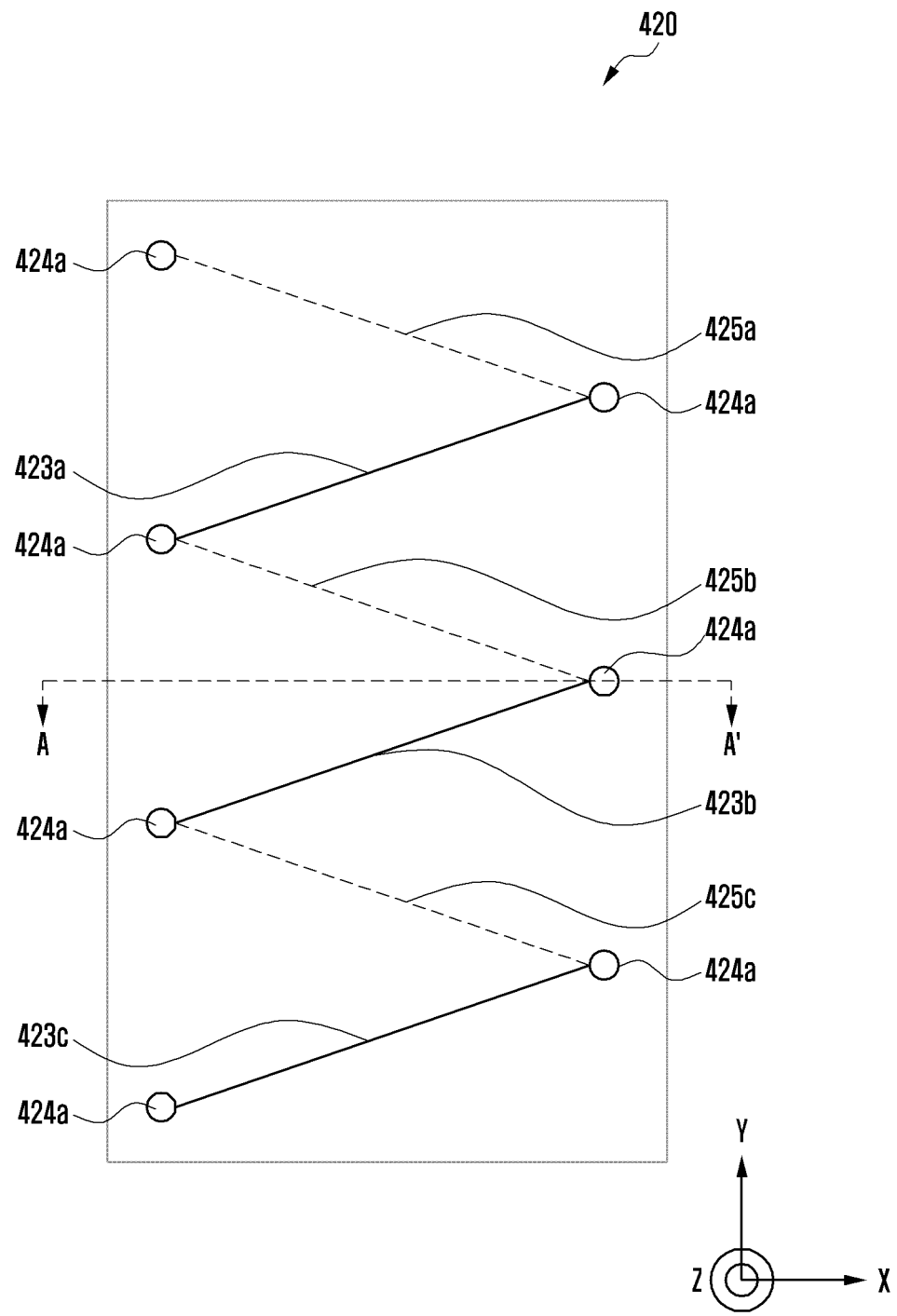
Figure 4E:
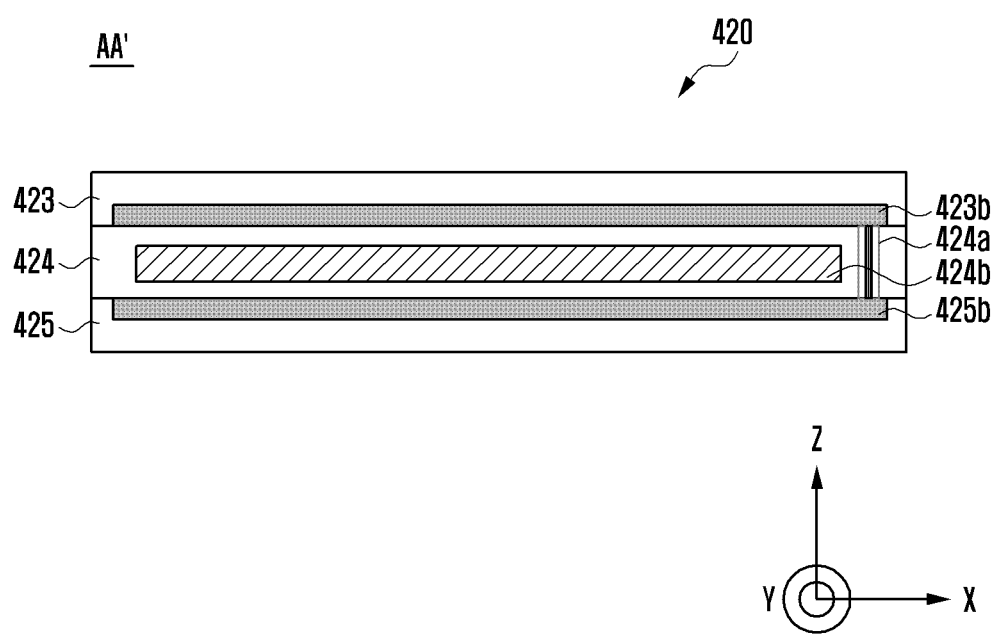
Figure 4F:
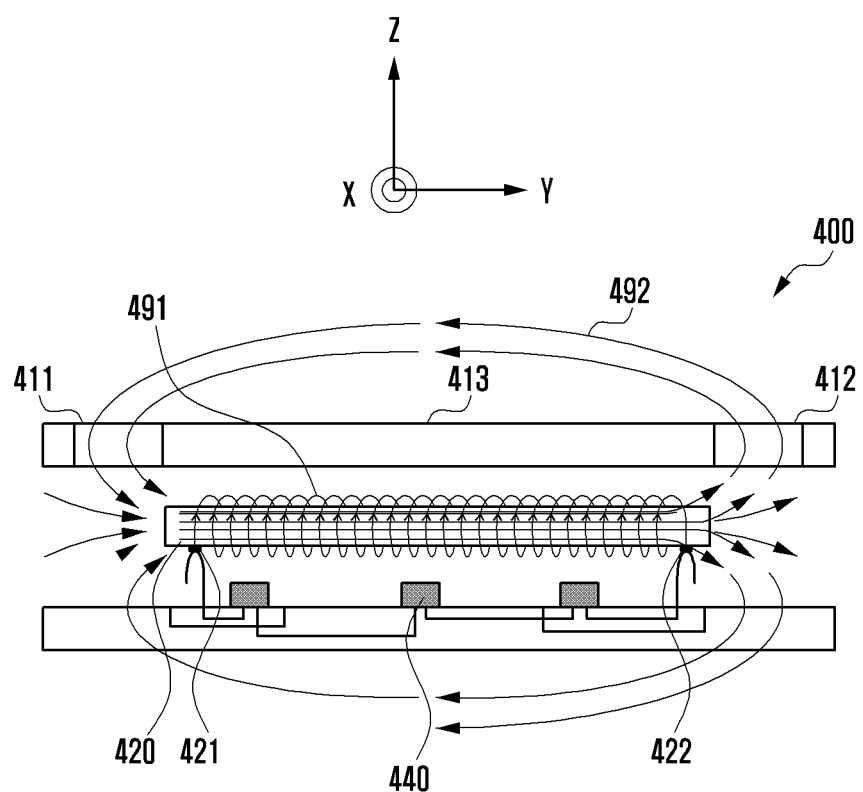

FIGS. 4A to 4F illustrate an electronic device having a solenoid type of loop antenna according to embodiments of the present disclosure. FIG. 4A is a rear side view of an electronic device, FIG. 4B is a front side view of the electronic device, FIG. 4C is a cross-sectional view of the electronic device, FIG. 4D is a front side view of a loop antenna, FIG. 4E is a cross-sectional view of the loop antenna, and FIG. 4F is a cross-sectional view of the electronic device, along with a current path of the loop antenna and a magnetic field generated by the loop antenna.

In FIGS. 4A, 4B and 4C, an electronic device 400 is capable of including a loop antenna 420, a coupling module 430, a communication module 440, and a substrate 450, each of which may be placed within the housing of the electronic device 400. The housing is configured to include a first surface 460 facing in a first direction, a second surface 410 facing in a second direction opposite the first direction, and a side member 470 surrounding the space between the first surface 460 and the second surface 410. For example, the first surface 460 may be a cover forming the front side of the electronic device 400, and the second surface 410 may be a cover forming the rear side of the electronic device 400. A display 461 may be exposed to the outside through the first surface 460. A portion of the first surface 460, the second surface 410, and the side member 470 may be formed into a single body.

The cover 410 may be divided into a conductive area made of a conductive material and a non-conductive area made of a non-conductive material. For example, the cover 410 may be divided into a first non-conductive area 411, a second non-conductive area 412, and a conductive area 413. The first non-conductive area 411 may be symmetrically disposed, opposite the second non-conductive area 412, such as symmetrically at the top and bottom of the cover 410 in FIG. 4A. The remaining areas of the cover 410 are made of a conductive material or a non-conductive material. The cover 410 may form one or more openings for revealing components of the electronic device 400. For example, the first non-conductive area 411 may form three openings, revealing a camera 490 through a first opening, a flash 462 through a second opening, and a sensor 463 through a third opening.

The loop antenna 420 may be disposed below the conductive area 413 formed between the first non-conductive area 411 and the second non-conductive area 412, may be insulatedly attached to the bottom side of the conductive area 413, and may include a solenoid coil wound about the Y-axis direction to generate a magnetic flux in a direction parallel to the Y-axis direction of the rear side of the electronic device 400. The detailed structure and configuration of a solenoid coil is described later in FIGS. 4D and 4E.

The substrate 450 is capable of providing electric signals to the loop antenna 420. The substrate 450 may be implemented using at least one of PCB and FPCB. The substrate 450 is capable of feeding current to the loop antenna 420 and receiving current from the loop antenna 420. The substrate 450 may also serve as a ground plate for grounding the loop antenna 420. The coupling module 430 and the communication module 440 are formed on the substrate 450 and are electrically connected to each other via wires, and to the loop antenna 420 via a first coupling contact 481 and a second coupling contact 482, respectively. For example, the first coupling contact 481 and the second coupling contact 482 are electrically connected to a first power supply contact 421 and a second power supply contact 422 of the loop antenna 420, respectively, and may be the C-clips.

The substrate 450 may have a first dielectric 451 and a second dielectric 452. The first coupling contact 481 and the second coupling contact 482 may be mounted on the first dielectric 451 and the second dielectric 452, respectively. The first coupling contact 481 may be connected to the coupling module 430 through the first capacitor 453. The second coupling contact 482 may be connected to the communication module 440 through the second capacitor 454. The capacitors 453 and 454 are employed to prevent electric shock, and have a capacitance of about 10-1000 pF. In FIGS. 4D and 4E, the loop antenna 420 may be configured using an FPCB including multiple layers 423-425. The upper layer 423 may include a number of conducting wires 423*a*, 423*b*, and 423*c* forming a solenoid coil. The lower layer 425 may include a number of conducting wires 425*a*, 425*b*, and 425*c* forming a solenoid coil. The intermediate layer 424 may form conductive vias 424*a* to configure a solenoid coil. That is, conducting wires disposed on the upper layer 423 and conducting wires disposed on the lower layer 425 may be electrically connected to each other through the vias 424*a* serving as a medium, and thus configure a solenoid coil. In addition, the intermediate layer 424 may include a core 424*b*, such as a magnetic substance, to increase a magnetic force generated via a solenoid coil. According to an embodiment, the core 424*b* may be removed from the loop antenna 420. The substrate 450 may include a processor for controlling the supply of power and communication of the communication module 440.

In FIG. 4F, if current is supplied from the communication module 440 to the first power supply contact 421 or the second power supply contact 422 of the loop antenna 420, current flows from a first power supply contact 421 to a second power supply contact 422, which forms a cylindrical current path 491 about the Y-axis. The current path 491 forms a magnetic field 492 in the Y-axis direction perpendicular to the current direction along the horizontal direction of the rear side of the electronic device 400. The magnetic flux of the magnetic field 492 penetrates through the first non-conductive area 411 and the second non-conductive area 412. Therefore, the magnetic field 492 is not shielded by the conductive area 413, and may be formed outside the electronic device 400.

Figure 5:
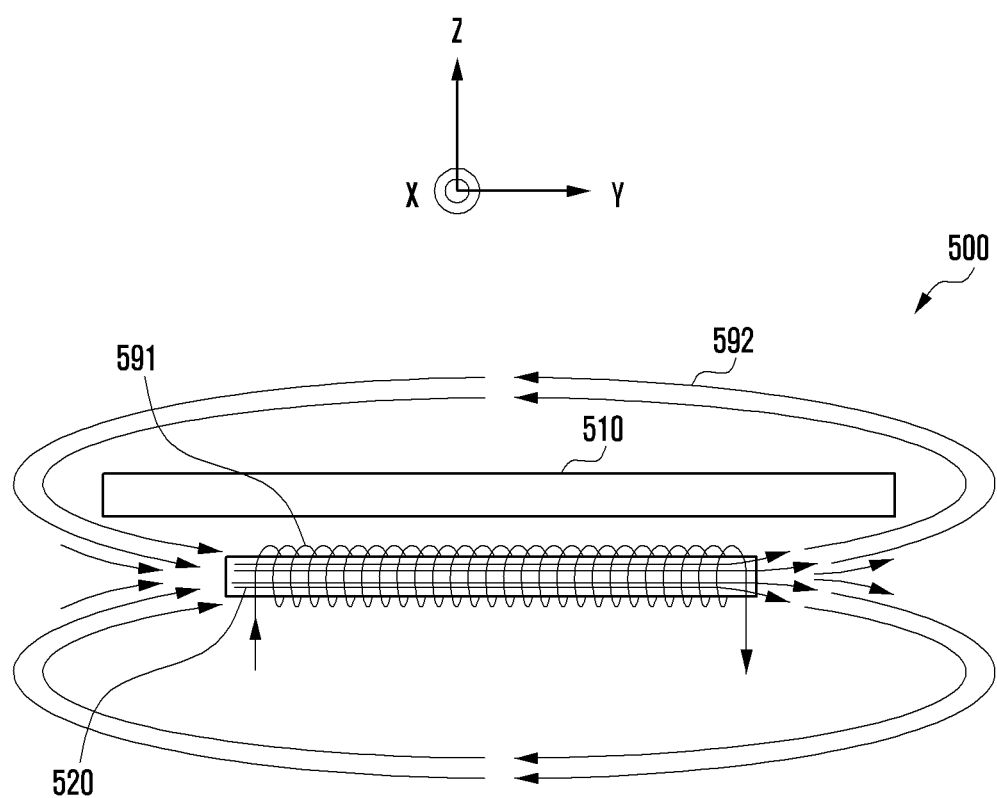
FIG. 5 is a diagram illustrating an electronic device having a solenoid type of loop antenna according to embodiments of the present disclosure.

FIG. 5 is a cross-sectional view of an electronic device having a solenoid type of loop antenna and a magnetic field formed by a loop antenna according to embodiments of the present disclosure. In FIG. 5, an electronic device 500 is capable of including a cover 510, a loop antenna 520, a coupling module, a communication module, and a substrate.

The cover 510 may configure the rear side of the electronic device 500, may be made of a conductive material, and may form openings that house components of the electronic device 500, such as a camera, a flash, and a sensor. The loop antenna 520 may be disposed below the cover 510, such as insulatedly attached to the bottom side of the cover 510, and may be a solenoid coil wound about the Y-axis direction (i.e., the horizontal direction with respect to the rear side of the electronic device 500). If current is supplied to the loop antenna 520, a cylindrical current path 591 is formed about the Y-axis and forms a magnetic field 592 in the Y-axis direction perpendicular to the direction of current. Therefore, a portion of the magnetic flux in the magnetic field 592 may be emitted to the outside, by bypassing the cover 510. Therefore, the magnetic field 592 is not shielded by the cover 510 made of a conductive material, and may be formed outside the electronic device 500.

Figure 6A:
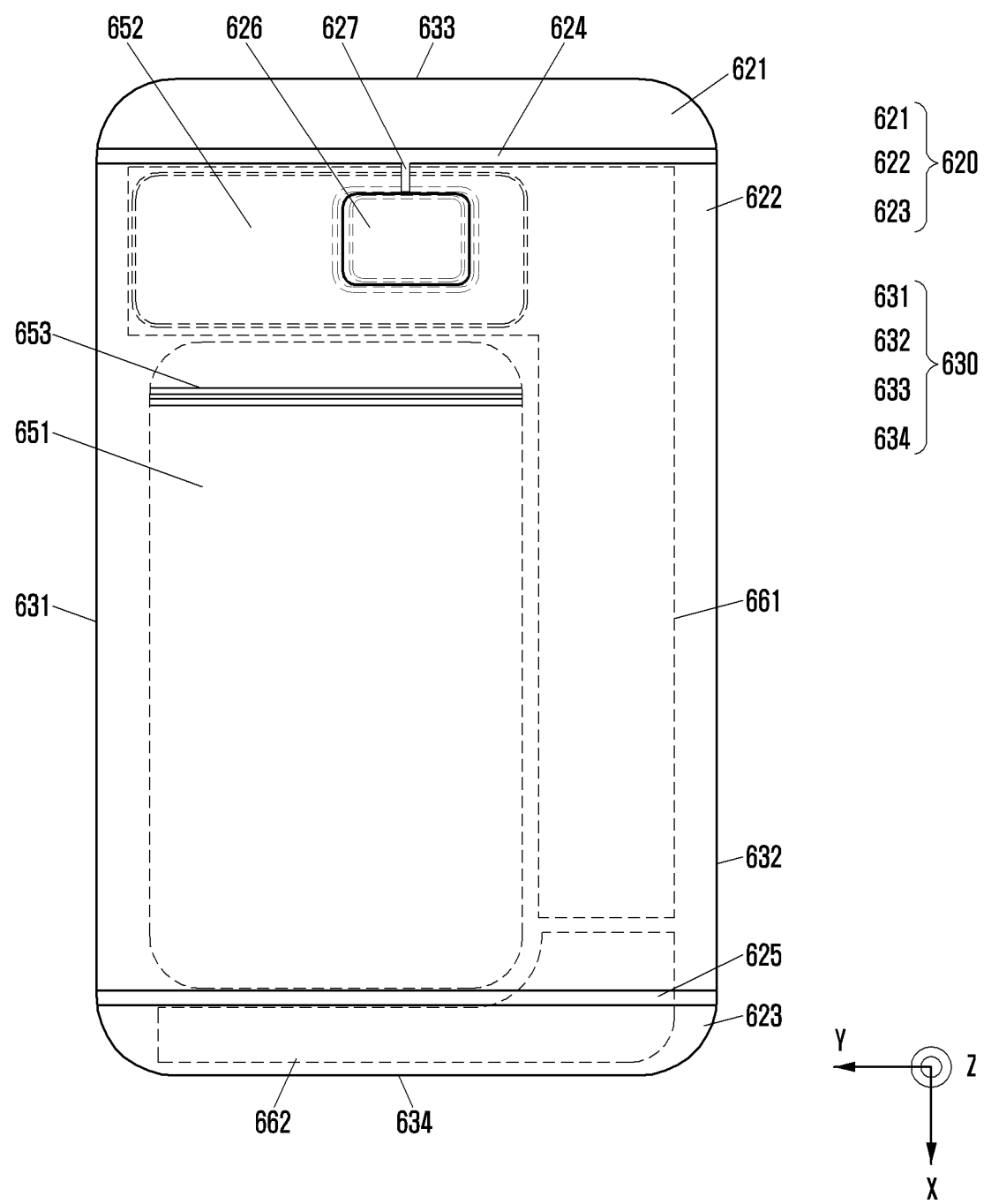
FIGS. 6A and 6B illustrate an electronic device having a solenoid type of loop antenna according to embodiments of the present disclosure.
Figure 6B:
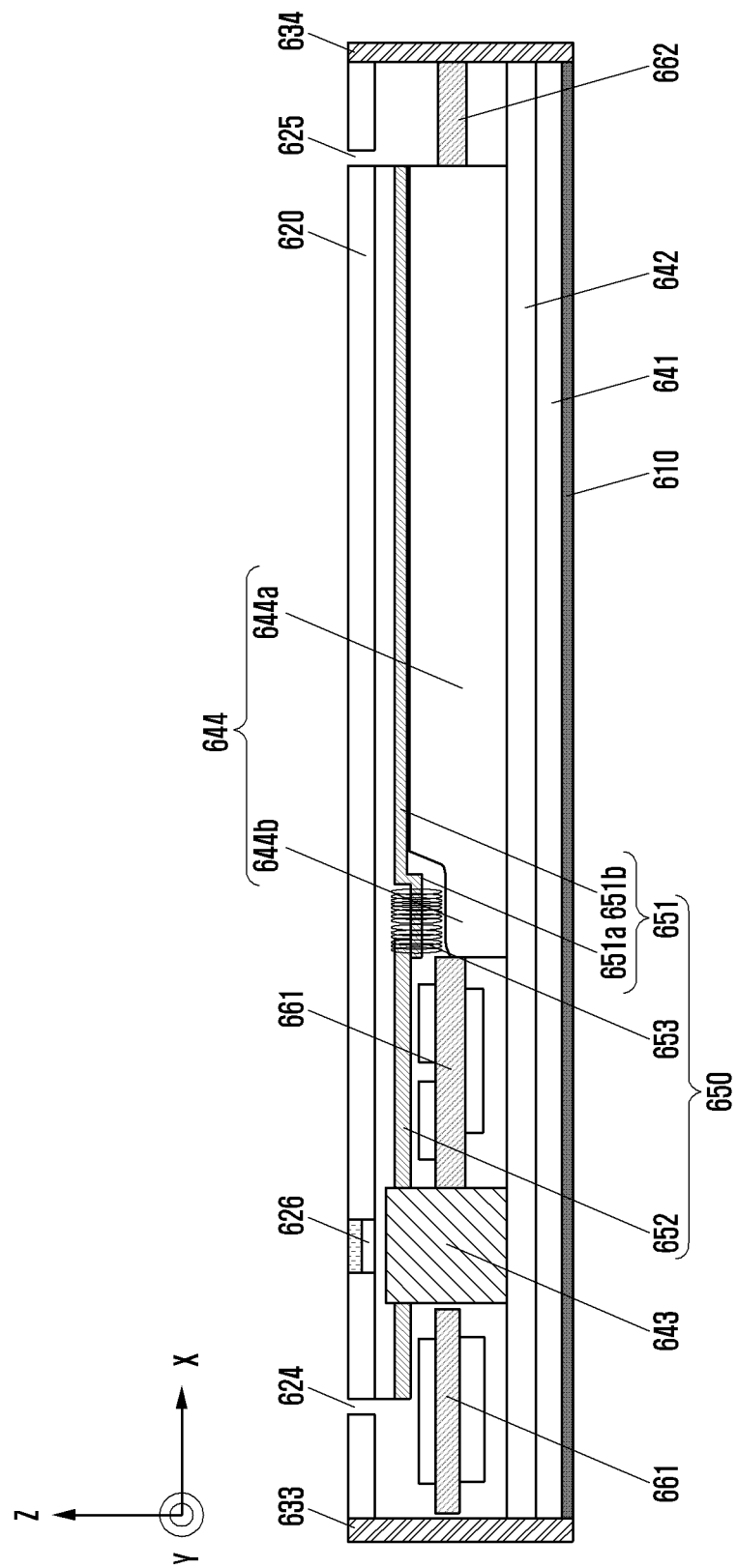

FIGS. 6A and 6B illustrate an electronic device having a solenoid type of loop antenna according to embodiments of the present disclosure. FIG. 6A illustrates the rear side of an electronic device and a portion of the components, and FIG. 6B is a cross-sectional view of the electronic device.

In FIGS. 6A and 6B, an electronic device may include various types of electronic parts and the housing for protecting the electronic parts. The housing is configured to include a first surface 610 facing in a first direction, a second surface 620 facing in a second direction substantially opposite the first direction, and a side member 630 surrounding at least a portion of the space between the first surface 610 and the second surface 620. For example, the first surface 610 may be a cover configuring the front side of the electronic device and having a portion through which a display 641 may be exposed. The second surface 620 may be a cover configuring the rear side of the electronic device. When viewed from the display side of the electronic device, the side member 630 may include a right side cover 631 configuring the right side of the electronic device, a left side cover 632 configuring the left side of the electronic device, a top side cover 633 configuring the top side of the electronic device, and a bottom side cover 634 configuring the bottom side of the electronic device.

In FIG. 6A, the second surface 620 may be made of a conductive material, such as metal, and may be anodized to be colored, such as by applying an anodizing technique to the second surface 620. The second surface 620 may be divided into a top area 621, a middle area 622, and a bottom area 623. For example, the top area 621 and the middle area 622 may be divided by an upper slit 624 formed as a straight line in the Y-axis (left-right) direction, and the middle area 622 and the bottom area 623 may be divided by a lower slit 625 formed as a straight line in the Y-axis direction. The second surface 620, such as a portion of the bottom area 623, middle area 622 and/or top area 621, is electrically connected to a communication module disposed within the housing, and thus, may be used as an emitting body. In addition, the slits 624 and 625 are filled with a non-conductive material. The middle area 622 may form an opening 626 in a portion close to the upper slit 624 in order to reveal a lens of a camera. Another slit 627 connecting the opening 626 and the upper slit 624 may be formed between the opening 626 and the upper slit 624 in the X-axis (vertical) direction, and may be filled with a non-conductive material.

In FIG. 6B, a display 641, a support structure 642, a camera 643, a battery 644, a loop antenna 650, a first substrate 661, and a second substrate 662 are positioned inside the housing. When viewed from above the second surface 620, the display 641 may be disposed above the first surface 610, and the support structure 642 configured to support the first surface 610 may be disposed on the display 641. The camera 643, battery 644, first substrate 661, and second substrate 662 may be disposed above the support structure 642. The camera 643 may be disposed below the opening 626 within the housing internal space, so that the lens can be exposed to the outside through the opening 626. In addition, an opening may be formed in the first substrate 661, to enable revealing of the camera 643. When the right side cover 631 of the housing is viewed from the right side, the battery 644 may be disposed at the right of the camera 643. The battery 644 is capable of supplying power to various electronic parts within the housing, such as the display 641, the camera 643, and electronic parts mounted on the first substrate 661 and the second substrate 662.

The loop antenna 650 may be attached to the second surface 620. Alternatively, an air gap may be between the loop antenna 650 and the second surface 620. The loop antenna 650 may include a first metal plate 651, a second metal plate 652, and a solenoid coil 653. When viewed from above the second surface 620, the first metal plate 651 may have a plane substantially parallel to the first surface 610 or the second surface 620, and may be disposed above the battery 644. The second metal plate 652 may have a plane substantially parallel to the first surface 610 or the second surface 620, and may be disposed on part of the first substrate 661 close to the upper slit 624. An opening may be formed in the second metal plate 652 and may enable revealing of the camera 643.

The loop antenna 650 may be disposed between the upper slit 624 and the lower slit 625. For example, one end of the second metal plate 652 may extend to such an extent be close to or in contact with one end of the first metal plate 651, and the other end of the second metal plate 652 may extend close to the upper slit 624. The other end of the first metal plate 651 may extend close to the lower slit 625.

The coil 653 may be a wire wound a number of times around a portion of the first metal plate 651 in the X-axis direction substantially horizontal to the second substrate 662. For example, a wire may be wound around the end of the first metal plate 651, close to the second metal plate 652, and both ends of the wire may be electrically connected to a communication module mounted on the first substrate 661 or the second substrate 662. The first metal plate 651 and the second metal plate 652 may serve as a core to increase magnetic force generated by the solenoid coil 653. That is, a magnetic flux generated by the solenoid coil 653 may be spread to the slits 624 and 625 through the metal plates 651 and 652 and may be emitted to the outside through the slits 624 and 625.

The battery 644 may be a pouch type battery and may be divided into a first portion 644a including a battery cell and a second portion 644b including a protection circuit module (PCM). The first portion 644a and the second portion 644b may differ in thickness from each other. For example, when viewed from above the second surface 620, although the lower side of the second portion 644b and the lower side of the first portion 644a are flat, the upper side of the second portion 644b may be designed to be lower than that of the first portion 644a. Therefore, the space (first space) between the second surface 620 and the second portion 644b may be vertically wider than the space (second space) between the second surface 620 and the first portion 644a.

In addition, the first metal plate 651 may have different heights. For example, when viewed from above the second surface 620, one end portion 651a positioned at the first space may be designed to be lower than the other end portion 651b positioned at the second space by being bent downward. Accordingly, a wire may be mainly wound around the end portion 651a positioned at the first space, which may form a coil without increasing the thickness of the electronic device. However, if the space has extra room or is not limited, a wire may also be wound around any other portion except for the end portion 651a.

FIGS. 7A and 7B illustrate various materials of a solenoid type of loop antenna installed to an electronic device according to embodiments of the present disclosure.

In FIG. 7A, a first metal plate 711 and a second metal plate 712 of a loop antenna may be made of the same ferromagnetic substance with a relatively high magnetic permeability, such as a mu-metal including Permalloy, silicon metal, or iron (Fe)+nickel (Ni), or a ferrite. Alternatively, the first metal plate 711 and the second metal plate 712 may be made of soft ferrite, and may be configured into a single metal plate having a specific portion 713 that may be designed to be bent downward. A wire 714 may be mainly wound around the specific portion 713.

In FIG. 7B, a first metal plate 721 and a second metal plate 722 of a loop antenna may be made of different materials. For example, the first metal plate 721 may be made of one of a ferromagnetic substance, soft ferrite, and ferrite, and the second metal plate 722 may be made of a different one of these materials. In addition, the second metal plate 722 may be used as a heat pipe for absorbing heat from a substrate as well as a unit for spreading the magnetic field. A wire may be mainly wound around the one of the first metal plate 721 and the second metal plate 722 which has the higher magnetism. The magnetic flux generated via the wire may be spread to both ends of the first metal plate 721 and the second metal plate 722 through the two plates.

FIGS. 8A, 8B, 8C, 8D and 8E illustrate various structures of a solenoid type of loop antenna installed to an electronic device according to embodiments of the present disclosure.

A loop antenna may be designed in various structures, considering size, location, and form of the other configurations. For example, as described above, a loop antenna may be designed in such a manner that a specific portion of the metal plate is bent, considering the form of the battery 644, and a wire is mainly wound around the specific part.

Figure 8A:
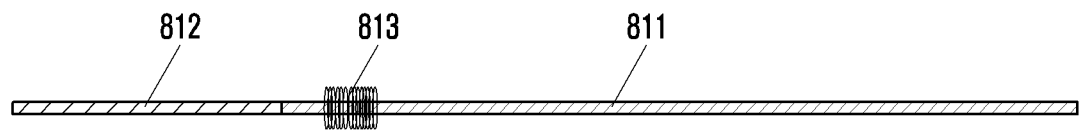
FIGS. 8A, 8B, 8C, 8D and 8E illustrates various structures of a solenoid type of loop antenna installed to an electronic device according to embodiments of the present disclosure.

In FIG. 8A, both a first metal plate 811 and a second metal plate 812 of the loop antenna may be designed to be substantially flat, and may be disposed inside the housing, substantially in parallel to each other. In addition, a wire may be mainly wound around the end of the first metal plate 811, close to the second metal plate 812. Although the first metal plate 811 is illustrated to be longer than the second metal plate 812, it should be understood that the second metal plate 812 may be longer than the first metal plate 811, according to size, location, and form of the other configurations. Alternatively, the metal plates 811 and 812 may be substantially identical to each other in length.

Figure 8B:
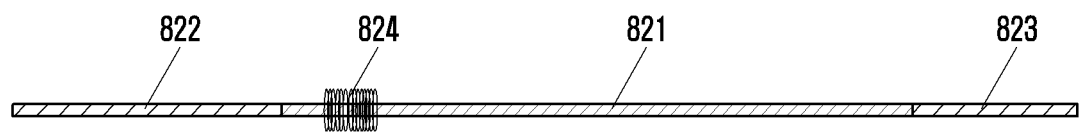
Figure 8C:
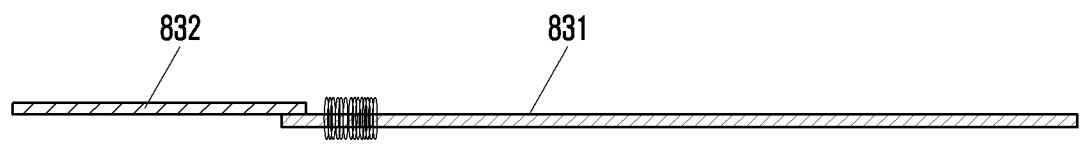

The number of metal plates may be at least three, such as a first metal plate 821, a second metal plate 822, a third metal plate 823, and a solenoid coil 824 in FIG. 8B. The metal plates 821, 822, and 823 may be designed to be flat and may be disposed within the housing, parallel to each other. Parts of the metal plates 821, 822, and 823, on which the solenoid coil 824 is positioned, may be designed to be lower in height than the other parts.

Figure 8D:
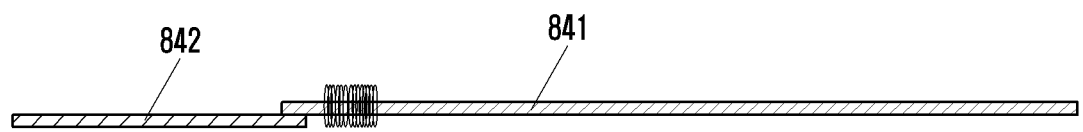
Figure 8E:
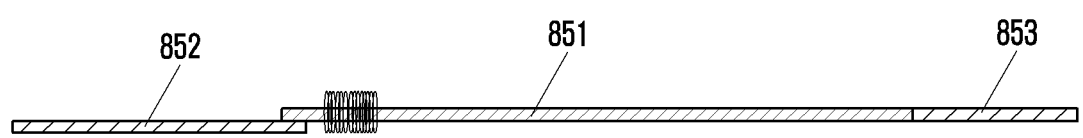

The metal plates may be disposed inside the housing, with different heights, according to size, location, and form of the other configurations. For example, in FIG. 8C, a portion of the first metal plate 831 may be disposed below the second metal plate 832, while partially overlapping with the second metal plate 832. In FIG. 8D, the first metal plate 841 may be disposed higher than the second metal plate 842. In FIG. 8E, the first metal plate 851 may be disposed in parallel to the third metal plate 853, but higher than the second metal plate 852.

FIG. 9 illustrates various locations of an end of a loop antenna to increase the radiation efficiency in an electronic device according to embodiments of the present disclosure.

In FIG. 9, a rear side cover 910 of the electronic device may be divided into a first area 911 and a second area 912 by a slit 913. It should be appreciated that the first area 911, second area 912, and slit 913 correspond to the top area 621 (or bottom area 623), middle area 622, and upper slit 624 (or lower slit 625), respectively, shown in FIG. 6B. A loop antenna may be positioned below the rear side cover 910 and may include at least one metal plate and a wire (i.e., solenoid coil) mainly wound around a portion of the metal plate. It should be appreciated that the metal plate 920 corresponds to the first metal plate 651 or the second metal plate 652 in FIG. 6B.

The end 921 of the metal plate 920 may extend close to the slit 913. For example, in FIG. 9A, the end 921 may be designed to extend up to the edge 912a of the second area 912. In FIG. 9B, the end 921 may be designed to be positioned between the edge 911a of the first area 911 and the edge 912a of the second area 912, such that when viewed from above the rear side cover 910, the end 921 is exposed through the slit 913. In FIG. 9C, the end 921 may be designed to extend up to the edge 911a of the first area 911. In FIG. 9D, the end 921 may be designed to extend, surpassing the edge 911a in length, to be positioned below the first area 911. In FIG. 9E, the end 921 may be designed so as not to surpass the edge 912a of the second area 912 in length, to be positioned below the second area 912.

FIG. 10 illustrates various locations and forms of an end of a loop antenna to increase the radiation efficiency in an electronic device according to embodiments of the present disclosure. Although the embodiment shown in FIG. 9 is implemented in such a manner that the end portion is shaped as a straight bar or horizontally shaped, it should be understood that the electronic device is not limited thereto. For example, in FIG. 10, the end portion 1010 may be "L"-shaped, which increases the radiation efficiency compared to being horizontally shaped. The end portion 1010 may be designed in such a manner that it can be positioned in various locations as illustrated in FIGS. 10A, 10B, 10C, 10D and 10E.

FIGS. 11A, 11B, 11C and 11D illustrate various forms of an end of a loop antenna to increase the radiation efficiency in an electronic device according to embodiments of the present disclosure. In FIGS. 11A, 11B, 11C and 11D, in order to increase the radiation efficiency, a dimension such as size or volume of the end portion may be determined, considering a measure of the space in which the end portion is positioned. For example, the end portion may be shaped in various forms, such as a triangle in FIGS. 11A and 11B, a rectangle in FIG. 11C, or a square in FIG. 11D.

FIGS. 12A, 12B, 12C and 12D illustrates a shielding material of various types of structure, installed to an electronic device according to embodiments of the present disclosure.

In FIGS. 12A, 12B, 12C and 12D, a rear side cover 1210 of the electronic device may be divided into a first area 1211 and a second area 1212 by a slit 1213. It should be appreciated that the first area 1211, second area 1212, and slit 1213 correspond to the top area 621 (or bottom area 623), middle area 622, and upper slit 624 (or lower slit 625) shown in FIG. 6A, respectively. A loop antenna may be positioned below the rear side cover 1210. It should be appreciated that the metal plate 1220 corresponds to the first metal plate 651 or the second metal plate 652 in FIG. 6B.

According to an embodiment, the electronic device may be equipped with a structure for shielding electronic parts from the influence of the magnetic field generated by the loop antenna. For example, in FIG. 12A, the shielding material 1230 may be horizontally shaped and may be disposed below the metal plate 1220. In FIG. 12B, the shielding material 1240 may be vertically shaped, and the end portion 1241 of the shielding material 1240 may be close to or contact the edge of the lower side of the first area 1211. In FIG. 12C, the shielding material 1250 may be generally "U"-shaped. The end portion 1251 of the shielding material 1250 may be close to or contact the edge of the lower side of the first area 1211 and the other end portion 1252 may be disposed below the metal plate 1220. In FIG. 12D, the shielding material 1260 may be "L"-shaped.

Figure 13A:
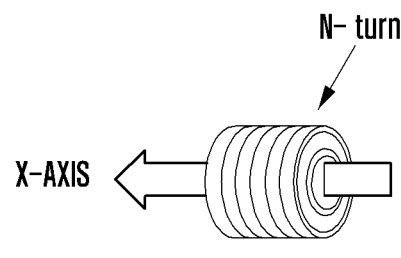
FIGS. 13A and 13B illustrate a solenoid coil wound in various manners according to embodiments of the present disclosure.
Figure 13B:
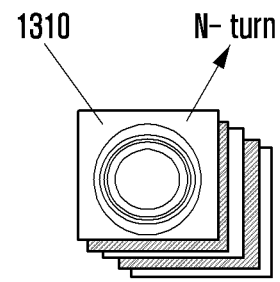

FIGS. 13A and 13B illustrate a solenoid coil wound in various manners, according to embodiments of the present disclosure. The solenoid coil is formed in such a manner that a wire is wound around a magnetic substance, proceeding in the positive X-axis direction in FIGS. 13A and 13B. The number of turns may be determined according to frequency characteristics. A solenoid coil pattern may be formed in such a manner that a turn is wound one by one or more turns at a time, proceeding in a direction. With reference to FIG. 13A, a conductive pattern of the solenoid coil may be formed in such a manner that a turn is wound proceeding in the positive X-axis direction, and may have N-turns about the X-axis. With reference to FIG. 13B, a shielding sheet 1310, such as a ferrite sheet, may be between a number of turns. At least portion of the shielding sheet 1310 may be removed to minimize the influence of eddy currents.

Figure 14:
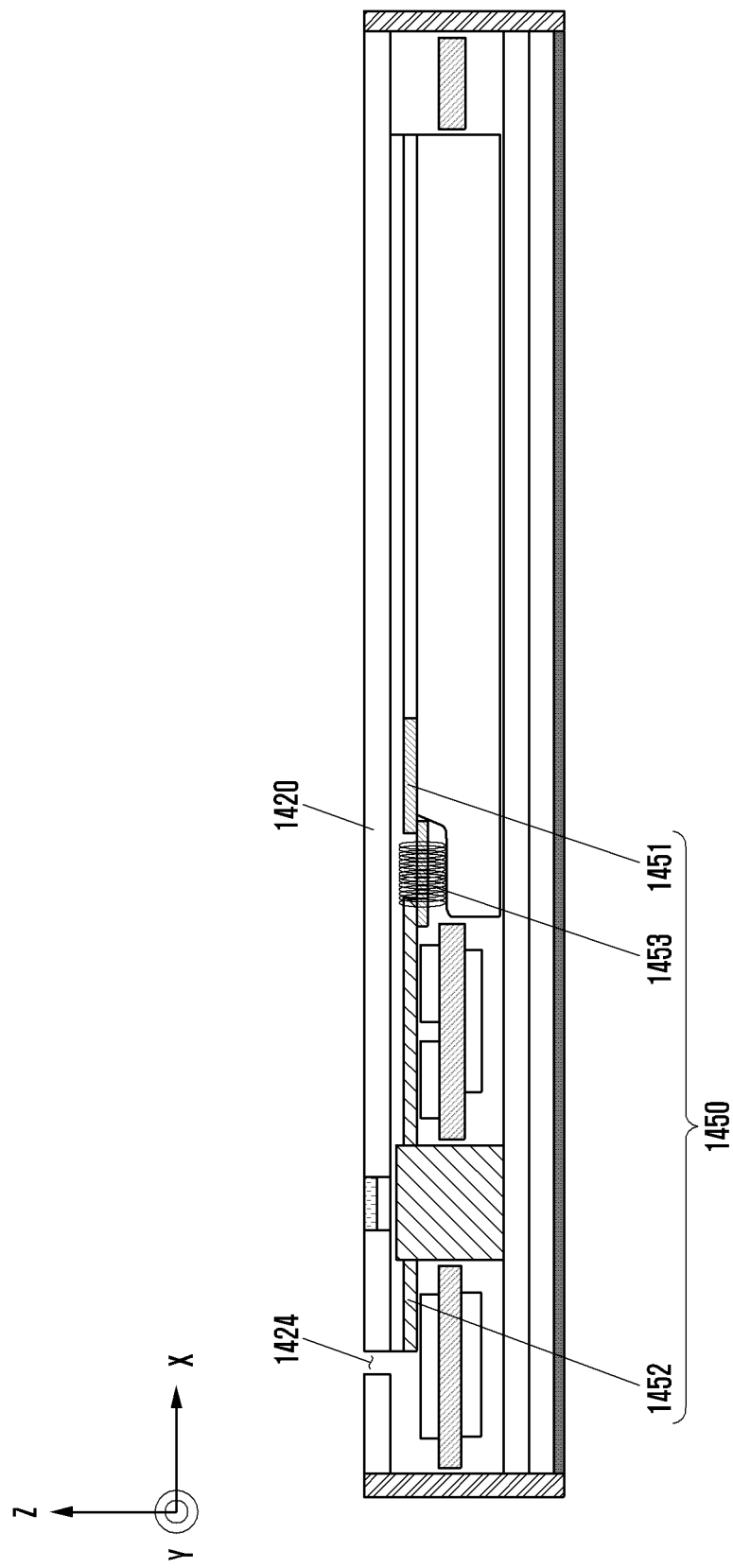
FIG. 14 illustrates a cross-sectional view of an electronic device having a solenoid type of loop antenna according to embodiments of the present disclosure.

FIG. 14 illustrates a cross-sectional view of an electronic device having a solenoid type of loop antenna according to embodiments of the present disclosure.

The structure of an electronic device shown in FIG. 14 differs from that of the electronic device shown in FIG. 6 in that the second surface 1420 forms an upper slit 1424 without a lower slit. Therefore, the loop antenna 1450 may be designed to differ in structure from the loop antenna 650 shown in FIG. 6B. For example, since the metal plate of the loop antenna serves to spread a magnetic flux, generated through a solenoid coil, to a slit, the second metal plate 1452 may be designed to extend close to the upper slit 1424 in FIG. 14, and the first metal plate 1451 may be designed to be shorter in length than that of the first metal plate 651 shown in FIG. 6B. That is, the first metal plate 1451 may be designed to be flexible in length. If the second surface 1420 forms only a lower slit without an upper slit 1624, the first metal plate 1451 may extend close to the lower slit, and the second metal plate 1452 may be designed to be relatively flexible in length.

Figure 15A:
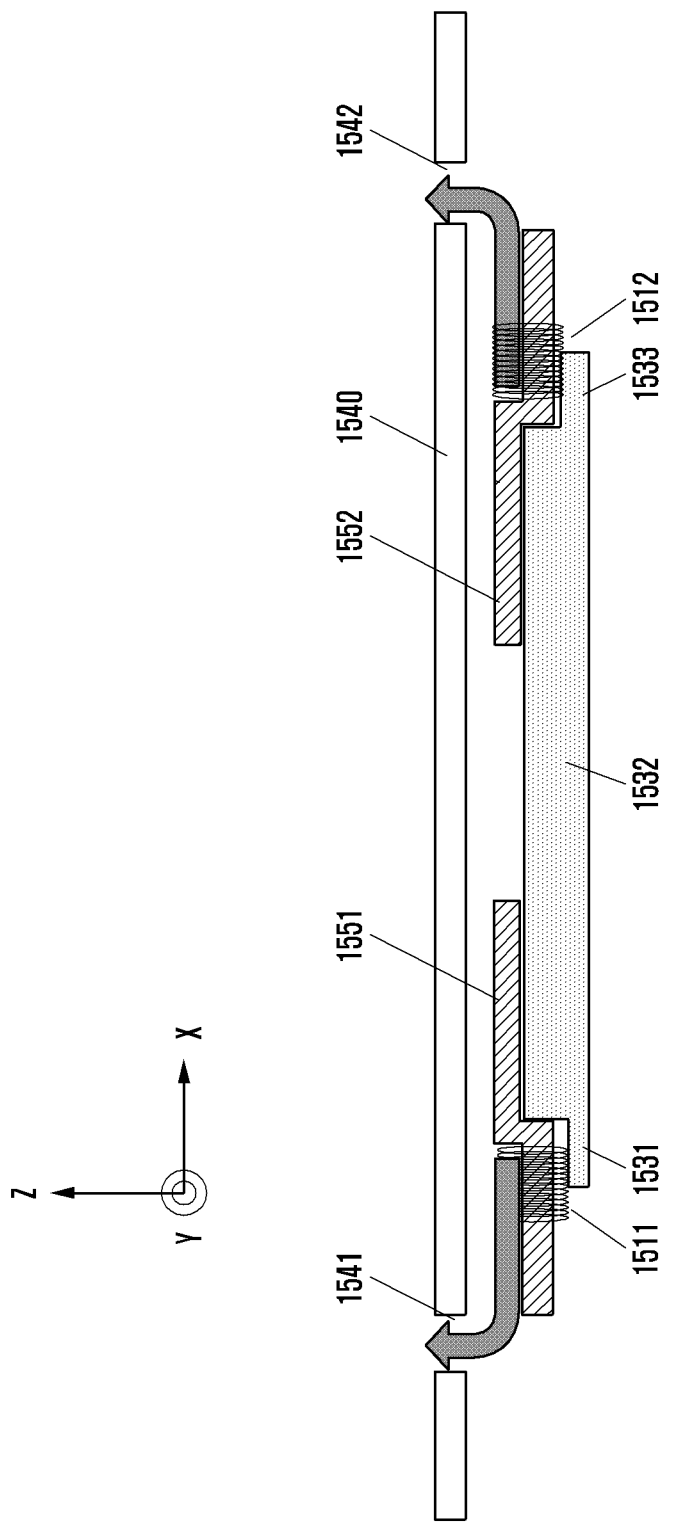
FIGS. 15A, 15B and 15C illustrate an approximate cross-sectional view of an electronic device having a solenoid type of loop antenna (omitting parts of the configurations) according to embodiments of the present disclosure.
Figure 15B:
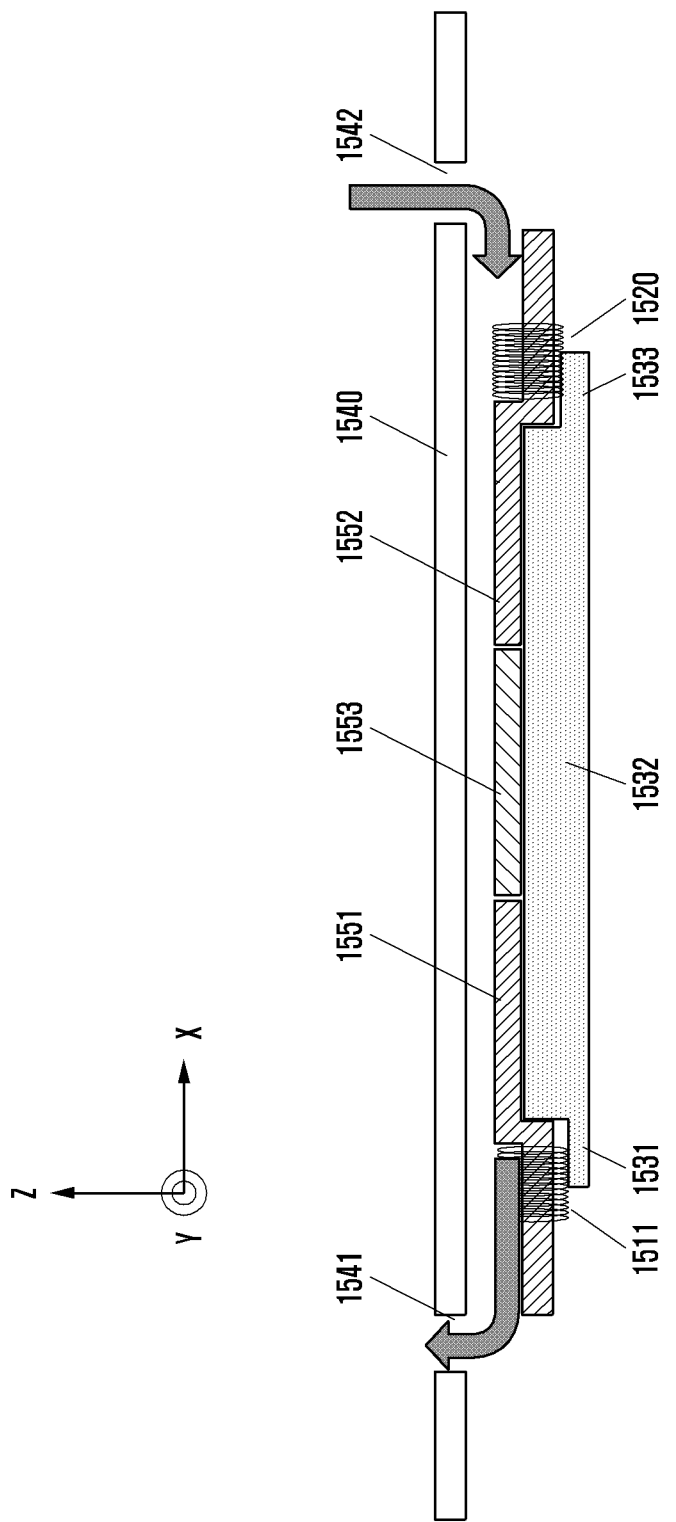
Figure 15C:

FIGS. 15A, 15B and 15C illustrate an approximate cross-sectional view of an electronic device having a solenoid type of loop antenna (omitting parts of the configurations) according to embodiments of the present disclosure.

An electronic device may have a plurality of slits and a plurality of conductive patterns (i.e., a solenoid coil). A number of solenoid coils may be wound in different directions. That is, one of the coils is wound in a clockwise direction and the other coil is wound in a counter-clockwise direction. In this case, the magnetic field generated by the solenoid coils may be emitted outside the electronic device via slits positioned opposite each other. For example, in FIG. 15A, a battery may be divided into a first portion 1531, a second portion 1532, and a third portion 1533 according to the thickness difference. When viewed from above the rear side metal cover 1540, the second portion 1532 may be designed to be higher than the first and third portions 1531 and 1533. One portion of the first metal plate 1551 may be positioned above the second portion 1532. When viewed from above the rear side metal cover 1540, the other portion of the first metal plate 1551 may be bent downward, positioned above the first portion 1531, and extended up to the first slit 1541. In addition, one portion of the second metal plate 1552 may be positioned above the second portion 1532. When viewed from above the rear side metal cover 1540, the other portion of the second metal plate 1552 may be bent downward, positioned above the third portion 1533, and extended up to the second slit 1542.

A first coil 1511 is wound around one portion of the first metal plate 1551 in a clockwise direction, and a second coil 1512 is wound around the other portion of the second metal plate 1552 in a counter-clockwise direction. Therefore, the magnetic fields generated by the two coils may differ in direction from each other. In another embodiment, the first metal plate 1551 and the second metal plate 1552 may be connected to each other. The first coil 1511 and the second coil 1512 may be wound around the first metal plate 1551 and may simultaneously or alternatively emit a magnetic field signal according to the control of a controller. The controller may adaptively select one of the coils 1511 and 1512, based on a user's grip, a user's use pattern, data of a tilt of the electronic detected by a sensor of the electronic device, etc. A number of solenoid coils may be wound in the same direction (i.e., a clockwise direction or a counter-clockwise direction). For example, in FIG. 15B, a third metal plate 1553 connecting the first metal plate 1551 and the second metal plate 1552 may be positioned above the second portion 1532, and the other portion of the second metal plate 1552 may be wound by the third coil 1520, instead of the second coil 1512, in the same direction as the turns of the first coil 1511.

A number of solenoid coils may be wound in the same direction and may be selectively used. For example, in FIG. 15C, a battery may be divided into a first portion 1561 and a second portion 1562 according to the thickness difference. When viewed from above the rear side metal cover 1570, the second portion 1562 may be designed to be higher than the first portion 1561. One portion 1581 of the metal plate may be positioned above the second portion 1562 and may extend up to a second slit 1572. When viewed from above the rear side metal cover 1570, the other portion 1582 of the metal plate may be bent downward, positioned above the first portion 1561, and extended up to a first slit 1571. A first coil 1591 may be wound around the other portion 1582 of the metal plate and a second coil 1592 may also be wound around the other portion 1582 of the metal plate in the same direction as the first coil 1591. The first coil 1591 and the second coil 1592 may alternatively emit a magnetic field signal according to the control of a controller. For example, the first coil 1591 may transfer data on track 1 and the second coil 1592 may transfer data on track 2.

Figure 16:
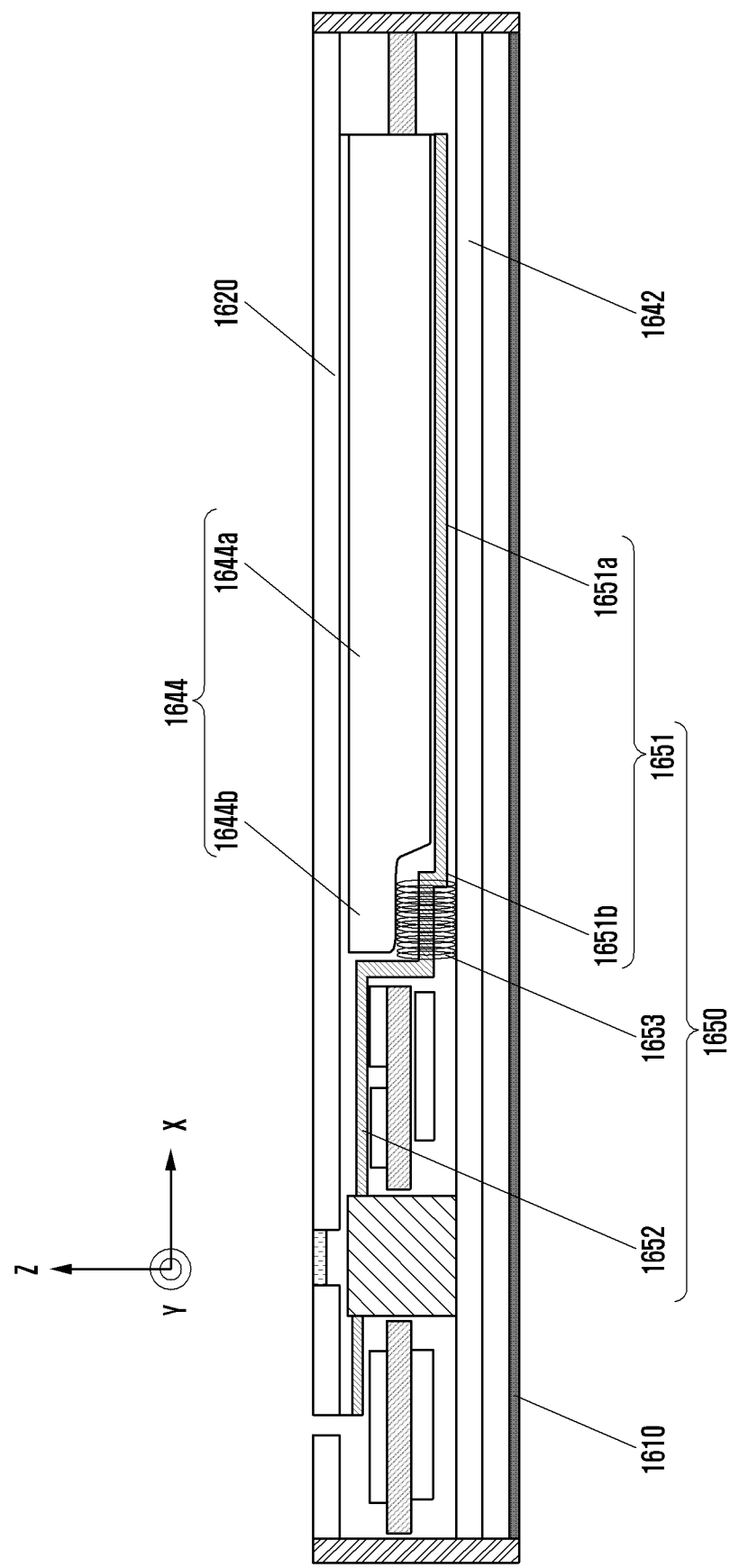
FIG. 16 is a cross-sectional view of an electronic device having a solenoid type of loop antenna according to embodiments of the present disclosure.

FIG. 16 is a cross-sectional view of an electronic device having a solenoid type of loop antenna according to embodiments of the present disclosure.

A battery shown in FIG. 16 may differ in structure from the battery 644 shown in FIG. 6B and may be installed inside an electronic device. For example, in FIG. 16, a battery 1644 may include a first portion 1644a including a battery cell and a second portion 1644b including a protection circuit module. The first portion 1644a and the second portion 1644b may differ in thickness from each other, such as the first portion 1644a being thicker than the second portion 1644b, as illustrated.

When viewed from above a first surface 1610, the second portion 1644b may be designed to be lower than the first portion 1644a. That is, the battery 1644 may be disposed in such a manner that the battery 644 shown in FIG. 6B is turned over. Therefore, the space between the second surface 1620 and the battery 1644 may not be substantial enough to accommodate a solenoid coil 1653. Instead, the space between the support structure 1642 and the battery 1644 may accommodate the solenoid coil 1653.

For example, a first space may be formed between the first portion 1644a and the support structure 1642, and a second space between the second portion 1644b and the support structure 1642 may be formed to be vertically wider than the first space. Therefore, the loop antenna 1650 may be configured in such a manner that portion 1651a of the first metal plate 1651 is positioned generally in the first space and the other portion 1651b is positioned in the second space. When viewed from above the second surface 1620, the end portion 1651b may be designed to be bent upward and extended to be in contact with or close to the second metal plate 1652. According to the design described above, a wire may be mainly wound around the end portion 1651b positioned in the second space, thereby minimizing increases in the thickness of the electronic device due to wire turns.

Figure 17:
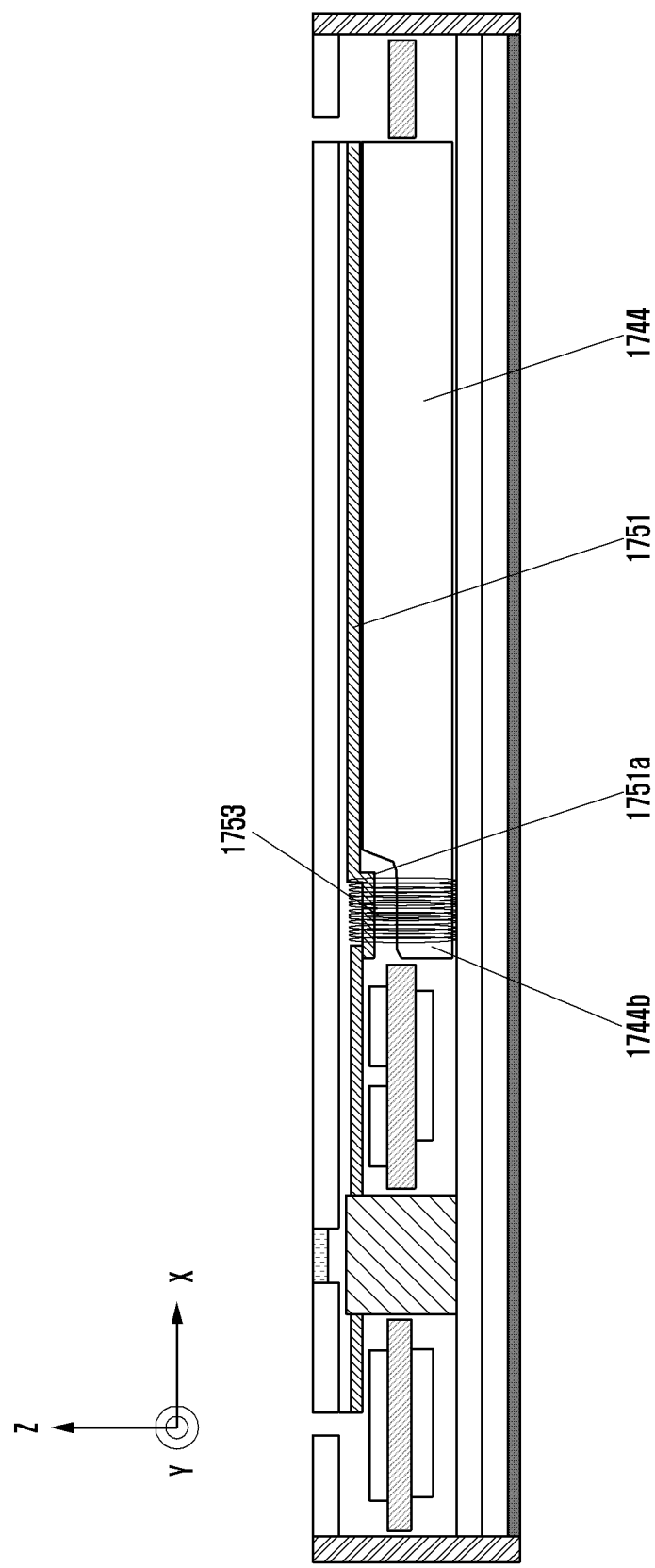
FIG. 17 is a cross-sectional view of an electronic device having a solenoid type of loop antenna according to embodiments of the present disclosure.

FIG. 17 is a cross-sectional view of an electronic device having a solenoid type of loop antenna according to embodiments of the present disclosure.

In FIG. 17, an end portion 1751a of the first metal plate 1751 may be positioned above a second portion 1744b of a battery 1744. A solenoid coil 1753 may be wound around the second portion 1744b and the end portion 1751a of the first metal plate 1751 in a clockwise direction or a counter-clockwise direction, such that the second portion 1744b and the end portion 1751a of the first metal plate 1751 are not wound by individual coils. The first metal plate 1751 may be made of ferrite, soft ferrite, or a ferromagnetic substance. Interlacing and winding the battery 1744 and the first metal plate 1751 together by a solenoid coil 1753 negates the difficulty of winding the solenoid coil 1753 because the ferrite is weakened in strength or the first metal plate 1751 is thin. The first metal plate 1751 may be adhered to the battery 1744 using an adhesive, and thus, may be manufactured into a single body with the battery 1744. Since the electronic device is substantially identical, in configuration and structure, to that of FIG. 6, a detailed description thereof is omitted.

FIGS. 18A and 18B illustrate an electronic device having a solenoid type of loop antenna according to embodiments of the present disclosure. FIGS. 18A and 18B illustrate the rear side of an electronic device and a portion of the components of the electronic device, and differ from FIG. 6 in that the electronic device of FIGS. 18A and 18B further include a structure for decreasing (or shielding) heat produced by the emission of a magnetic field generated by a conductive pattern.

In FIG. 18A, a first heat shielding member 1871 may be shaped as a structure surrounding the outside of a first metal plate 1851, and a second heat shielding member 1872 may be shaped as a structure surrounding the outside of a second metal plate 1852. The first heat shielding member 1871 and the second heat shielding member 1872 may be positioned above the first metal plate 1851 and the second metal plate 1852, respectively. With reference to FIG. 18B, a third heat shielding member 1873 may be positioned within the space of the electronic device, below an upper slit. A fourth heat shielding member 1874 may be positioned within the space of the electronic device, below a lower slit. In addition, heat shielding members may be disposed close to each of the upper slit, the lower slit, and the conductive pattern. It should be understood that electronic devices according to embodiments of the present disclosure may employ any type of heat shielding member if the heat shielding member is capable of shielding or decreasing heat and does not affect a magnetic field.

Figure 19C:
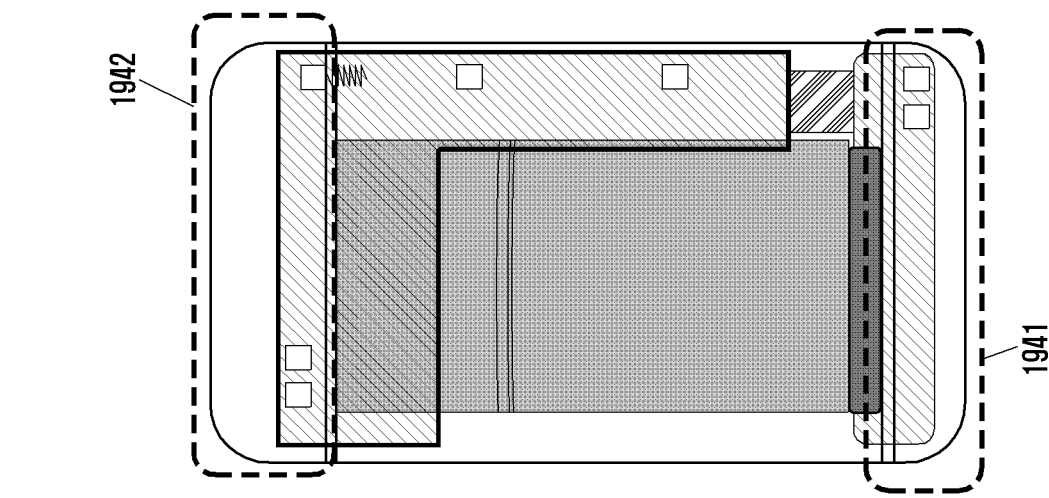
FIGS. 19A, 19B and 19C illustrate an electronic device having a solenoid type of loop antenna according to embodiments of the present disclosure.
Figure 19B:
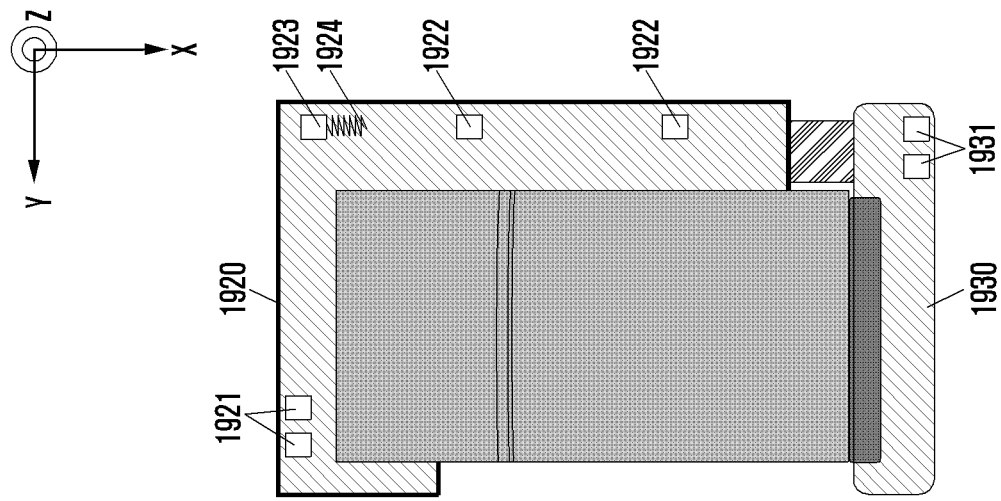
Figure 19A:
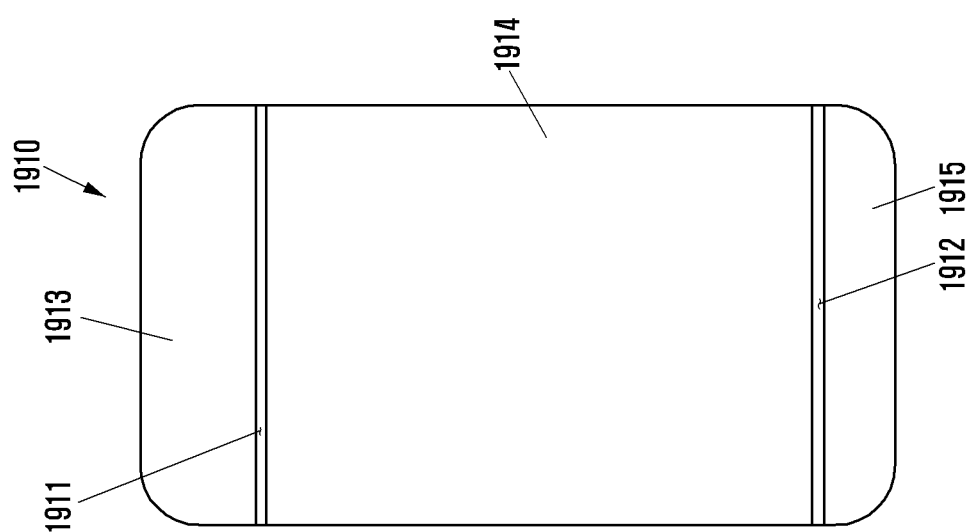

FIGS. 19A, 19B and 19C illustrate an electronic device having a solenoid type of loop antenna according to embodiments of the present disclosure. FIG. 19A illustrates a rear side of an electronic device, FIG. 19B illustrates internal components disposed below the rear side, and FIG. 19C illustrates the rear side and the internal components.

In FIG. 19A, a cover 1910 may form a rear side of the electronic device and may be made of a conductive material. The cover 1910 may be divided into a top area 1913, a middle area 1914, and a bottom area 1915, based on an upper slit 1911 and a lower slit 1912.

In FIGS. 19B and 19C, the top area 1913 may be electrically connected to a first power supply contact 1921 formed on a first substrate 1920 disposed below the top area 1913. The middle area 1914 may be electrically connected to a ground contact 1922 of the first substrate 1920. The bottom area 1915 may be electrically connected to a second power supply contact 1931 formed on a second substrate 1930. Therefore, the bottom area 1915 may serve as a first antenna 1941, and the top area 1913 may serve as a second antenna 1942. In addition, the top area 1913 is electrically connected to a power supply coil 1924 through a third power supply contact 1923 formed on the first substrate 1920, and is thus capable of serving as an NFC antenna.

Figure 20:
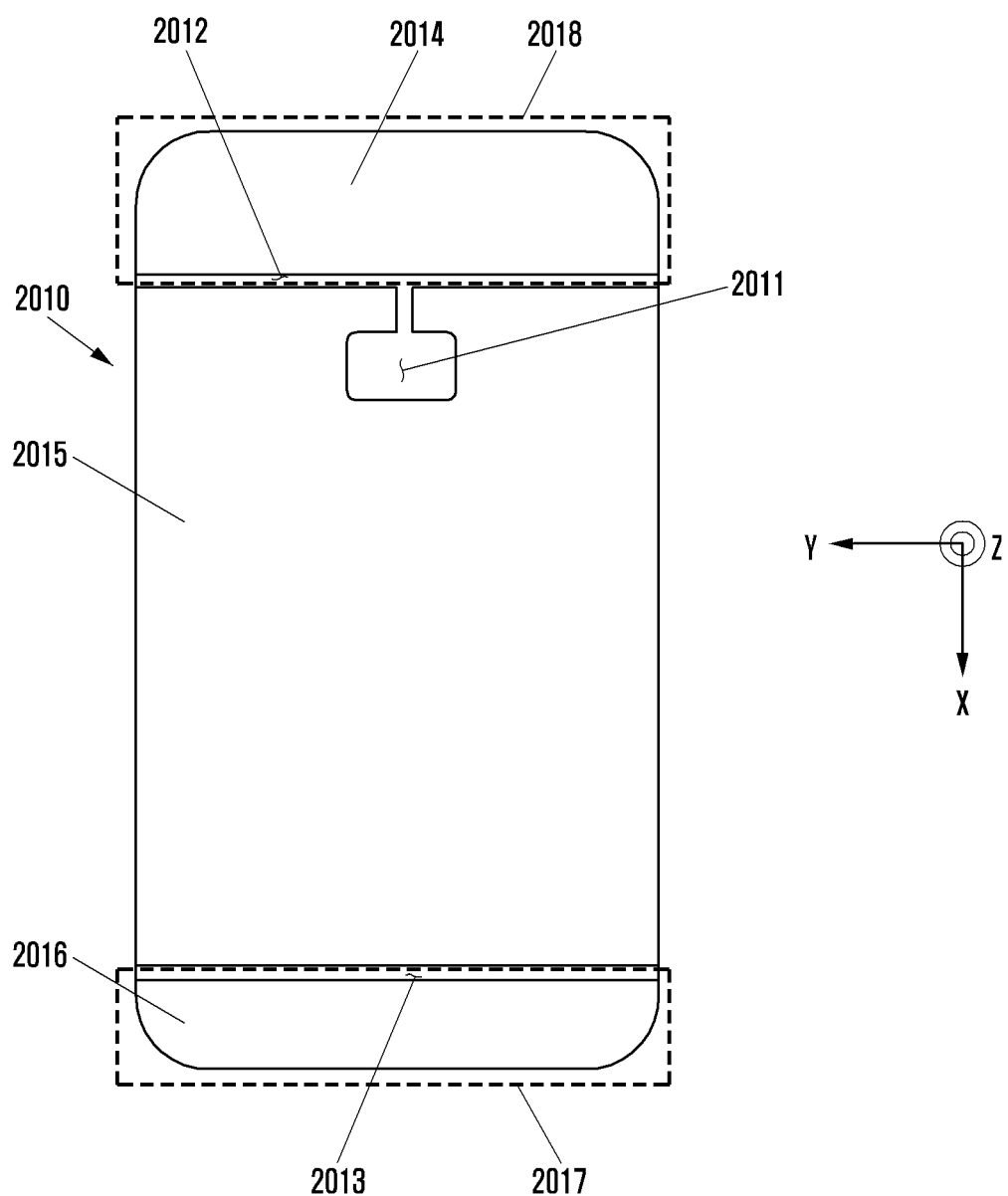
FIG. 20 illustrates a rear side of an electronic device having a solenoid type of loop antenna according to embodiments of the present disclosure.

FIG. 20 illustrates a rear side of an electronic device having a solenoid type of loop antenna according to embodiments of the present disclosure.

In FIG. 20, a cover 2010 may form the rear side of an electronic device and may be made of a conductive material. The cover 2010 may form an opening 2011 through which an optical sensor, a camera or a photoplethysmogram (PPG), is disposed, and may be divided into a top area 2014, a middle area 2015, and a bottom area 2016, based on an upper slit 2012 and a lower slit 2013. The upper slit 2012 communicates with the opening 2011, thereby forming a "T"-shape. The top area 2014 may be electrically connected to a power supply contact formed on a first substrate disposed below the top area 2014. The middle area 2015 may be electrically connected to a ground contact of the substrate. The bottom area 2016 may be electrically connected to another power supply contact formed on a second substrate. Therefore, the bottom area 2016 may serve as a first antenna 2017, and the top area 2014 may serve as a second antenna 2018.

FIGS. 21A, 21B and 21C illustrate an electronic device having a solenoid type of loop antenna according to embodiments of the present disclosure. FIG. 21A illustrates a rear side of an electronic device, FIG. 21B illustrates internal components disposed below the rear side, and FIG. 21C illustrates the rear side and the internal components.

With reference to FIG. 21A, a cover 2120 may form the rear side of an electronic device and may be made of a conductive material. The cover 2120 may form an opening 2126 through which an optical sensor is disposed, and may be divided into a top area 2121, a middle area 2122, and a bottom area 2123, based on an upper slit 2124 and a lower slit 2125. The upper slit 2124 extends, by a certain length, to the lower end of the cover 2120, i.e., to the opening 2126, thereby forming the "T"-shape, as illustrated. Symmetrically, the lower slit 2125 extends, by a certain length, to the upper end of the cover 2120, thereby forming the "T"-shape. The top area 2121 and the middle area 2122 may be electrically connected to each other with a first connection unit 2127. The middle area 2122 and the bottom area 2123 may be electrically connected to each other with a second connection unit 2128.

In FIGS. 21B and 21C, a first metal plate 2131 may be disposed between the upper slit 2124 and the lower slit 2125, and a solenoid coil 2132 may be wound around a portion of the slits. A magnetic flux generated by the solenoid coil 2132 is spread to both the upper slit 2124 and the lower slit 2125 through the first metal plate 2131, and then emitted outside the electronic device. A battery may be positioned below the first metal plate 2131.

The length of the first metal plate 2131 may be shorter than the distance between the upper slit 2124 and the lower slit 2125. In this case, eddy currents may be generated on the cover 2120 or internal conductive parts, and the radiation efficiency may be less than a preset reference value. Therefore, the second metal plate 2133 or third metal plate 2134 may be adhered adjacent (or in contact) to both ends of the first metal plate 2131, which reduces the generation of eddy currents and thus smoothly spreads a magnetic flux to the slits. The second metal plate 2133 or the third metal plate 2134 may be used as an emitting body operating in another communication mode. For example, the first metal plate 2131 is combined with the second metal plate 2133 and the third metal plate 2134, and then used as an emitting body for MST. The second metal plate 2133 or third metal plate 2134 may be used as an emitting body for short-range communication or wireless charging. That is, the second metal plate 2133 and the third metal plate 2134 may be adjacently disposed to the upper slit 2124 and the lower slit 2125, respectively. Therefore, a magnetic flux generated by the second metal plate 2133 or third metal plate 2134 may be emitted to the outside through the upper slit 2124 or the lower slit 2125.

The first metal plate 2131 may have a magnetic permeability that differs from those of the second metal plate 2133 and the third metal plate 2134. The second metal plate 2133 may have a magnetic permeability that differs from that of the third metal plate 2134. For example, if the first metal plate 2131, the second metal plate 2133, and the third metal plate 2134 are used for MST, NFC, and wireless charging, respectively, their operating frequencies may differ from each other, such as 13.56 MHz for NFC, 100 KHz-205 KHz for wireless inductive charging, 6.78 MHz-13.56 MHz for resonant wireless charging, and 100 KHz or less for MST. Therefore, the magnetic permeability of metal plates may also differ from each other. Although the metal plates are used for different uses, the second metal plate 2133 and the third metal plate 2134 spread a magnetic flux from the first metal plate 2131, to the slits, thereby improving the MST performance.

The lower portion of the lower slit 2125 of the cover 2120 may be used as an antenna. For example, the left portion of the second connection unit 2128 may serve as a first antenna 2141 and the right portion may serve as a second antenna 2142. The first antenna 2141 and the second antenna 2142 may be electrically connected to a second substrate 2160, may receive and emit a signal from a communication circuit through a first power supply contact 2161 and a second power supply contact 2162 disposed on the second substrate 2160, may receive a radio signal and transmit the received signal to the communication circuit through a first power supply contact 2161 and a second power supply contact 2162, and may serve as a main antenna for performing the transmission/reception of signals. The first antenna 2141 may support a higher frequency than the second antenna 2142. For example, the first antenna 2141 may support 1.6 GHz-5 GHz, and the second antenna 2142 may support 600 MHz-2 GHz.

The upper portion of the upper slit 2124 of the cover 2120 may be used as an antenna. For example, the right portion of the first connection unit 2127 may serve as a third antenna 2143 and the left portion may serve as a fourth antenna 2144. The third antenna 2143 and the fourth antenna 2144 may be electrically connected to the first substrate 2150, may receive and emit a signal from a communication circuit through the third power supply contact 2151 and the fourth power supply contact 2152 disposed on the first substrate 2150, may receive a radio signal and transmit the received signal to the communication circuit through the third power supply contact 2151 and the fourth power supply contact 2152, and may serve as a diversity antenna for receiving signals. The third antenna 2143 may support a higher frequency than the fourth antenna 2144. For example, the third antenna 2143 may support 1.6 GHz-5 GHz, and the fourth antenna 2144 may support 600 MHz-2 GHz.

The first connection unit 2127 and the second connection unit 2128 may be disposed opposite each other on the X-axis. The first antenna 2141 and third antenna 2143 supporting a similar frequency range and the second antenna 2142 and fourth antenna 2144 supporting a similar frequency range are each positioned in a diagonal direction, thereby increasing the isolation between the antennas and decreasing the correlation in the transmission/reception of signals.

The middle area 2122 between the slits of the cover 2120 may be electrically connected to the ground contacts 2153 of the first substrate 2150 through capacitors in order to prevent electric shock and increase the performance and noise shielding effect of the antenna.

The first substrate 2150 and the second substrate 2160 may differ in height and be connected to each other with an FPCB 2170. The second substrate 2160 may be disposed lower than the first substrate 2150. The distance between the second substrate 2160 and the first and second antennas 2141 and 2142 on the Z-axis may be greater than that between the first substrate 2150 and the first and second antennas 2141 and 2142. If the distance between the second substrate 2160 and the first and second antennas 2141 and 2142 increases, the performance of the first and second antennas 2141 and 2142 also increases. A circuit of the first substrate 2150 and a power supply module of the second substrate 2160 may be connected to each other through a coaxial cable.

Figures 22A, 22B, 22C:
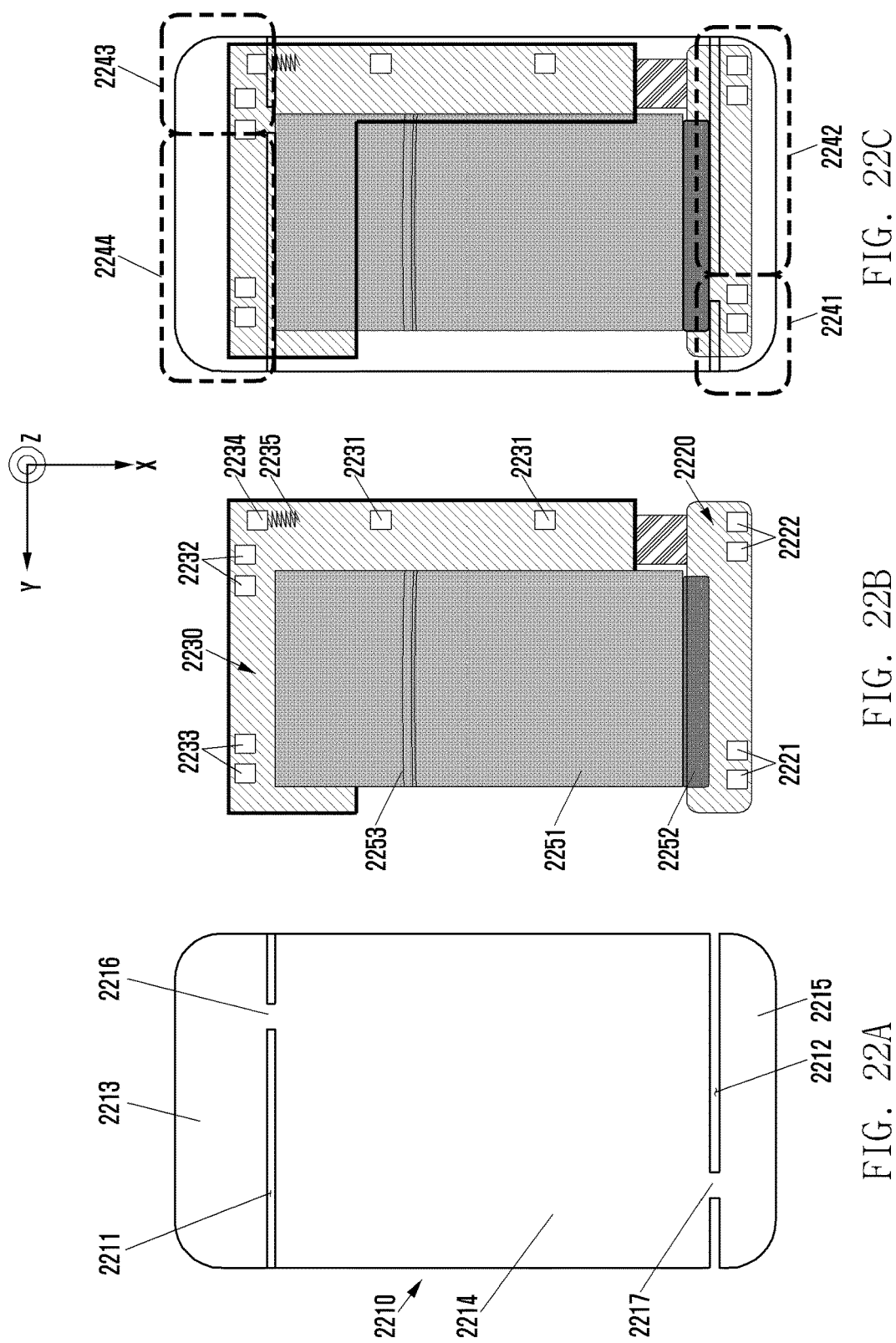
FIGS. 22A, 22B and 22C illustrate an electronic device having a solenoid type of loop antenna according to embodiments of the present disclosure.

FIGS. 22A, 22B and 22C illustrate an electronic device having a solenoid type of loop antenna according to embodiments of the present disclosure. FIG. 22A illustrates a rear side of an electronic device, FIG. 22B illustrates internal components disposed below the rear side, and FIG. 22C illustrates the rear side and the internal components.

In FIG. 22A, a cover 2210 may form a rear side of the electronic device and may be made of a conductive material. The cover 2210 may be divided into a top area 2213, a middle area 2214, and a bottom area 2215, based on an upper slit 2211 and a lower slit 2212. The top area 2213 and the middle area 2214 may be electrically connected to each other with a first connection unit 2216. The middle area 2214 and the bottom area 2215 may be electrically connected to each other with a second connection unit 2217.

In FIGS. 22B and 22C, the left portion of the second connection unit 2217 of the bottom area 2215 is electrically connected to a first power supply contact 2221 formed on the second substrate 2220 disposed below the left part, and thus serves as a first antenna 2241. The right portion of the second connection unit 2217 of the bottom area 2215 is electrically connected to a second power supply contact 2222 formed on the second substrate 2220, and thus serves as a second antenna 2242. The middle area 2214 may be electrically connected to ground contacts 2231 of the first substrate 2230. The right portion of the first connection unit 2216 of the top area 2213 is electrically connected to a third power supply contact 2232 formed on the first substrate 2230 disposed below the right part, and thus serves as a third antenna 2243. The left portion of the first connection unit 2216 of the top area 2213 is electrically connected to a fourth power supply contact 2233 formed on the first substrate 2230, and thus serves as a fourth antenna 2244.

In addition, the right portion of the first connection unit 2216 may be electrically connected to a power supply coil 2235, such as an inductor, through a fifth power supply contact 2234 formed on the first substrate 2230. Therefore, the right portion of the first connection unit 2216 may serve as an NFC antenna. The fifth power supply contact 2234 and power supply coil 2235 and their NFC antenna operations may also be applied to the electronic device shown in FIG. 21 or 20 in the same manner as described above. Meanwhile, as described above, the upper end of the first metal plate 2251 may extend up to the upper slit 2211. The lower end of the first metal plate 2251 may not reach the lower slit 2212; however, a second metal plate 2252 is disposed between the lower end and the lower slit 2212. Therefore, a magnetic flux generated by a solenoid coil 2253 may be spread to the lower slit 2212 through the second metal plate 2252.

FIGS. 23A and 23B illustrate the connection of a solenoid type of loop antenna and a substrate in an electronic device, according to embodiments of the present disclosure.

With reference to FIG. 23A, a solenoid coil 2330 may be wound around a portion of a first metal plate 2320 disposed above a battery 2310, and both ends of the solenoid coil 2330 may be connected to a first communication circuit 2351 positioned on the PCM 2340. The first communication circuit 2351 and a second communication circuit 2352 mounted on a PCB 2350 may be connected to each other with a connector cable 2360 that includes battery power lines (V+, V−) and signal lines (MST+, MST−), and a signal line connected to an identification (ID) resistor of the battery 2310. According to an embodiment, a second metal plate 2370 may be disposed at one side of the first metal plate 2320, which improves the radiation efficiency of a magnetic flux generated by the solenoid coil 2330. According to an embodiment, the first metal plate 2320 and the second metal plate 2370 may be formed into to a single metal plate.

In FIG. 23B, the solenoid coil 2330 may be directly connected to the second communication circuit 2352 without the PCM 2340.

FIGS. 24A, 24B, 24C, 24D, 24E and 24F illustrate scores indicating test results of the radiation efficiency measured by variously altering the antenna structure of an electronic device according to embodiments of the present disclosure.

Figure 24A:
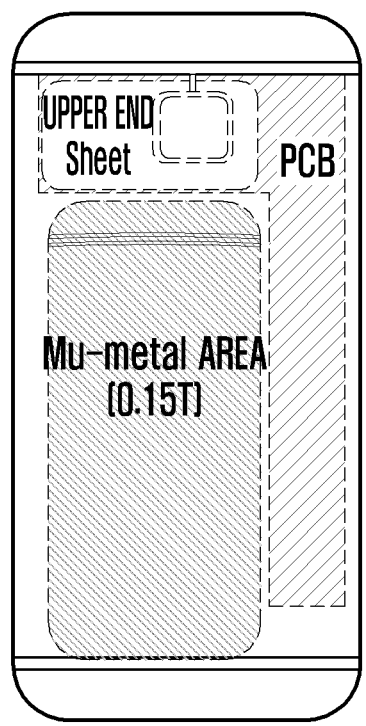
FIGS. 24A, 24B, 24C, 24D, 24E and 24F illustrate scores indicating test results of the radiation efficiency measured by variously altering the antenna structure of an electronic device according to embodiments of the present disclosure.

In FIG. 24A and FIG. 6A, the score '77' indicates the radiation efficiency of the loop antenna 650 is measured when the first metal plate 651 of the electronic device shown in FIG. 6 is implemented with a magnetic substance (0.15 T (mm)) and the second metal plate 652 is implemented with a ferrite.

Figure 24B:
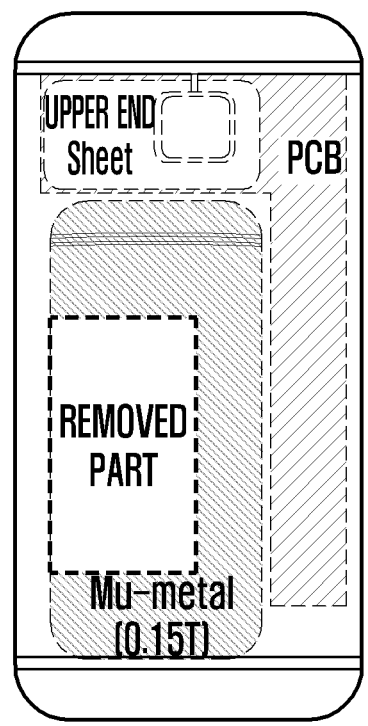

In FIG. 24B, when a portion of the magnetic substance is removed and the radiation efficiency of the loop antenna 650 is measured, the score is 42, indicating performance degradation.

Figure 24C:
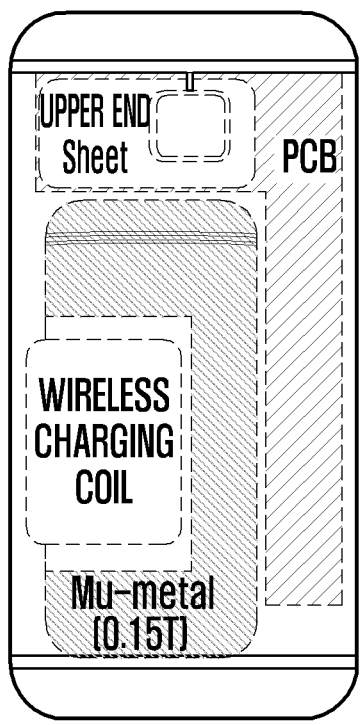

In FIG. 24C, when a wireless charging coil of an magnetic inductive mode (wireless power consortium (WPC)) is installed to a portion from which the magnetic substance is removed, and the radiation efficiency of the loop antenna 650 is measured, the score is 58. This indicates improved performance.

Figure 24D:
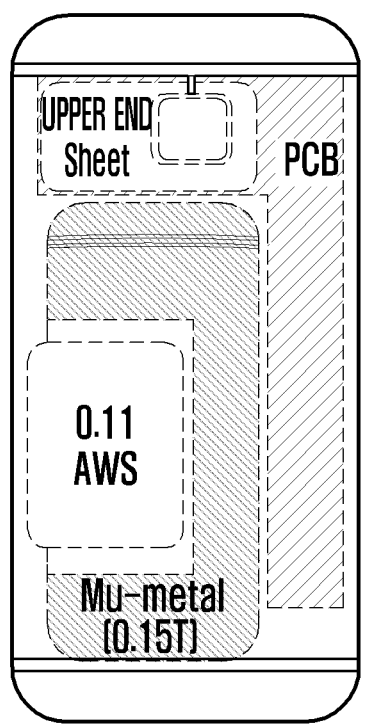
Figure 24E:
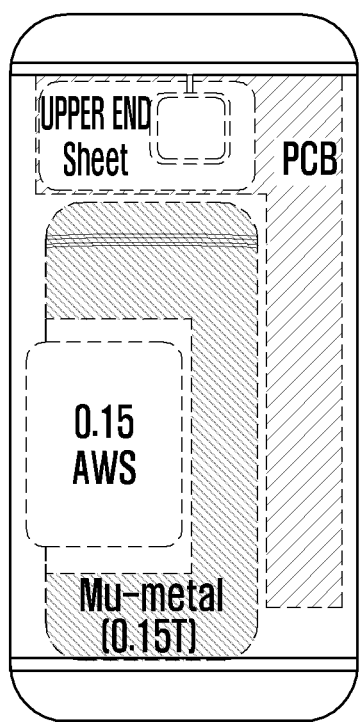
Figure 24F:
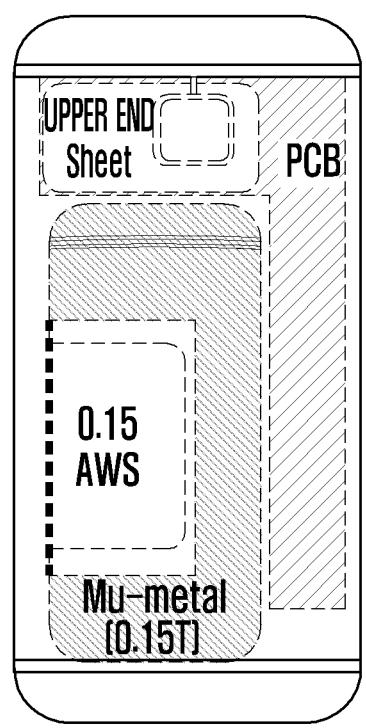

In FIG. 24D, when an American welding society (AWS) Sheet (μ (magnetic permeability)=750, 0.11 T), instead of a wireless charging coil, is adhered to a portion from which the magnetic substance is removed, and the radiation efficiency of the loop antenna 650 is measured, the score is 67. This indicates additional performance improvement. In FIG. 24E, the radiation efficiency of a relatively thicker AWS Sheet (μ=750, 0.15 T) is measured, and the score is 71. In FIG. 24F, a portion of the AWS Sheet (μ=750, 0.15 T) is removed, and the sheet is measured, resulting in the radiation efficiency improvement to a score of 74.

From the above performance test result, it can be appreciated that performance degradation varies depending on the magnetic permeability, thickness, and shape of a shielding material.

FIGS. 25A, 25B, 25C, 25D and 25E illustrate scores indicating test results of the radiation efficiency measured by variously altering the antenna structure of an electronic device according to embodiments of the present disclosure.

Figure 25A:
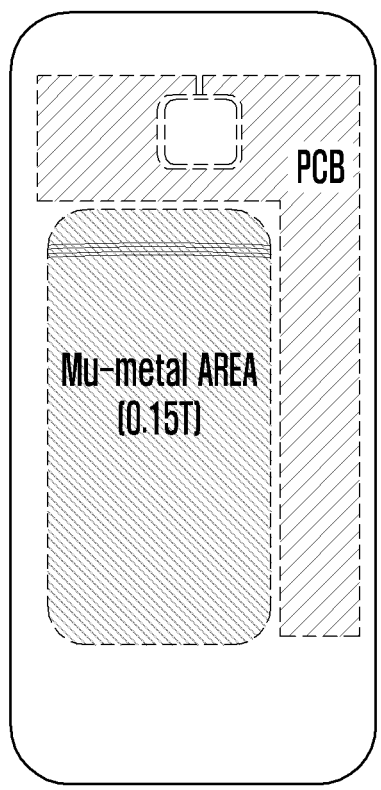
FIGS. 25A, 25B, 25C, 25D and 25E illustrate scores indicating test results of the radiation efficiency measured by variously altering the antenna structure of an electronic device according to embodiments of the present disclosure.

In FIG. 25A, an electronic device may have a rear side metal cover without a slit. When a solenoid type of loop antenna having a magnetic substance (0.15 T) is disposed below the cover, and the radiation efficiency is measured, the score is 42, indicating considerable performance degradation as compared with the test results described above in FIGS. 24A-24F.

Figure 25B:
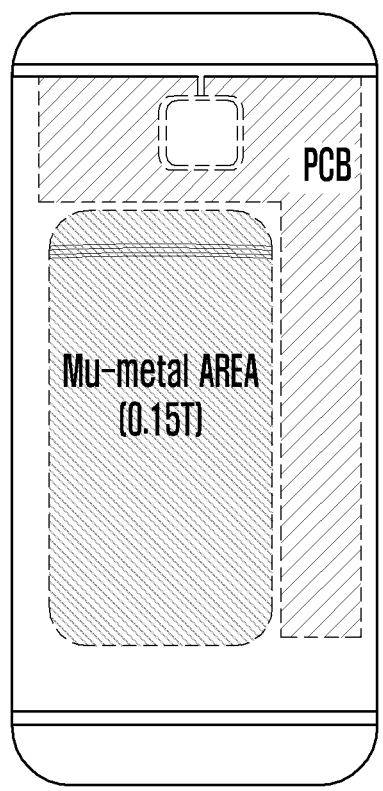

In FIG. 25B, when a slit of 1.5 mm is formed in the upper/lower end of the rear side metal cover, if the radiation efficiency is tested, the score is 56, indicating some performance improvement.

Figure 25C:
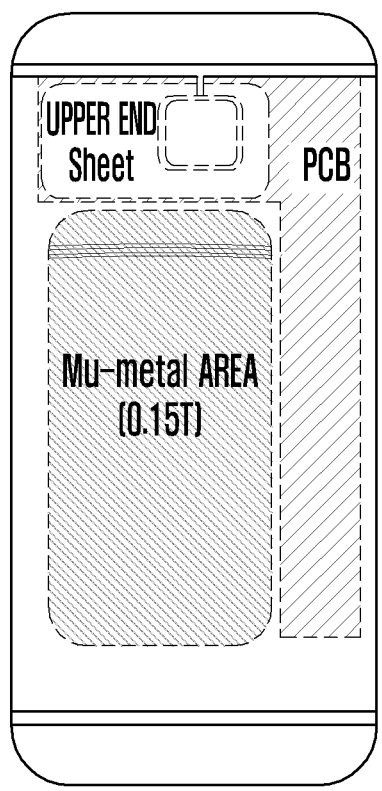
Figure 25D:
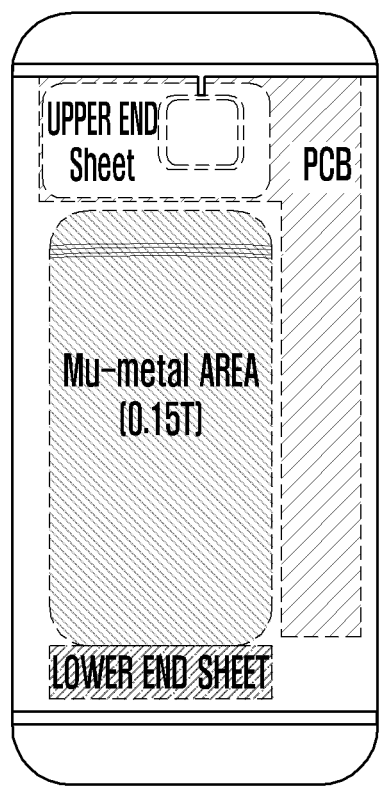
Figure 25E:
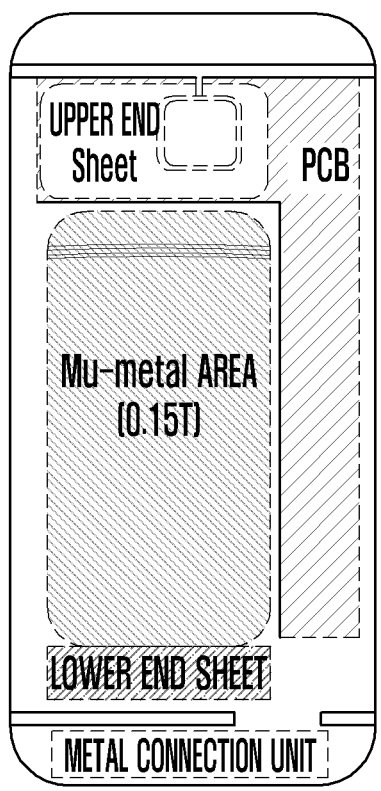

In FIG. 25C, when an upper/lower end slit is formed in the rear side metal cover, and a sheet (second metal plate) is added to the upper end of a magnetic substance (first metal plate), the score is 78, which indicates further performance improvement. In FIG. 25D, if a sheet (third metal plate) is added to the lower end of the magnetic substance, the score is 80, indicating even further performance improvement. In FIG. 25E, if a connection unit is added, the score is 76, which indicates some performance degradation.

Figure 26A:
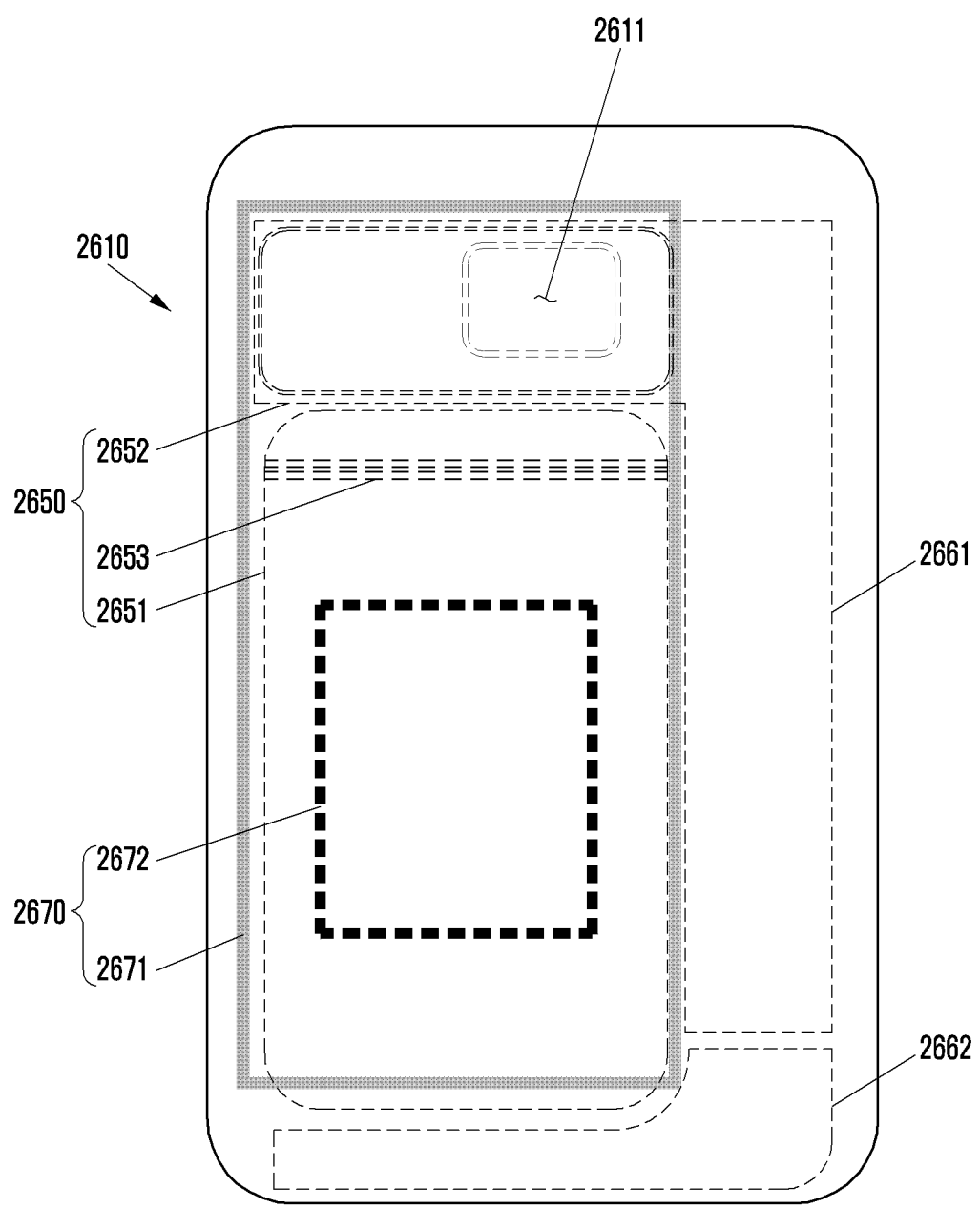
FIGS. 26A and 26B illustrate electronic devices having various types of loop antenna according to embodiments of the present disclosure.
Figure 26B:
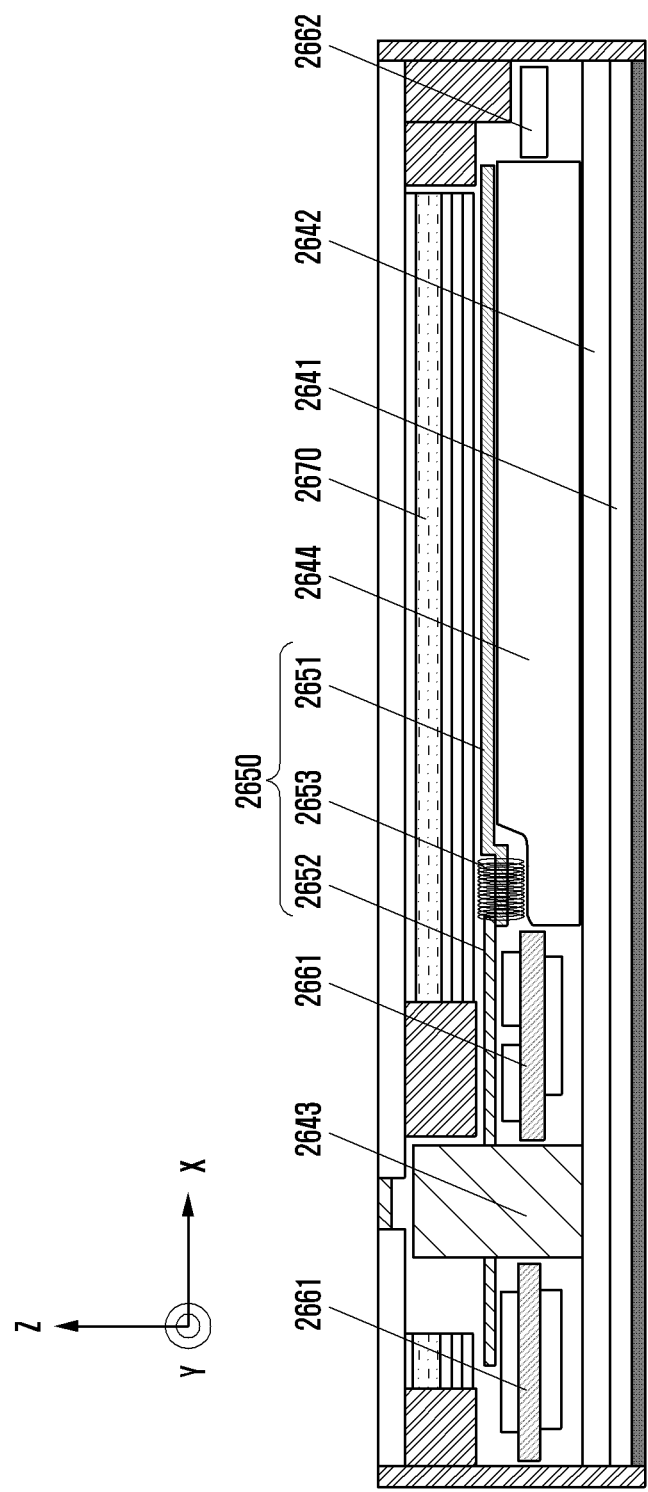

FIGS. 26A and 26B illustrate electronic devices having various types of loop antenna according to embodiments of the present disclosure. FIG. 26A illustrates a rear side of an electronic device and a flat type of loop antenna installed inside the electronic device, and FIG. 26B is a cross-sectional view of the electronic device.

In FIG. 26A, the rear side cover 2610 of an electronic device may form an opening 2611 through which an optical sensor is disposed, and may be made of a non-conductive material, such as plastic or glass.

In FIGS. 26A and 26B, a display 2641, a support structure 2642, a camera 2643, a battery 2644, a solenoid type of first loop antenna 2650, a first substrate 2661, and a second substrate 2662 are positioned in the housing of the electronic device. The first loop antenna 2650 may include a first metal plate 2651, a second metal plate 2652, and a solenoid coil 2653. When viewed from above the rear side cover 2610, a second loop antenna 2670 is positioned above the first loop antenna 2650 and is a flat type of antenna, including a first coil 2671 and a second coil 2672 that are included in an FPCB adhered to the lower side of the rear side cover 2610. The second loop antenna 2670 may support a communication mode that differs from the communication mode supported by the first loop antenna 2650. For example, the first loop antenna 2650 may be used for MST, the first coil 2671 may be used for NFC, and the second coil 2672 may be used for wireless charging.

As described above in FIG. 3B, the second loop antenna 2670 may generate a magnetic field in the Z-axis direction. This magnetic field may cause performance degradation or malfunction in other electronic parts. The metal plate 2650 forming a first loop antenna may shield electronic parts from the magnetic field. For example, since a portion of the first substrate 2661 is positioned below the first coil 2671 and portion (metal plate) of the first loop antenna 2650 is positioned between the portion of the first substrate 2661 and the first coil 2671, the metal plate may shield electronic parts, positioned in portion of the first substrate 2661, from the magnetic field that the first coil 2671 generates in the Z-axis direction.

Figure 27A:
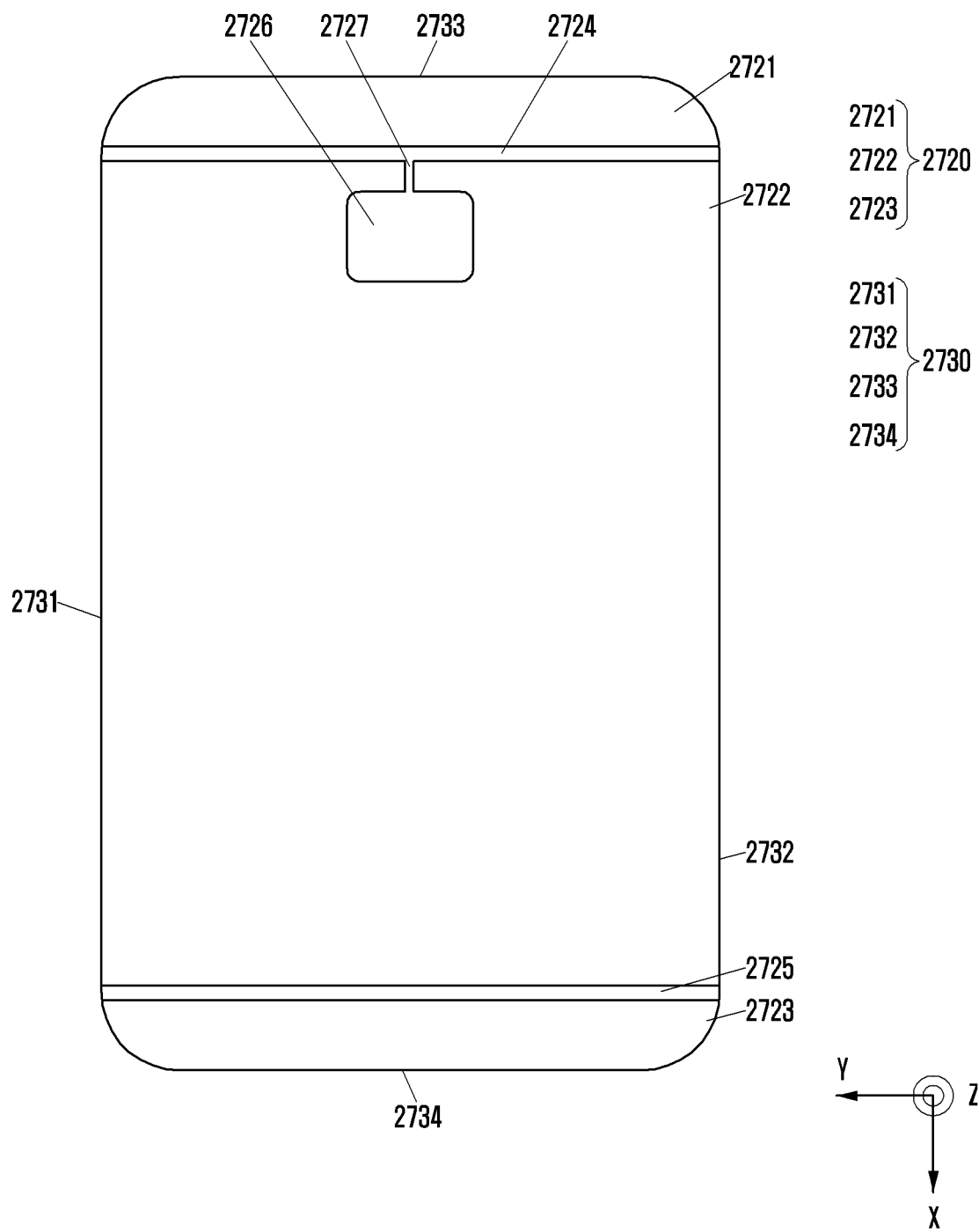
FIGS. 27A, 27B and 27C illustrate an electronic device having a solenoid type of loop antenna according to embodiments of the present disclosure.
Figure 27B:
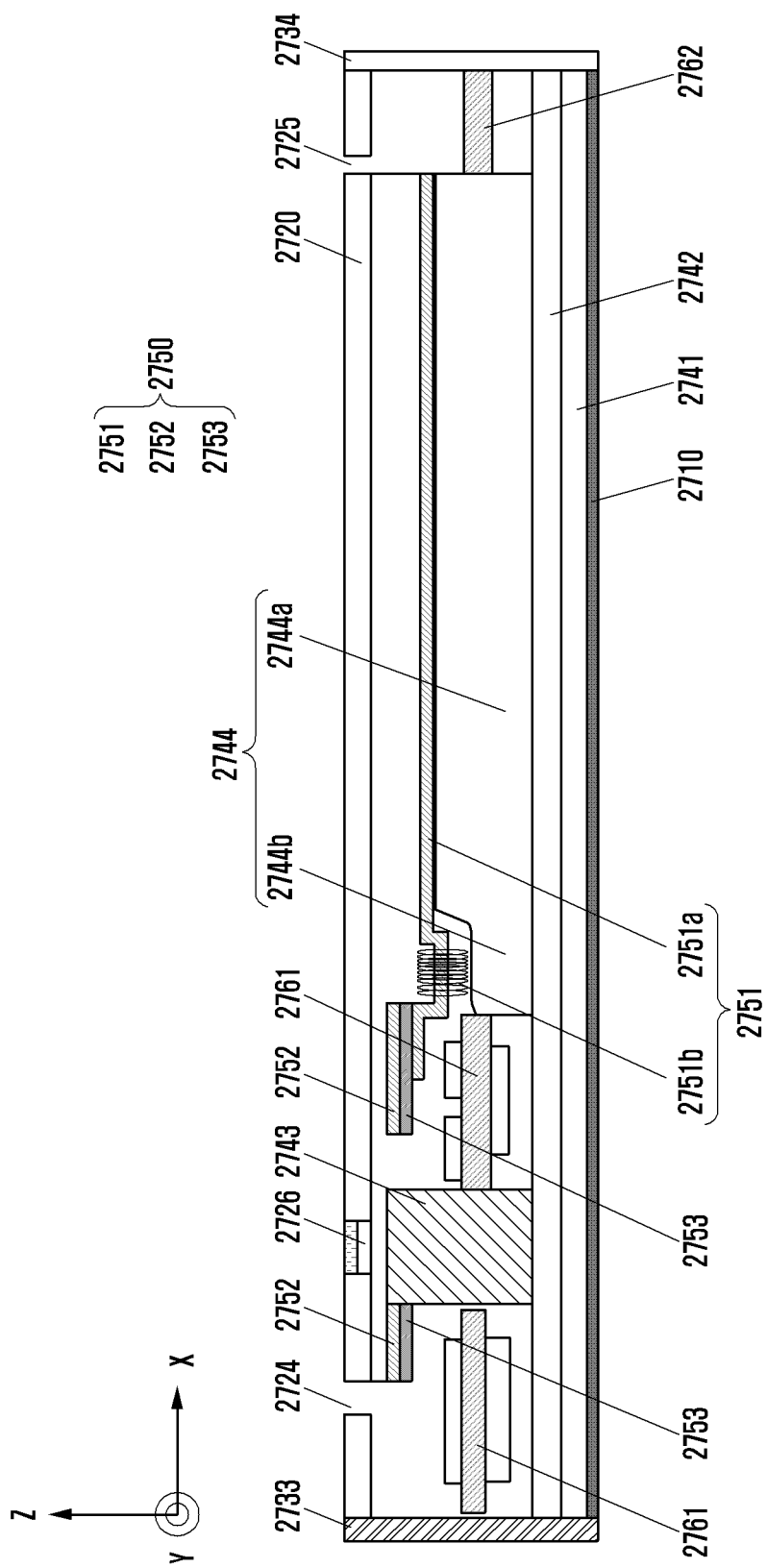
Figure 27C:
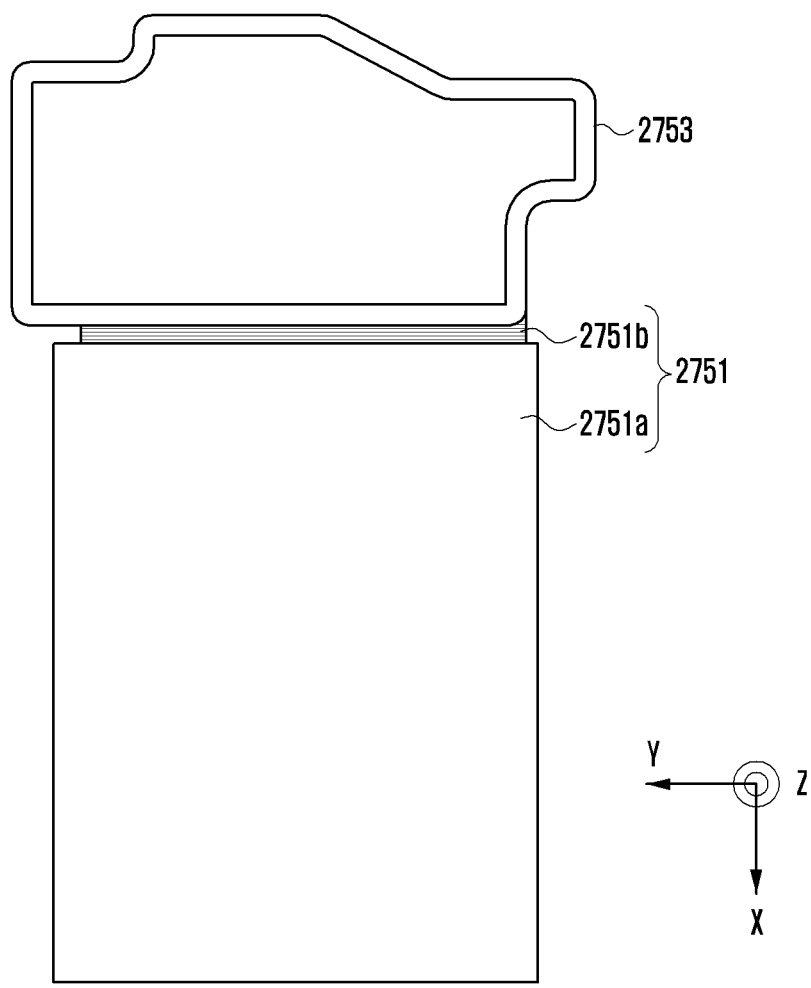

FIGS. 27A, 27B and 27C illustrate an electronic device having a solenoid type of loop antenna according to embodiments of the present disclosure. FIG. 27A illustrates a rear side of an electronic device. FIG. 27B is a cross-sectional view of the electronic device. FIG. 27C illustrates a loop antenna positioned below the rear side.

In FIGS. 27A and 27B, an electronic device is capable of including various electronic parts and a housing for protecting the electronic parts. The housing may include a first surface 2710 that configures a front side of the electronic device and faces in a first direction, a second surface 2720 that configures a rear side of the electronic device and faces in a second direction substantially opposite the first direction, and a side member 2730 that encloses at least portion of the space between the first surface 2710 and the second surface 2720. A display 2741 may be exposed through portion of the first surface 2710. The side member 2730 may include a right side cover 2731 forming the right side of the electronic device, a left side cover 2732 forming the left side of the electronic device, a top side cover 2733 forming the top side of the electronic device, and a bottom side cover 2734 forming the bottom side of the electronic device.

In FIG. 27A, the second surface 2720 may be made of a conductive material and may be anodized to be colored. The second surface 2720 may be divided into a top area 2721, a middle area 2722, and a bottom area 2723. For example, the top area 2721 and the middle area 2722 may be divided by an upper slit 2724 formed as a straight line in the Y-axis (left-right) direction, and the middle area 2722 and the bottom area 2723 may be divided by a lower slit 2725 formed as a straight line in the Y-axis (left-right) direction. The middle area 2722 may form an opening 2726 in a portion close to the upper slit 2724 in order to reveal a lens of a camera. Another slit 2727 connecting the opening 2726 and the upper slit 2724 may be formed between the opening 2726 and the upper slit 2724 in the X-axis (vertical) direction.

In FIGS. 27B and 27C, a display 2741, a support structure 2742, a camera 2743, a battery 2744, a loop antenna 2750, a first substrate 2761, and a second substrate 2762 are positioned inside the housing. When viewed from above the second surface 2720, the display 2741 may be disposed above the first surface 2710, and the support structure 2742 configured to support the first surface 2710 may be disposed above the display 2741. The camera 2743, battery 2744, first substrate 2761, and second substrate 2762 may be disposed above the support structure 2742. The camera 2743 is disposed below the opening 2726 inside the housing, through which the lens is exposed. In addition, the first substrate 2761 may form an opening through which the camera 2743 is exposed to the outside. The battery 2744 is capable of supplying power to various electronic parts within the housing, and electronic parts mounted on the first substrate 2761 and the second substrate 2762.

The loop antenna 2750 may be attached to the second surface 2720. Alternatively, an air gap may be between the loop antenna 2750 and the second surface 2720. The loop antenna 2750 may include a first loop antenna 2751 of a solenoid type, a second loop antenna 2752 of a flat type, and a first metal plate 2753. The first loop antenna 2751 may include a second metal plate 2751a and a solenoid coil 2751b. When viewed from above the second surface 2720, the first metal plate 2753 may have a plane substantially parallel to the first surface 2710 or the second surface 2720, and may be disposed above on part of the first substrate 2761 close to the upper slit 2724. The first metal plate 2753 may form an opening through which the camera 2743 is exposed to the outside. The first loop antenna 2751 may be implemented using an FPCB, and disposed above the first metal plate 2753. If an opening is formed in the first metal plate 2753, the camera 2743 may be exposed through the opening. The second metal plate 2751a may have a plane substantially parallel to the first surface 2710 or the second surface 2720, and may be disposed above the battery 2744.

The loop antenna 2750 may be disposed between the upper slit 2724 and the lower slit 2725. For example, one end portion of the first metal plate 2753 may be disposed above one end portion of the second metal plate 2751a, and the other end portion of the first metal plate 2753 may extend close to the upper slit 2724. The other end portion of the second metal plate 2751a may extend close to the lower slit 2725.

The solenoid coil 2751b may be a wire wound a number of times around a portion of the second metal plate 2751a in the X-axis direction substantially horizontal to the second substrate 2762. For example, a wire may be wound around the end of the second metal plate 2751a, close to the first metal plate 2753, and both ends of the wire may be electrically connected to a communication module mounted on the first substrate 2761 or the second substrate 2762. The first metal plate 2753 and the second metal plate 2751a may serve as a core to increase magnetic force generated by the solenoid coil 2751b. That is, a magnetic flux generated by the solenoid coil 2751b may be spread to the slits 2724 and 2725 through the first metal plate 2753 and the second metal plate 2751a and may be emitted to the outside through the slits 2724 and 2725. Meanwhile, the first metal plate 2753 may serve as a shielding material that prevents a magnetic force line generated by the first loop antenna 2751 from being spread to electronic parts mounted on the first substrate 2761 below the first metal plate 2753.

The battery 2744 may be a pouch type battery and may be divided into a first portion 2744a including a battery cell and a second portion 2744b including a PCM. The first portion 2744a and the second portion 2744b may differ in thickness from each other.

FIGS. 28A, 28B, 28C, 28D, 28E, 28F, 28G, 28H and 28I illustrate various structures of a rear side metal cover installed to an electronic device having a solenoid type of loop antenna according to embodiments of the present disclosure.

Figure 28A:
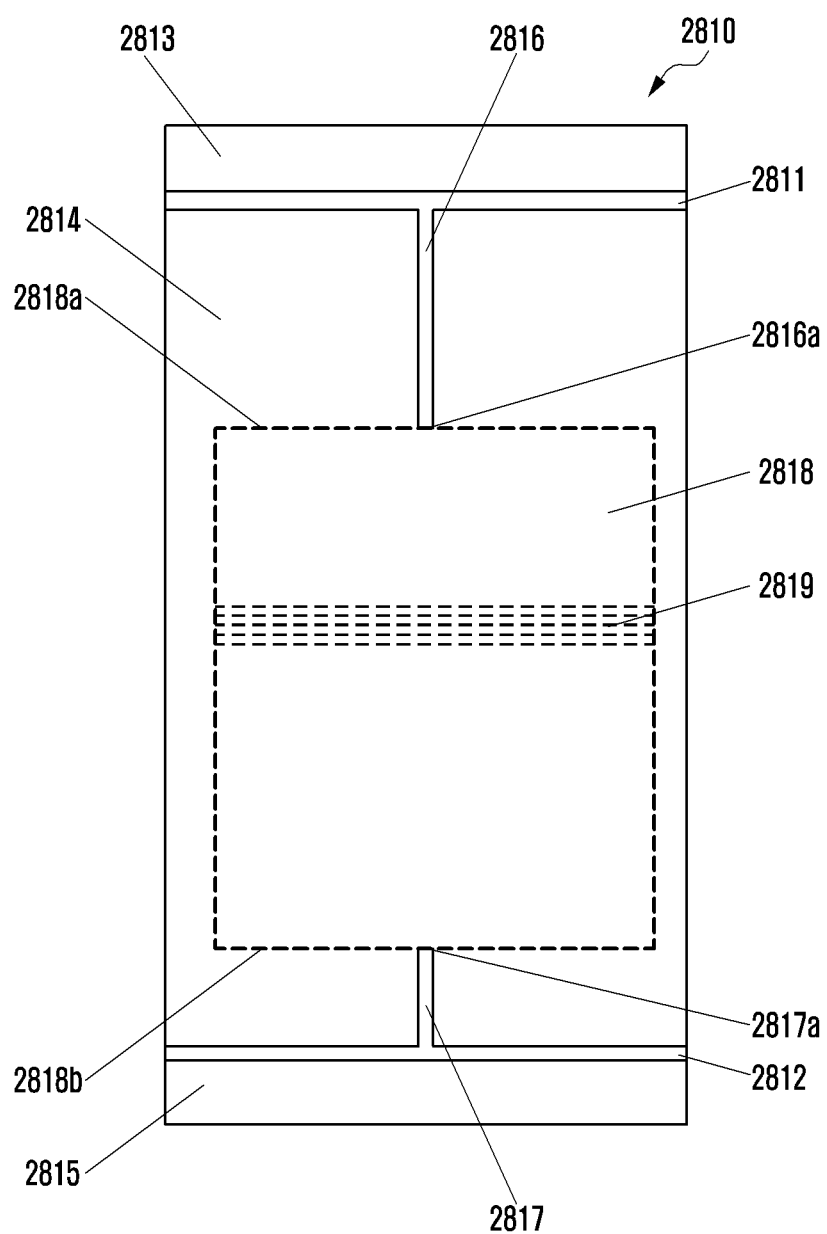
FIGS. 28A, 28B, 28C, 28D, 28E, 28F, 28G, 28H and 28I illustrates various structures of a rear side metal cover installed to an electronic device having a solenoid type of loop antenna according to embodiments of the present disclosure.

In FIG. 28A, a top width slit 2811 and a bottom width slit 2812 may be formed on the rear side metal cover 2810, are positioned at the top and bottom of the rear side metal cover 2810, respectively, and are shaped as a straight line extending up to the left edge and the right edge of the rear side metal cover 2810. Therefore, the rear side metal cover 2810 may be divided into a top area 2813, a middle area 2814, and a bottom area 2815, by the top width slit 2811 and the bottom width slit 2812. A metal plate 2818 and a solenoid coil 2819, wound around portion of the metal plate 2818, may be positioned below the middle area 2814.

A top length slit 2816 may be formed on the middle area 2814 of the rear side metal cover 2810, vertically extending from the top width slit 2811 to the metal plate 2818. As illustrated, the top length slit 2816 extends from the top width slit 2811 to the metal plate 2818, and generally forms a "T"-shape. The end 2816a of the top length slit 2816 may be designed to extend close to the upper end 2818a of the metal plate 2818. Alternatively, the end 2816a of the top length slit 2816 may be designed to extend, surpassing the upper end 2818a of the metal plate 2818, to be positioned above the metal plate 2818. The bottom length slit 2817 may be formed on the middle area 2814 so as to be symmetrical to the top length slit 2816. In FIG. 28A, the bottom length slit 2817 may extend from the bottom width slit 2812 to the metal plate 2818, such that the end 2817a of the bottom length slit 2817 can be close to the lower end 2818b of the metal plate 2818 or can be positioned above the metal plate 2818.

As described above, the upper slits 2811 and 2816 and the lower slits 2812 and 2817 may be disposed symmetrically with respect to the metal plate 2818, forming the letter "T". Therefore, although the length of the metal plate 2818 is shorter than the distance between the top width slit 2811 and the bottom width slit 2812, the top length slit 2816 and the bottom length slit 2817 may reduce the generation of eddy currents, so that a magnetic flux, generated by the solenoid coil 2819, can be smoothly spread to the top width slit 2811 and the bottom width slit 2812, through the metal plate 2818, the top length slit 2816, and the bottom length slit 2817. In order to minimize the generation of the eddy currents described above, various structures of the rear side metal cover are now described in FIGS. 28B, 28C, 28D, 28E, 28F, 28G, 28H and 28I.

Figure 28B:
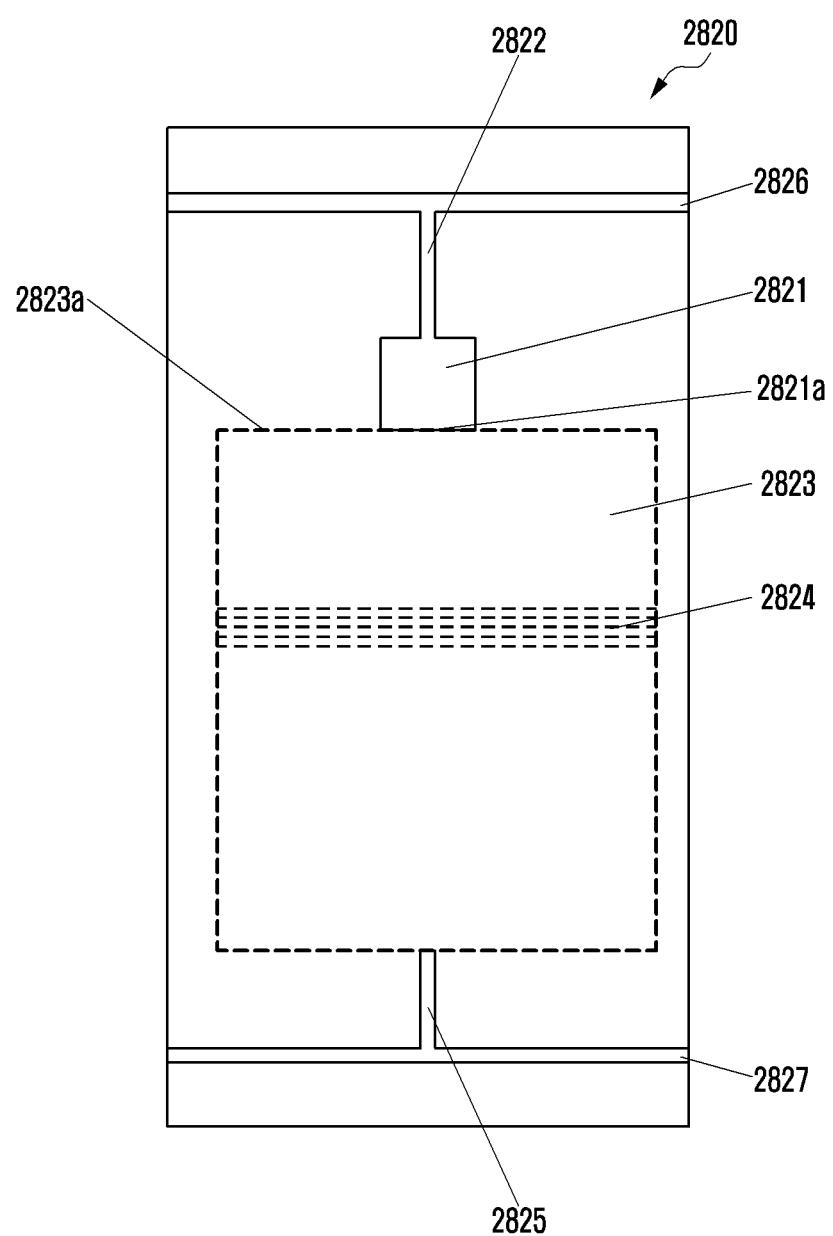

In FIG. 28B, in comparison with the rear side metal cover 2810 shown in FIG. 28A, a rear side metal cover 2820 may further include an opening 2821 extending from the top length slit 2822 to the metal plate 2823, so that the end 2821a may be positioned close to the upper end 2823a of the metal plate 2823 or above the metal plate 2823. The opening 2821 may be used to reveal electronic parts to the outside, and as a medium for transferring the magnetic flux to the slits. That is, a magnetic flux, generated by the solenoid coil 2824, may be smoothly spread to the top width slit 2826 and the bottom width slit 2827, through the metal plate 2823, the top length slit 2822, the opening 2821 and the bottom length slit 2825.

Figure 28C:
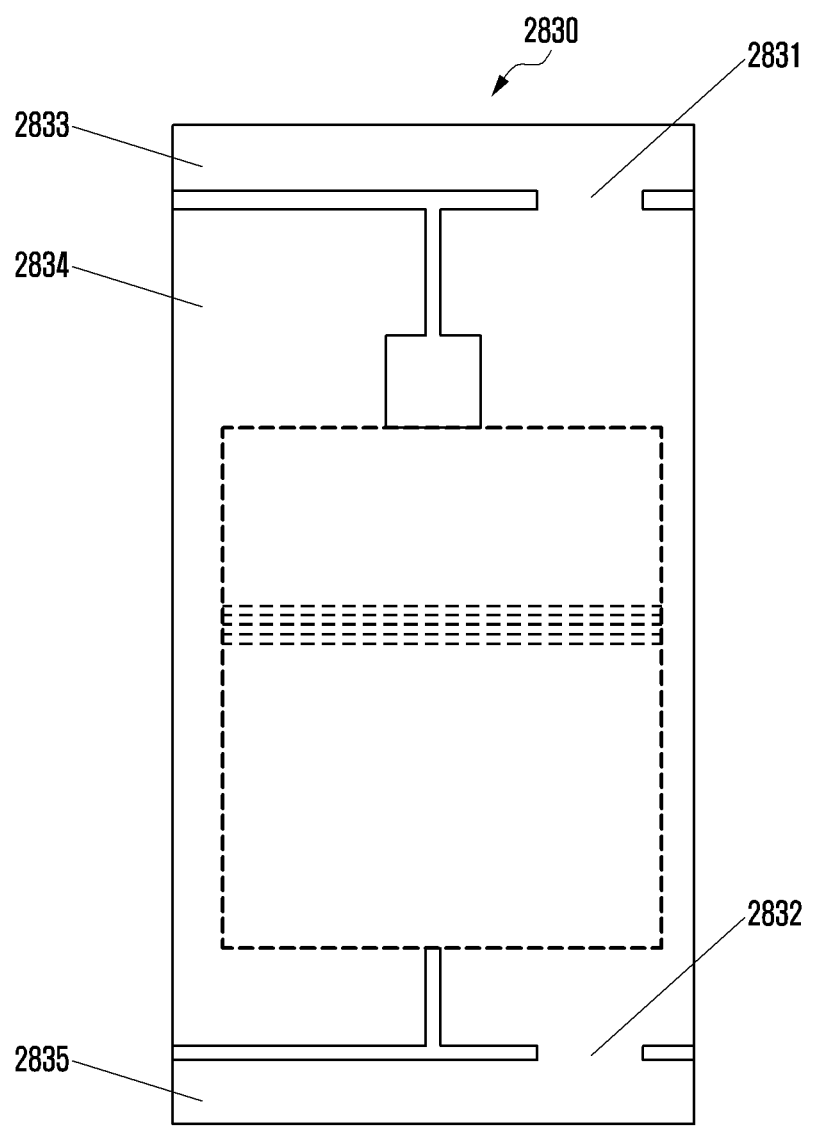

In FIG. 28C, in comparison with the rear side metal cover 2820 shown in FIG. 28B, a rear side metal cover 2830 may further include a first connection unit 2831 and a second connection unit 2832. That is, the top area 2833 and the middle area 2834 may be electrically connected to each other with the first connection unit 2831, and the middle area 2834 and the bottom area 2835 may be electrically connected to each other with the second connection unit 2832.

Figure 28D:
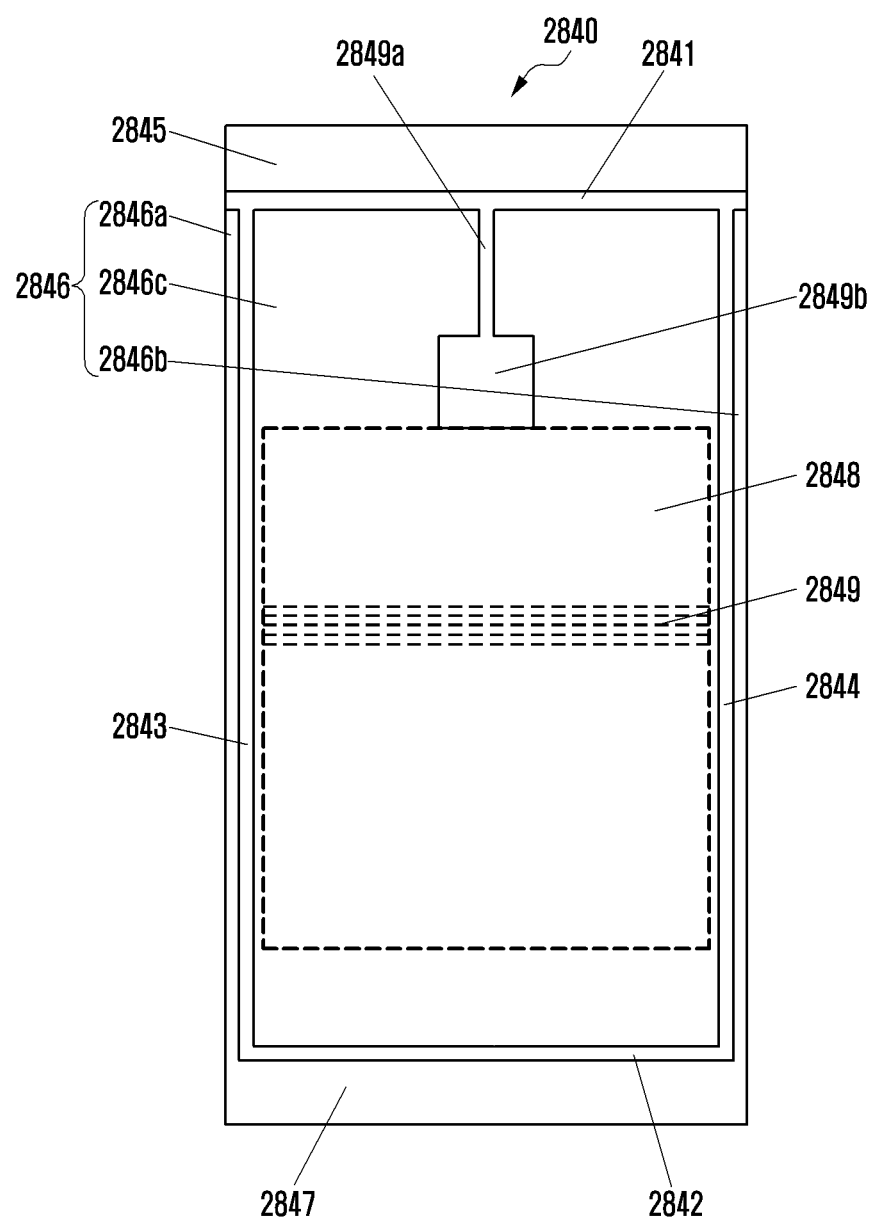

In FIG. 28D, in comparison with the rear side metal cover 2820 shown in FIG. 28B, a rear side metal cover 2840 may further include a first connection slit 2843 and a second connection slit 2844, extending in a straight line form up to a top width slit 2841 and a bottom width slit 2842. The rear side metal cover 2840 may be divided into a top area 2845, a middle area 2846, and a bottom area 2847, by the top width slit 2841 and the bottom width slit 2842. The first connection slit 2843 and the second connection slit 2844 extend up to the top width slit 2841 and the bottom width slit 2842, respectively, which divides the middle area 2846 into a first area 2846a, a second area 2846b, and a third area 2846c positioned between the first area 2846a and the second area 2846b. A metal plate 2848 and a solenoid coil 2849, wound around at least a portion of the metal plate 2848, may be positioned below the third area 2846c.

The first connection slit 2843 and the second connection slit 2844 may serve as media to transfer magnetic flux to the top width slit 2841 and the bottom width slit 2842. That is, the magnetic flux, generated by the solenoid coil 2849, may be smoothly spread to the top width slit 2841 and the bottom width slit 2842, through the metal plate 2848 and the connection slits 2843 and 2844. In addition, a top length slit 2849a and an opening 2849b, extending from the top width slit 2841 to the metal plate 2848, may be formed on the rear side metal cover 2840. The top length slit 2849a and opening 2849b may serve as media for spreading magnetic flux. A bottom length slit extending vertically from the bottom width slit 2842 to the metal plate 2848 may be further formed on the rear side metal cover 2840, to serve as a medium for spreading magnetic flux.

Figure 28E:
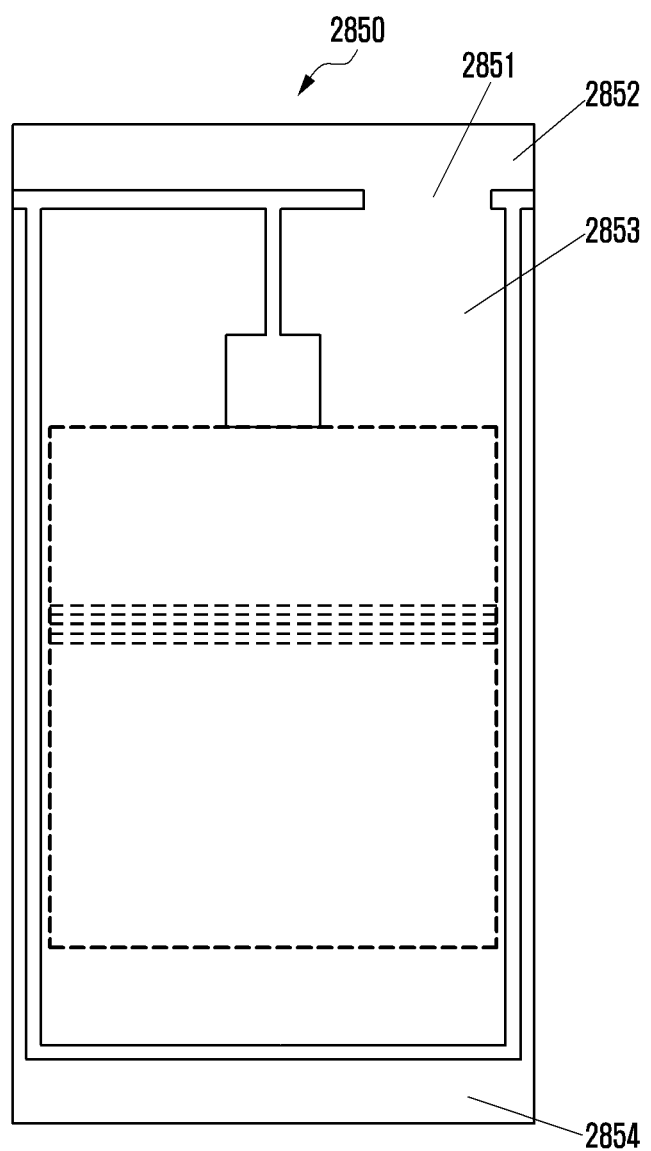

In FIG. 28E, in comparison with the rear side metal cover 2840 shown in FIG. 28D, a rear side metal cover 2850 may further include a first connection unit 2851. That is, the top area 2852 and the third area 2853 may be electrically connected to each other with the first connection unit 2851. A second connection unit electrically connecting the bottom area 2854 and the third area 2853 may be further formed in the rear side metal cover 2850.

Figure 28F:
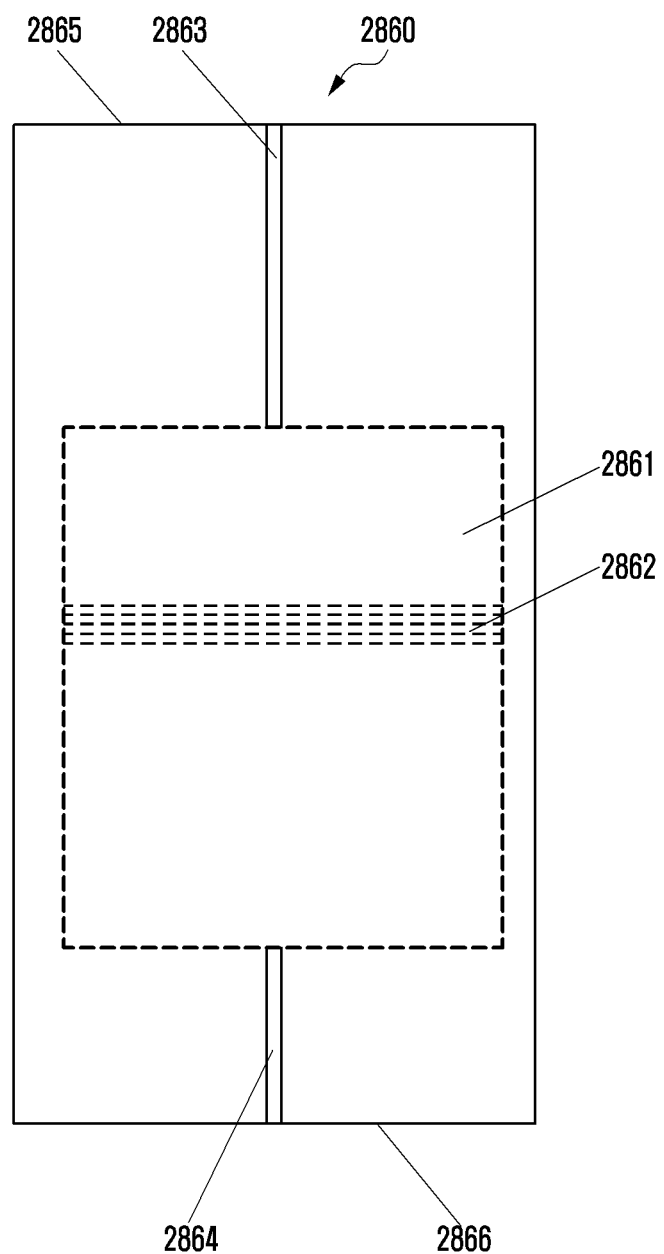

In FIG. 28F, a metal plate 2861 and a solenoid coil 2862, wound around at least a portion of the metal plate 2861, may be positioned below the rear side metal cover 2860. The top length slit 2863 and the bottom length slit 2864 may be formed on the rear side metal cover 2860. The top length slit 2863 extends from the upper end 2865 of the rear side metal cover 2860 to the metal plate 2861. The bottom length slit 2864 extends from the lower end 2866 of the rear side metal cover 2860 to the metal plate 2861. A magnetic flux, generated by the solenoid coil 2862, may be emitted outside the metal cover 2860, through the metal plate 2861, the top length slit 2863, and the bottom length slit 2864.

Figure 28G:
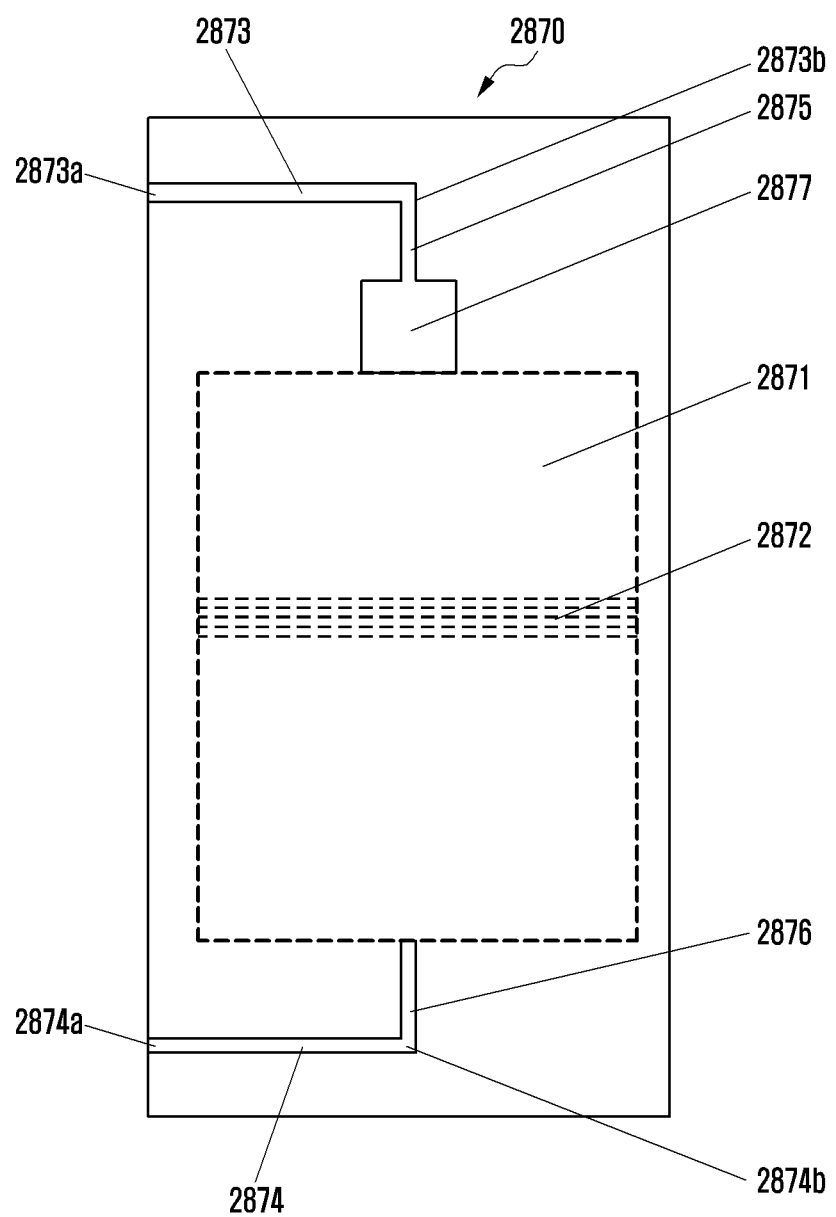

In FIG. 28G, a metal plate 2871 and a solenoid coil 2872, wound around at least a portion of the metal plate 2871, may be positioned below the rear side metal cover 2870. The top width slit 2873 and the bottom width slit 2874 may be formed on the top and bottom of the rear side metal cover 2870, respectively. Either of both ends of the top width slit 2873 may extend up to the left or right edge of the rear side metal cover 2870. As illustrated, the first end 2873a of the top width slit 2873 may extend up to the left edge of the rear side metal cover 2870, the first end 2874a of the bottom width slit 2874 may extend up to the left edge of the rear side metal cover 2870, and the first end 2874a of the bottom width slit 2874 may also extend up to the right edge of the rear side metal cover 2870, symmetrically with the first end 2873a.

In addition, the rear side metal cover 2870 may form a top length slit 2875 extending from the second end 2873b of the top width slit 2873 to the metal plate 2871. In addition, the rear side metal cover 2870 may further form a bottom length slit 2876, symmetrical to the top length slit 2875, and an opening 2877 extending from the top length slit 2875 to the metal plate 2871. A magnetic flux, generated by the solenoid coil 2872, may be smoothly spread to the top width slit 2873 and the bottom width slit 2874, through the metal plate 2871, the top length slit 2875, the opening 2877, and the bottom length slit 2876.

Figure 28H:
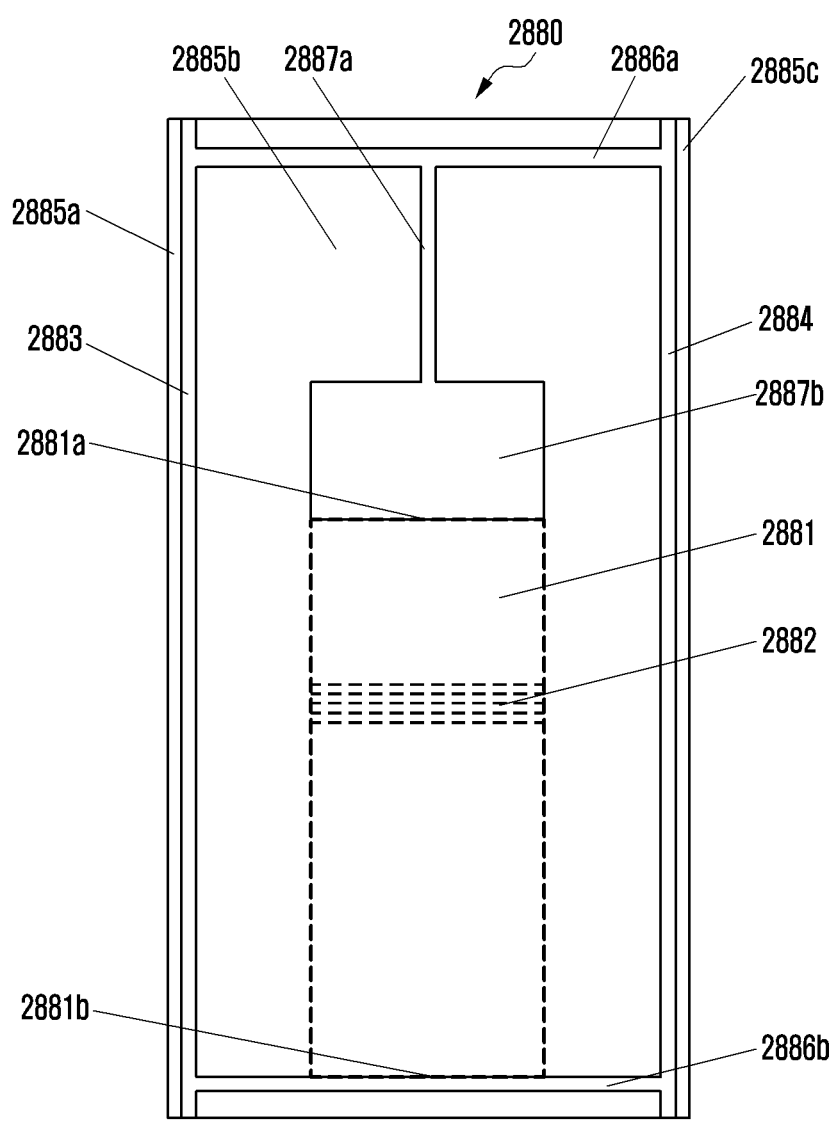

In FIG. 28H, a metal plate 2881 and a solenoid coil 2882, wound around at least a portion of the metal plate 2881, may be positioned below the rear side metal cover 2880. A first length slit 2883 and a second length slit 2884 may be formed at the left/right of the rear side metal cover 2880. A first length slit 2883 and a second length slit 2884 may be formed as a straight line, extending from the upper end to the lower end of the rear side metal cover 2880, respectively, and dividing the rear side metal cover 2880 into a left area 2885a, a middle area 2885b, and a right area 2885c.

The rear side metal cover 2880 may further form a top width slit 2886a and a bottom width slit 2886b positioned on the top/bottom of the rear side metal cover 2880, respectively, and formed as straight lines extending up to the first length slit 2883 and the second length slit 2884.

The rear side metal cover 2880 may further form a third length slit 2887a extending from the top width slit 2886a to the metal plate 2881. In addition, the rear side metal cover 2880 may further form an opening 2887b extending from the third length slit 2887a to the first end 2881a of the metal plate 2881. The opening 2887b has the same width as the metal plate 2881. The second end 2881b of the metal plate 2881 may be designed to extend up to the bottom width slit 2886b.

Figure 28I:
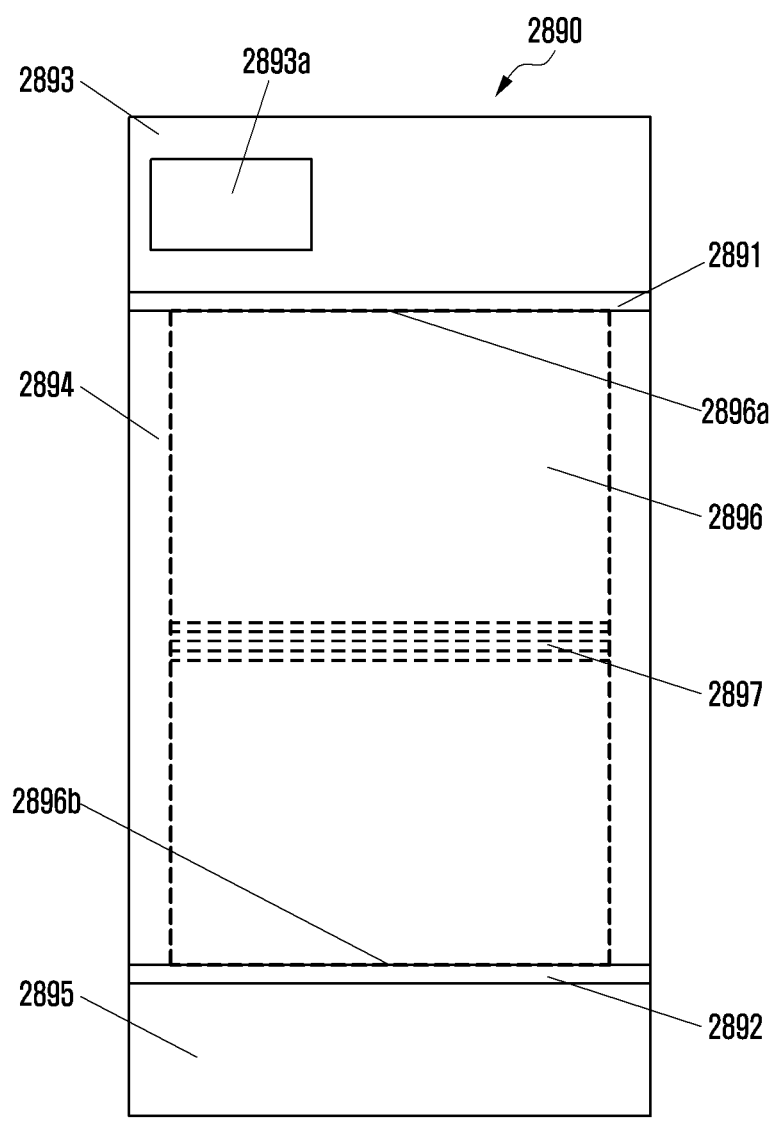

In FIG. 28I, the rear side metal cover 2890 forms a top width slit 2891 and a bottom width slit 2892 positioned at the top/bottom of the rear side metal cover 2890, respectively, and formed as straight lines extending up to the left edge and the right edge of the rear side metal cover 2890. Therefore, the rear side metal cover 2890 may be divided into a top area 2893, a middle area 2894, and a bottom area 2895, by the top width slit 2891 and the bottom width slit 2892. A metal plate 2896 and a solenoid coil 2897, wound around at least a portion of the metal plate 2896, may be positioned below the middle area 2894. The metal plate 2896 may be designed in such a manner that the upper end 2896a extends up to the top width slit 2891 and the lower end 2896b extends up to the bottom width slit 2892. Meanwhile, an opening 2893a may be formed in the top area 2893. Therefore, a magnetic flux, generated by the solenoid coil 2897, may be emitted to the outside through the metal plate 2896, the top width slit 2891, and the bottom width slit 2892. A portion of the magnetic flux may be spread to the opening 2893a and then emitted to the outside through the opening 2893a.

In embodiments of the present disclosure as described in detail above, an electronic device may be configured to include a housing including a first surface facing in a first direction, a second surface facing in a second direction opposite the first direction, and a side member surrounding at least a portion of a space between the first surface and the second surface, an inner structure positioned between the first surface and the second surface, a conductive coil positioned inside the housing and having an axis substantially perpendicular to the first direction or the second direction, and being wound around a portion of the inner structure, a communication circuit positioned inside the housing, the communication circuit being configured to cause the conductive coil to generate a magnetic flux, a display exposed through at least a portion of the first surface, and a processor positioned inside the housing, the processor being electrically connected to the communication circuit and the display.

The second surface includes a first portion which is formed of a conductive material and includes two openings separated from each other, a second portion which is formed of a non-conductive material and fills one of the openings, and a third portion which is formed of a non-conductive material and fills the other openings.

The conductive coil is positioned generally under the first portion when viewed from above the second surface. The inner structure extends between the one of the openings and the other of the openings when viewed from above the second surface, so that the generated magnetic flux penetrates through the openings.

The inner structure may include a plane substantially parallel to the first surface or the second surface, and a plate formed of a magnetic substance.

The electronic device may further include a battery. At least a portion of the plate is interposed at least partially the second surface and the battery.

The axis generally extends in a third direction from the second portion to the third part when viewed from above the second surface.

The second portion and the third portion are enclosed by the first portion when viewed from above the second surface.

The electronic device may further include a battery including a first battery portion and a second battery part, which is positioned lower than the first battery portion when viewed from above the second surface.

The inner structure may include a first metal plate positioned between the first battery portion and the second surface. An end portion of the first metal plate is bent downward and positioned above the second battery portion when viewed from above the second surface. The conductive coil is wound around the end portion of the first metal plate.

The inner structure comprises a second metal plate having an end portion which contacts or is close to an end portion of the first metal plate and the other end portion of the second metal plate extends up to one of the openings.

The other end portion of the first metal plate extends up to the other opening.

The inner structure includes a third metal plate. An end portion of the third metal plate contacts or is close to the other end portion of the first metal plate. The other end portion of the third metal plate extends up to the other opening.

The second metal plate and the third metal plate are made of a material that differs from that of the first metal plate.

The first metal plate is a magnetic substance, and at least one of the second metal plate and the third metal plate is ferrite.

The second battery portion may include a protection circuit for the battery.

The inner structure may be adhered to the second surface.

The openings are slits formed on the second surface in a straight line form substantially perpendicular to the axis.

The electronic device may further include a battery including a first battery portion and a second battery part, which is positioned lower than the first battery portion when viewed from above the first surface. The inner structure may include a first metal plate; the first metal plate is positioned between the first battery portion and the first surface. An end portion of the first metal plate is bent downward and positioned above the second battery portion when viewed from above the first surface. The conductive coil is wound around the end portion of the first metal plate.

The conductive coil may include a first coil and second coil. The first coil is wound around portion of the inner structure in a clockwise direction. The second coil is wound around another portion of the inner structure in a counter-clockwise direction.

The electronic device may further include a battery including a first battery portion and a second battery part, which is positioned lower than the first battery portion when viewed from above the second surface. The inner structure is positioned between the first battery portion and the second surface. An end portion of the inner structure is bent downward and positioned above the second battery portion when the second surface is seen from the top. The conductive coil is wound around the end portion of the inner structure and the first battery portion in a direction.

The electronic device may further include a heat shielding member positioned at the edge of the inner structure and/or below the openings.

An electronic device may be configured to include a front side cover, a rear side cover having at least a flat part; an inner structure which is positioned between the front side cover and the rear side cover, in parallel to the flat portion of the rear side cover, a conductive coil which has an axis parallel to the flat portion of the rear side cover and encloses portion of the inner structure, a communication circuit configured to generate a magnetic flux using the conductive coil, a display which is positioned between the front side cover and the inner structure and is exposed through the front side cover, and a processor electrically connected to the communication circuit and the display.

The flat portion of the rear side cover includes a first portion which is formed of a conductive material and includes two openings separated from each other, a second portion which is formed of a non-conductive material and fills one of the openings, and a third portion which is formed of a non-conductive material and fills the other opening.

The conductive coil is positioned between the first portion and the display. The inner structure extends between the one of the openings and the other of the openings so that the generated magnetic flux penetrates through the openings.

An electronic device may be configured to include a front side cover, a rear side metal cover where an opening is formed, a display which is positioned between the front side cover and the rear side metal cover and is exposed through the front side cover, a metal plate which is positioned between the rear side metal cover and the display and is parallel to the rear side metal cover and whose end portion is disposed below the opening, a conductive coil wound around a portion of the metal plate, and a communication circuit electrically connected to the conductive coil.

Figure 29:
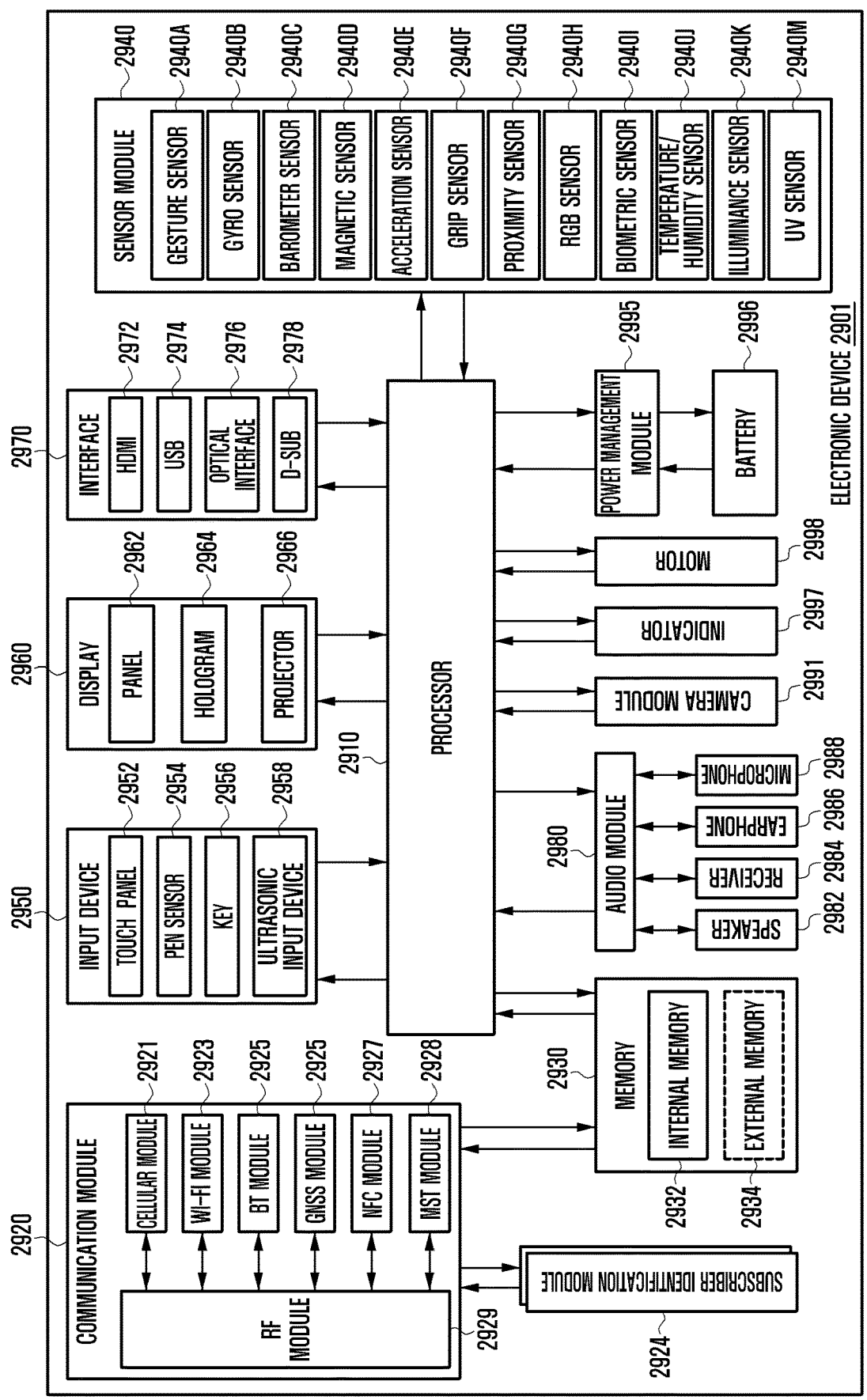
FIG. 29 is a block diagram illustrating an electronic device according to embodiments of the present disclosure.

FIG. 29 is a detailed block diagram illustrating a configuration of an electronic device 2901 according to embodiments of the present disclosure. The electronic device 2901 is capable of including one or more processors 2910, such as application processors (APs), a communication module 2920, a subscriber identification module (SIM) card 2924, a memory 2930, a sensor module 2940, an input device 2950, a display 2960, an interface 2970, an audio module 2980, a camera module 2991, a power management module 2995, a battery 2996, an indicator 2997, and a motor 2998.

The processor 2910 is capable of driving an OS or an application program to control a plurality of hardware or software components connected to the processor 2910, processing various data, and performing operations. The processor 2910 may be implemented as a system on chip (SoC), may further include a graphic processing unit (GPU) and/or an image signal processor, and may also include at least a portion of the components shown in FIG. 29. The processor 2910 is capable of loading commands or data received from at least one of other components, such as a non-volatile memory, on a volatile memory, processing the loaded commands or data, and of storing various data in a non-volatile memory.

The communication module 2920 may include a cellular module 2921, WiFi module 2923, Bluetooth® (BT) module 2925, GNSS module 2926, NFC module 2927, MST module 2928, and radio frequency (RF) module 2929.

The cellular module 2921 is capable of providing a voice call, a video call, a short message service (SMS), or an Internet service, through a communication network, for example, and is capable of identifying and authenticating an electronic device 2901 in a communication network by using a subscriber identification module (SIM) card 2924, performing at least a portion of the functions provided by the processor 2910, and including a communication processor (CP).

Each of the WiFi module 2923, the BT module 2925, the GNSS module 2926, and the NFC module 2927 is capable of including a processor for processing data transmitted or received through the corresponding module. The MST module 2928 is capable of including a processor for processing data transmitted or received through the corresponding module. According to embodiments, at least two of the modules may be included in one integrated chip (IC) or one IC package.

The RF module 2929 is capable of transmission/reception of communication signals, e.g., RF signals, and including a transceiver, a power amp module (PAM), a frequency filter, a low noise amplifier (LNA), and an antenna. According to another embodiment, at least one of the cellular module 2921, WiFi module 2923, BT module 2925, GNSS module 2926, NFC module 2927, and MST module 2928 is capable of transmission/reception of RF signals through a separate RF module.

The SIM card 2924 is capable of including a card including a subscriber identification module (SIM) and/or an embedded SIM, and containing unique identification information, such as an integrated circuit card identifier (ICCID), or subscriber information, such as an international mobile subscriber identity (IMSI).

The memory 2930 is capable of including a built-in memory 2932 or an external memory 2934. The built-in memory 2932 is capable of including at least one of a volatile memory, such as a dynamic RAM (DRAM), a static RAM (SRAM), a synchronous dynamic RAM (SDRAM), and a non-volatile memory, such as a one-time programmable ROM (OTPROM), a programmable ROM (PROM), an erasable and programmable ROM (EPROM), an electrically erasable and programmable ROM (EEPROM), a mask ROM, a flash ROM, a flash memory, such as a NAND flash memory or an NOR flash memory, a hard drive, and a solid state drive (SSD).

The external memory 2934 is also capable of including a flash drive, such as a compact flash (CF), a secure digital (SD), a micro secure digital (Micro-SD), a mini secure digital (Mini-SD), an extreme digital (xD), a multi-media card (MMC), or a memory stick. The external memory 2934 is capable of being connected to the electronic device 2901, functionally and/or physically, through various interfaces.

The memory 2930 is capable of storing payment information and a payment application serving as one of the applications 14D. The payment information may refer to credit card numbers and PINs, corresponding to a credit card, and may also include user authentication information, such as fingerprints, facial features, and voice information.

When the payment application is executed by the processor 2910, the processor 2910 may be enabled to perform an interaction with the user to make payment, such as displaying a screen to select a card and obtaining information corresponding to the selected card from payment information, and an operation to control magnetic field communication, such as transmitting the card information to a card reading apparatus, through the NFC module 2927 or MST module 2928.

The sensor module 2940 is capable of measuring/detecting a physical quantity or an operation state of the electronic device 2901, and converting the measured or detected information into an electronic signal. The sensor module 2940 is capable of including at least one of a gesture sensor 2940A, a gyro sensor 2940B, an atmospheric pressure sensor (i.e., barometer) 2940C, a magnetic sensor 2940D, an acceleration sensor 2940E, a grip sensor 2940F, a proximity sensor 2940G, a color sensor 2940H, such as a red, green and blue (RGB) sensor, a biometric sensor 2940I, a temperature/humidity sensor 2940J, an illuminance sensor 2940K, and a ultraviolet (UV) sensor 2940M. The sensor module 2940 is capable of further including an E-nose sensor, an electromyography (EMG) sensor, an electroencephalogram (EEG) sensor, an electrocardiogram (ECG) sensor, an infrared (IR) sensor, an iris sensor and/or a fingerprint sensor, and a control circuit for controlling one or more sensors included therein.

In embodiments, the electronic device 2901 is capable of including a processor, configured as a portion of the processor 2910 or a separate component, for controlling the sensor module 2940. In this case, the processor is capable of controlling the sensor module 2940 while the processor 2910 is operating in sleep mode.

The input device 2950 is capable of including a touch panel 2952, a (digital) pen sensor 2954, a key 2956, and an ultrasonic input unit 2958. The touch panel 2952 may be implemented with at least one of a capacitive touch system, a resistive touch system, an infrared touch system, and an ultrasonic touch system. The touch panel 2952 may further include a control circuit, and a tactile layer to provide a tactile response to the user.

The (digital) pen sensor 2954 may be implemented with a portion of the touch panel or with a separate recognition sheet. The key 2956 may include a physical button, an optical key, or a keypad. The ultrasonic input unit 2958 is capable of detecting ultrasonic waves, created in an input tool, through a microphone 2988, and identifying data corresponding to the detected ultrasonic waves.

The display 2960 is capable of including a panel 2962, a hologram unit 2964, or a projector 2966. The panel 2962 may include the same or similar configurations as the display 16 shown in FIG. 1A, may be implemented to be flexible, transparent, or wearable, and may also be incorporated into one module together with the touch panel 2952. The hologram unit 2964 is capable of projecting a stereoscopic image in the air by using light interference. The projector 2966 is capable of displaying an image by projecting light onto a screen positioned inside or outside the electronic device 2901. According to an embodiment, the display 2960 may further include a control circuit for controlling the panel 2962, the hologram unit 2964, or the projector 2966.

The interface 2970 is capable of including a high-definition multimedia interface (HDMI) 2972, a universal serial bus (USB) 2974, an optical interface 2976, and a D-subminiature (D-sub) 2978, may be included in the communication interface 17 shown in FIG. 1A, and is capable of including a mobile high-definition link (MHL) interface, a secure digital (SD) card/multimedia card (MMC) interface, or an infrared data association (IrDA) standard interface.

The audio module 2980 is capable of providing bidirectional conversion between a sound and an electronic signal. At least a portion of the components in the audio module 2980 may be included in the input/output interface 15 shown in FIG. 1A. The audio module 2980 is capable of processing sound information input or output through a speaker 2982, a receiver 2984, earphones 2986, and microphone 2988.

The camera module 2991 is capable of taking both still and moving images and including one or more image sensors, such as a front image sensor or a rear image sensor, a lens, an image signal processor (ISP), and a flash, such as a light-emitting diode (LED) or xenon lamp.

The power management module 2995 is capable of managing power of the electronic device 2901 and including a power management integrated circuit (PMIC), a charger IC, and a battery gauge. The PMIC may employ wired charging and/or wireless charging methods. Examples of the wireless charging method are magnetic resonance charging, magnetic induction charging, and electromagnetic charging. To this end, the PIMC may further include an additional circuit for wireless charging, such as a coil loop, a resonance circuit, or a rectifier. The battery gauge is capable of measuring the residual capacity, charge in voltage, current, or temperature of the battery 2996, which is either a rechargeable battery or a solar battery.

The indicator 2997 is capable of displaying a specific status of the electronic device 2901 or a portion thereof, such as a boot-up, message, or charging status. The motor 2998 is capable of converting an electrical signal into mechanical vibrations, such as, a vibration or haptic effect. The electronic device 2901 is capable of further including a GPU for supporting a mobile TV. The processing unit for supporting a mobile TV is capable of processing media data pursuant to standards, such as digital multimedia broadcasting (DMB), digital video broadcasting (DVB), or mediaFlo™.

Each of the elements described in the present disclosure may be formed of one or more components, and the names of the corresponding elements may vary according to the type of the electronic device. In embodiments, the electronic device may include at least one of the above described elements described in the present disclosure, and may exclude some of the elements or further include other additional elements. Some of the elements of the electronic device according to embodiments may be coupled to form a single entity while performing the same functions as those of the corresponding elements before the coupling.

Figure 30:
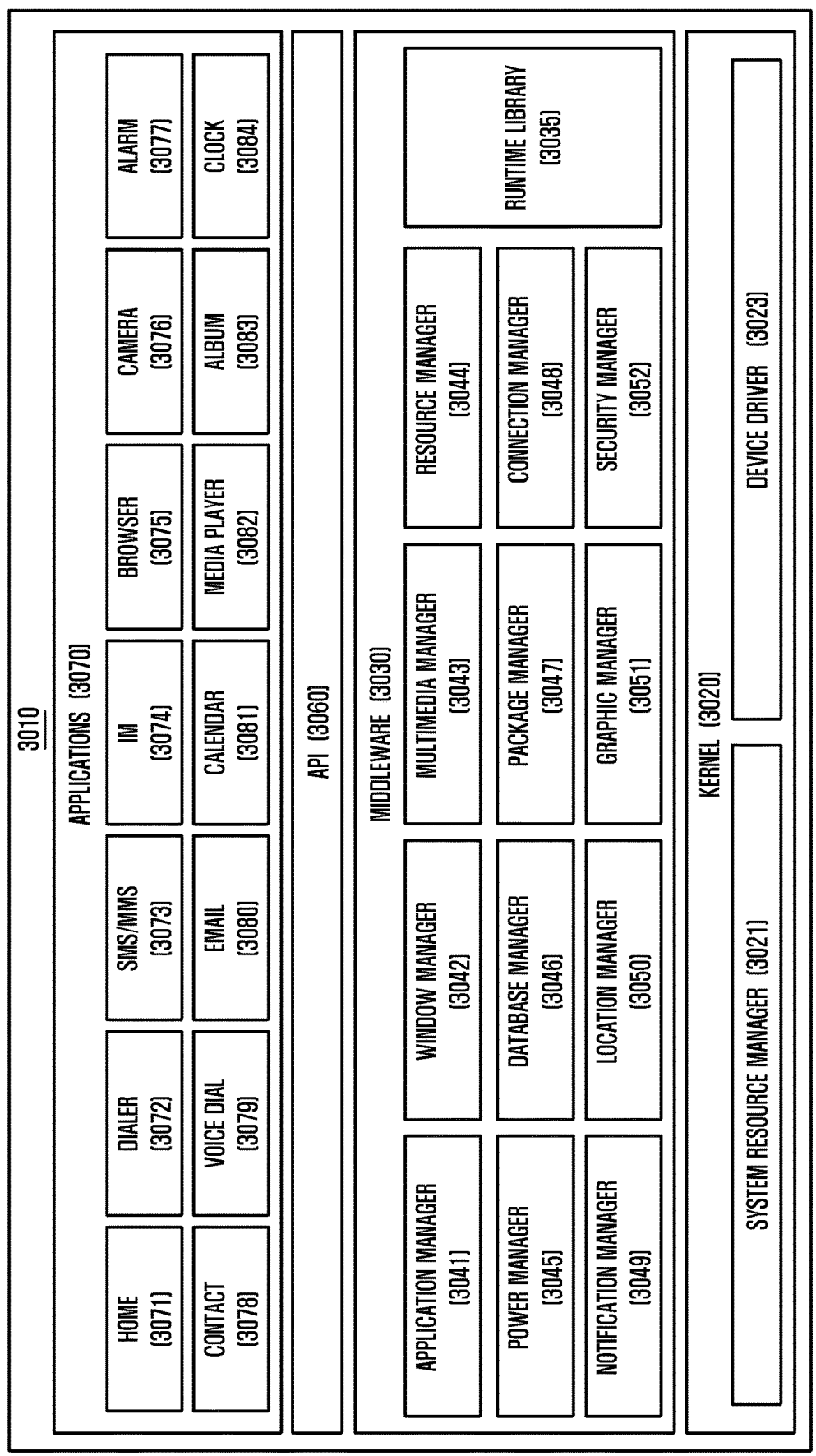
FIG. 30 is a block diagram of a program module according to embodiments of the present disclosure.

FIG. 30 is a block diagram of a programming module according to embodiments of the present disclosure. The program module 3010 is capable of including an OS for controlling resources related to the electronic device and/or various applications running on the OS, which may be Android, iOS, Windows, Symbian, Tizen, or Bada, for example.

The program module 3010 is capable of including a kernel 3020, middleware 3030, application programming interface (API) 3060 and/or applications 3070. At least a portion of the program module 3010 may be preloaded on the electronic device or downloaded from a server.

The kernel 3020 may include a system resource manager 3021 and/or a device driver 3023. The system resource manager 3021 may include, for example, a process manager, a memory manager, and a file system manager, and may perform a system resource control, allocation, and recall. The device driver 3023 may include, for example, a display driver, a camera driver, a Bluetooth driver, a shared memory driver, a USB driver, a keypad driver, a WiFi driver, an audio driver, and an inter-process communication (IPC) driver.

The middleware 3030 may provide a function required in common by the applications 3070 through the API 3060, to enable the applications 3070 to efficiently use limited system resources within the electronic device, and may include at least one of a runtime library 3035, an application manager 3041, a window manager 3042, a multimedia manager 3043, a resource manager 3044, a power manager 3045, a database manager 3046, a package manager 3047, a connection manager 3048, a notification manager 3049, a location manager 3050, a graphic manager 3051, and a security manager 3052.

The runtime library 3035 may include a library module used by a complier to add a new function through a programming language while the applications 3070 are executed. For example, the runtime library 3035 executes input and output, management of a memory, and a function associated with an arithmetic function.

The application manager 3041 may manage a life cycle of at least one of the applications 3070. The window manager 3042 may manage GUI resources used on the screen. The multimedia manager 3043 may detect a format required for reproducing various media files and perform an encoding or a decoding of a media file by using a codec suitable for the corresponding format. The resource manager 3044 manages resources such as a source code, a memory, and a storage space of at least one of the applications 3070.

The power manager 3045 may operate together with a basic input/output system (BIOS) to manage a battery or power and provides power information required for the operation. The database manager 3046 may manage generation, search, and change of a database to be used by at least one of the applications 3070. The package manager 3047 may manage an installation or an update of an application distributed in a form of a package file.

The connection manager 3048 may manage a wireless connection such as WiFi or Bluetooth®. The notification manager 3049 may display or notify a user of an event such as an arrival message, an appointment, or a proximity alarm, in a manner that does not disturb the user. The location manager 3050 may manage location information of the electronic device. The graphic manager 3051 may manage a graphic effect provided to the user or a user interface related to the graphic effect. The security manager 3052 provides a general security function required for a system security or a user authentication. According to an embodiment, when the electronic device has a call function, the middleware 3030 may further include a telephony manager for managing a voice of the electronic device or a video call function.

The middleware 3030 is capable of including modules configuring various combinations of functions of the above described components, providing modules specialized according to types of operation systems to provide distinct functions, and being adaptively configured in such a manner as to remove a portion of the existing components or to include new components.

The API 3060 may be a set of API programming functions, and may be provided with a different configuration according to an operating system. For example, in Android or iOS, a single API set may be provided for each platform. In Tizen, two or more API sets may be provided.

The applications 3070 may include one or more applications for performing various functions, such as a home 3071, dialer 3072, SMS/multimedia messaging service (MMS) 3073, instant message (IM) 3074, browser 3075, camera 3076, alarm 3077, contact 3078, voice dial 3079, email 3080, calendar 3081, media player 3082, album 3083, clock 3084, health care, such as an application for measuring amount of exercise or blood sugar level, and environment information, such as an application for providing atmospheric pressure, humidity, or temperature.

According to an embodiment, the applications 3070 are capable of including an information exchange application for supporting information exchange between an electronic device and an external device. The information exchange application is capable of including a notification relay application for relaying specific information to external devices or a device management application for managing external devices.

For example, the notification relay application is capable of including a function for relaying notification information, created in other applications of the electronic device, such as SMS/MMS, email, health care, and environment information applications, to external devices. In addition, the notification relay application is capable of receiving notification information from external devices to provide the received information to the user.

The device management application is capable of managing at least one function of an external device communicating with the electronic device. Examples of the function are a function of turning-on/off the external device or a portion of the external device, a function of controlling the brightness of the display, applications running on the external device, and services provided by the external device. Examples of the services are a call service and a messaging service.

According to embodiments, the applications 3070 are capable of including an application specified attributes of an external device, applications received from an external device, and a preloaded application or third party applications that can be downloaded from a server. It should be understood that the components of the program module 3010 may be referred to by different names according to types of operating systems.

At least a portion of the program module 3010 can be implemented with one or a combination of at least two of software, firmware, and hardware, can be executed by a processor, and may include modules, programs, routines, and sets of instructions or processes in order to perform one or more functions. The term "module" as used in embodiments of the present disclosure may indicate a unit including one or at least two of hardware, software, and firmware. The term "module" may be interchangeable with the term "unit", "logic", "logical block", "component", or "circuit". The 'module' may be the smallest unit of an integrated component or a portion thereof, may be the smallest unit that performs one or more functions or a portion thereof, and may be mechanically or electronically implemented. For example, the "module" according to embodiments of the present disclosure may include at least one of application-specific integrated circuit (ASIC) chips, field-programmable gate arrays (FPGAs), and programmable-logic devices for performing certain operations, which are now known or will be developed in the future.

At least a portion of the method or system according to embodiments of the present disclosure can be implemented with instructions as program modules that are stored in computer-readable storage media. One or more processors can execute instructions, thereby performing the functions. An example of the computer-readable storage media may be the memory 13. At least a portion of the program modules can be executed by a processor and may include modules, programs, routines, sets of instructions or processes, etc., in order to perform one or more functions.

Examples of the computer-readable storage media include: magnetic media, such as hard disks, floppy disks, and magnetic tape; optical media such as compact disc read only memory (CD-ROM) disks and digital versatile disc (DVD), magneto-optical media, such as floptical disks, and hardware devices that are specially configured to store and perform program instructions, such as read-only memory (ROM), random access memory (RAM), and flash memory. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa, namely, one or more software modules may be configured to act as the described hardware devices in order to perform the operations and methods described above.

Modules or program modules according to embodiments of the present disclosure may include one or more components, remove a portion of the one or more components described above, or include new components. The operations performed by modules, program modules, or the other components may be executed in a serial, parallel, repetitive, or heuristic fashion. Portion of the operations can be executed in any other order, skipped, or executed with additional operations.

The embodiments of the present disclosure described in the description and drawings along with particular terms are merely provided to assist in a comprehensive understanding of the present disclosure and are not suggestive of limitation.

While the present disclosure has been shown and described with reference to embodiments thereof, it will be apparent to those of ordinary skill in the art that various changes in form and detail may be made thereto without departing from the spirit and scope of the present disclosure as defined by the appended claims.

What is claimed is:

1. An electronic device comprising:
    a housing including a first surface facing in a first direction, a second surface facing in a second direction opposite the first direction, and a side member surrounding at least a portion of a space between the first surface and the second surface;
    an inner structure positioned between the first surface and the second surface;
    a conductive coil positioned inside the housing, the conductive coil having an axis substantially perpendicular to the first direction or the second direction, and being wound around a portion of the inner structure;
    a communication circuit positioned inside the housing, the communication circuit being configured to cause the conductive coil to generate a magnetic flux;

a display exposed through at least a portion of the first surface; and a processor positioned inside the housing, the processor being electrically connected to the communication circuit and the display, wherein the second surface comprises a first portion which is formed of a conductive material and includes two openings separated from each other, a second portion which is formed of a non-conductive material and fills one of the two openings, and a third portion which is formed of a non-conductive material and fills another of the two openings;

wherein the conductive coil is positioned generally under the first portion when viewed from above the second surface; and wherein the inner structure extends between the two openings when viewed from above the second surface, and enables the generated magnetic flux to penetrate through the two openings.

2. The electronic device of claim 1, wherein the inner structure comprises:
a plane substantially parallel to the first surface or the second surface.

3. The electronic device of claim 1, wherein the inner structure comprises:
a plate formed of a magnetic substance.

4. The electronic device of claim 3, further comprising:
a battery,
wherein the plate is interposed at least partially between the second surface and the battery.

5. The electronic device of claim 1, wherein the axis generally extends in a third direction from the second portion to the third portion when viewed from above the second surface.

6. The electronic device of claim 1, wherein the second portion and the third portion are enclosed by the first portion when viewed from above the second surface.

7. The electronic device of claim 1, further comprising:
a battery,
wherein the battery comprises a first battery portion and a second battery portion which is positioned lower than the first battery portion when viewed from above the second surface;
wherein the inner structure comprises a first metal plate that is positioned between the first battery portion and the second surface;
wherein an end portion of the first metal plate is bent downward and positioned above the second battery portion when viewed from above the second surface; and
wherein the conductive coil is wound around the end portion of the first metal plate.

8. The electronic device of claim 7, wherein the inner structure comprises a second metal plate; and
wherein an end portion of the second metal plate contacts or is close to an end portion of the first metal plate and another end portion of the second metal plate extends up to one of the two openings.

9. The electronic device of claim 8, wherein another end portion of the first metal plate extends up to the other opening.

10. The electronic device of claim 8, wherein the inner structure comprises a third metal plate;
wherein an end portion of the third metal plate contacts or is close to the another end portion of the first metal plate; and wherein another end portion of the third metal plate extends up to the other opening.

11. The electronic device of claim 10, wherein the second metal plate and the third metal plate are made of a different material than the first metal plate.

12. The electronic device of claim 11, wherein the first metal plate is a magnetic substance, and at least one of the second metal plate and the third metal plate is ferrite.

13. The electronic device of claim 7, wherein the second battery portion comprises:
a protection circuit for the battery.

14. The electronic device of claim 1, wherein the inner structure is adhered to the second surface.

15. The electronic device of claim 1, wherein the two openings are slits formed on the second surface in a straight form substantially perpendicular to the axis.

16. The electronic device of claim 1, further comprising:
a battery,
wherein the battery comprises a first battery portion and a second battery portion which is positioned lower than the first battery portion when viewed from above the first surface;
wherein the inner structure comprises a first metal plate positioned between the first battery portion and the first surface;
wherein an end portion of the first metal plate is bent downward and positioned above the second battery portion when viewed from above the first surface; and
wherein the conductive coil is wound around the end portion of the first metal plate.

17. The electronic device of claim 1, wherein the conductive coil comprises a first coil and a second coil;
wherein the first coil is wound around a portion of the inner structure in a clockwise direction; and
wherein the second coil is wound around another portion of the inner structure in a counter-clockwise direction.

18. The electronic device of claim 1, further comprising:
a battery,
wherein the battery comprises a first battery portion and a second battery portion which is positioned lower than the first battery portion when viewed from above the second surface;
wherein the inner structure is positioned between the first battery portion and the second surface;
wherein an end portion of the inner structure is bent downward and positioned above the second battery portion when viewed from above the second surface; and
wherein the conductive coil is wound around the end portion of the inner structure and the second battery portion.

19. The electronic device of claim 1, further comprising:
a heat shielding member positioned at an edge of the inner structure and/or below the two openings.

20. An electronic device comprising:
a front side cover;
a rear side cover having at least a flat portion;
an inner structure which is positioned between the front side cover and the rear side cover, in parallel to the flat portion of the rear side cover;
a conductive coil which has an axis parallel to the flat portion of the rear side cover and encloses a portion of the inner structure;
a communication circuit configured to generate a magnetic flux using the conductive coil;

a display which is positioned between the front side cover and the inner structure and is exposed through the front side cover; and a processor electrically connected to the communication circuit and the display, wherein the flat portion of the rear side cover comprises a first portion which is formed of a conductive material and includes two openings separated from each other, a second portion which is formed of a non-conductive material and fills one of the two openings, and a third portion which is formed of a non-conductive material and fills another of the two openings;

wherein the conductive coil is positioned between the first portion and the display; and wherein the inner structure extends between the two openings and enables the generated magnetic flux to penetrate through the two openings.

21. An electronic device comprising:

a front side cover;

a rear side metal cover having an opening;

a display which is positioned between the front side cover and the rear side metal cover and is exposed through the front side cover;

a metal plate which is positioned between the rear side metal cover and the display, is parallel to the rear side metal cover, and has an end portion disposed below the opening;

a conductive coil wound in a plurality of loops around an entire outer surface of a portion of the metal plate; and a communication circuit electrically connected to the conductive coil.

* * * * *